(12) United States Patent
Jung et al.

(10) Patent No.: US 12,386,146 B2
(45) Date of Patent: Aug. 12, 2025

(54) LENS DRIVING DEVICE, CAMERA MODULE, AND PORTABLE DEVICE

(71) Applicant: LG INNOTEK CO., LTD., Seoul (KR)

(72) Inventors: Tae Jin Jung, Seoul (KR); Seung Taek Shin, Seoul (KR); Kap Jin Lee, Seoul (KR); Jin Suk Han, Seoul (KR); Sang Jun Min, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 18/628,964

(22) Filed: Apr. 8, 2024

(65) Prior Publication Data

US 2024/0255729 A1    Aug. 1, 2024

Related U.S. Application Data

(63) Continuation of application No. 18/149,887, filed on Jan. 4, 2023, now Pat. No. 11,982,869, which is a
(Continued)

(30) Foreign Application Priority Data

May 10, 2016 (KR) .................. 10-2016-0056777
May 30, 2016 (KR) .................. 10-2016-0066280
(Continued)

(51) Int. Cl.
*G02B 7/105* (2021.01)
*G01B 11/30* (2006.01)
(Continued)

(52) U.S. Cl.
CPC .............. *G02B 7/105* (2013.01); *G01B 11/30* (2013.01); *G02B 7/00* (2013.01); *G02B 7/02* (2013.01);
(Continued)

(58) Field of Classification Search
CPC ... G02B 7/04; G02B 7/09; G02B 7/10; G02B 7/105; G02B 13/001
See application file for complete search history.

(56) References Cited

U.S. PATENT DOCUMENTS

2013/0050828 A1    2/2013   Sato et al.
2014/0327965 A1    11/2014  Chen et al.
(Continued)

FOREIGN PATENT DOCUMENTS

CN    1485679 A    3/2004
CN    102016708 A   4/2011
(Continued)

OTHER PUBLICATIONS

Office Action dated Apr. 3, 2024 in Chinese Application No. 202210049564.9.
(Continued)

*Primary Examiner* — Jack Dinh
(74) *Attorney, Agent, or Firm* — Saliwanchik, Lloyd & Eisenschenk

(57) ABSTRACT

The present embodiment of the present invention relates to a lens driving device, comprising: a housing; a bobbin disposed in the housing; a first coil disposed on the bobbin; a magnet which is disposed on the housing and faces the first coil; a base disposed under the housing; a substrate which is disposed on an upper surface of the base and comprises a circuit member including a second coil facing the magnet; an upper elastic member disposed on an upper portion of the bobbin and coupled to the bobbin and the housing; a support member coupled to the upper elastic member; and a terminal member elastically connecting the support member with the substrate, wherein the terminal member comprises; a first connector coupled to the substrate; and a second connector coupled to the support member; and wherein the second
(Continued)

connector is disposed at a position lower than the first connector.

15 Claims, 49 Drawing Sheets

Related U.S. Application Data continuation of application No. 17/203,191, filed on Mar. 16, 2021, now Pat. No. 11,573,395, which is a continuation of application No. 16/099,380, filed as application No. PCT/KR2017/004767 on May 8, 2017, now Pat. No. 10,983,303.

(30) Foreign Application Priority Data

May 30, 2016 (KR) ........................ 10-2016-0066608
Jul. 6, 2016 (KR) ........................ 10-2016-0085367

(51) Int. Cl.

| | |
|---|---|
| *G02B 7/00* | (2021.01) |
| *G02B 7/02* | (2021.01) |
| *G02B 7/09* | (2021.01) |
| *G02B 13/00* | (2006.01) |
| *G02B 26/08* | (2006.01) |
| *G02B 27/64* | (2006.01) |
| *G03B 3/10* | (2021.01) |
| *G03B 13/36* | (2021.01) |
| *H02K 1/17* | (2006.01) |
| *H04N 23/50* | (2023.01) |
| *H04N 23/57* | (2023.01) |

(52) U.S. Cl.
CPC ............. *G02B 7/09* (2013.01); *G02B 13/001* (2013.01); *G02B 26/085* (2013.01); *G02B 27/646* (2013.01); *G03B 3/10* (2013.01); *G03B 13/36* (2013.01); *H02K 1/17* (2013.01); *H04N 23/50* (2023.01); *H04N 23/57* (2023.01); *G03B 2217/002* (2013.01)

(56) References Cited

U.S. PATENT DOCUMENTS

| | | |
|---|---|---|
| 2015/0261067 A1 | 9/2015 | Jung et al. |
| 2016/0178925 A1 | 6/2016 | Park et al. |

FOREIGN PATENT DOCUMENTS

| | | | |
|---|---|---|---|
| CN | 102955324 A | 3/2013 | |
| CN | 103995414 A | 8/2014 | |
| CN | 104142553 A | 11/2014 | |
| CN | 104898347 A | 9/2015 | |
| CN | 104902149 A | 9/2015 | |
| CN | 105324711 A | 2/2016 | |
| CN | 105527777 A | 4/2016 | |
| CN | 114415313 A | 4/2022 | |
| EP | 2 587 307 A2 | 5/2013 | |
| EP | 2 899 579 A2 | 7/2015 | |
| JP | 2005-274796 A | 10/2005 | |
| JP | 2008-129407 A | 6/2008 | |
| JP | 2013-92579 A | 5/2013 | |
| JP | 2013-210550 A | 10/2013 | |
| JP | 2015-191213 A | 11/2015 | |
| JP | 2016-051078 A | 4/2016 | |
| KR | 10-2010-0052083 A | 5/2010 | |
| KR | 10-2011-0046801 A | 5/2011 | |
| KR | 10-2015-0081508 A | 7/2015 | |
| KR | 10-2016-0008860 A | 1/2016 | |
| KR | 10-2016-0017448 A | 2/2016 | |
| WO | 2016/003103 A1 | 1/2016 | |

OTHER PUBLICATIONS

U.S. Appl. No. 18/149,887, filed Jan. 4, 2023.
U.S. Appl. No. 17/203,191, filed Mar. 16, 2021, now U.S. Pat. No. 11,573,395, issued Feb. 7, 2023.
U.S. Appl. No. 16/099,380, filed Nov. 6, 2018, now U.S. Pat. No. 10,983,303, issued Apr. 20, 2021.
International Search Report in International Application No. PCT/KR2017/004767, filed May 8, 2017.
Supplementary European Search Report dated May 16, 2019 in European Application No. 17796345.1.
Office Action dated Sep. 2, 2020 in Chinese Application No. 201780029012.9.
Notice of Allowance dated Dec. 30, 2020 in U.S. Appl. No. 16/099,380.
Office Action dated Mar. 22, 2022 in European Application No. 17 796 345.1.
Office Action dated Aug. 5, 2022 in Korean Application No. 10-2016-0066608.
Notice of Allowance dated Oct. 5, 2022 in U.S. Appl. No. 17/203,191.
Office Action dated Mar. 21, 2023 in Chinese Application No. 202210051532.2.
Office Action dated May 7, 2023 in Chinese Application No. 202210049518.9.
Office Action dated May 9, 2023 in Chinese Application No. 202210049522.5.
Office Action dated May 25, 2023 in Chinese Application No. 202210049564.9.
Office Action dated Jun. 8, 2023 in Korean Application No. 10-2016-0085367.
Office Action dated Jun. 13, 2023 in Korean Application No. 10-2016-0056777.
Office Action dated Oct. 25, 2023 in Chinese Application No. 202210051532.2.
Office Action dated Oct. 25, 2023 in Chinese Application No. 202210049522.5.
Office Action dated Oct. 28, 2023 in Chinese Application No. 202210049518.9.
Office Action dated Nov. 11, 2023 in Chinese Application No. 202210049564.9.
Office Action dated Sep. 27, 2023 in Korean Application No. 10-2016-0066280.
Office Action dated Oct. 26, 2023 in Korean Application No. 10-2016-0085367.
Notice of Allowance dated Jan. 2, 2024 in U.S. Appl. No. 18/149,887.
European Search Report dated May 14, 2025 in European Application No. 25150490.8.

LENS DRIVING DEVICE, CAMERA MODULE, AND PORTABLE DEVICE

CROSS-REFERENCE TO RELATED APPLICATIONS

This application is a continuation of U.S. patent application Ser. No. 18/149,887, filed Jan. 4, 2023; which is a continuation of U.S. patent application Ser. No. 17/203,191, filed Mar. 16, 2021, now U.S. Pat. No. 11,573,395, issued Feb. 7, 2023; which is a continuation of U.S. patent application Ser. No. 16/099,380, filed Nov. 6, 2018, now U.S. Pat. No. 10,983,303, issued Apr. 20, 2021; which is the U.S. national stage application of International Patent Application No. PCT/KR2017/004767, filed May 8, 2017; which claims the benefit under U.S.C. § 119 of Korean Patent Application Nos. 10-2016-0056777, filed May 10, 2016; 10-2016-0066280, filed May 30, 2016; 10-2016-0066608, filed May 30, 2016; and 10-2016-0085367, filed Jul. 6, 2016; the disclosures of each of which are incorporated herein by reference in their entirety.

TECHNICAL FIELD

This embodiment relates to a lens driving device, a camera module and a portable device.

BACKGROUND ART

This section provides background information related to the present disclosure, which is not necessarily prior art.

Mobile phones or smart phones mounted with camera modules for performing the function of storing an image or a video by photographing a subject has been developed. Generally, a camera module may include a lens, an image sensor module and a lens driving device adjusting a gap between the lens and the image sensor module.

Mobile devices such as mobile phones, smart phones, tablet PCs and note books are embedded with a small camera module. A lens driving device can perform an auto focusing aligning a focal distance of lens by adjusting a gap between an image sensor and a lens.

Furthermore, a lens driving device added with a handshake correction (OIS, Optical Image Stabilizer) function to correct a distortion of image or video due to a user's handshake has been developed, because a camera module may be finely shaken by the user's handshake during photographing of a subject.

Meantime, a camera module equipped with the OIS function may be mounted with an elastic member elastically supporting a mover mounted with a lens module relative to a stator to allow a lens module to move an image sensor to a parallel direction with the image sensor.

On the other hand, concomitant with a structure of smart phone being gradually thinner of late, a length of camera module to a z axis direction becomes shrunken to disadvantageously disallow obtaining a sufficient length of an elastic member.

Demand and manufacturing are increased for smart phones and electronic products such as portable phones and the like mounted with a camera. The trend is that portable cameras are high-pixelated and miniaturized, and an actuator is also miniaturized, large-calibered and multi-functionalized in response to the abovementioned trend. In order to implement the high-pixelated portable camera, additional functions are required including improved performance of portable camera, auto focusing, improved prevention of shutter shake and improved zoom function.

Technical Subject

Exemplary and non-limiting embodiments of this invention relate generally to a slim-structured lens driving device, a camera module including the slim-structured lens driving device, and a portable device.

In order to solve the abovementioned problems/disadvantages, exemplary embodiments of the present invention provide a lens driving device secured with an activating length of an elastic member for OIS function even at an inside of a thinner smart phone.

Furthermore, exemplary embodiments of the present invention provide a camera module including a lens driving device, and an optical device.

Still furthermore, exemplary embodiments of the present invention provide a lens driving device configured to inhibit a lens from being deviated by a shock, a camera module including the same, and an optical device.

Technical problems to be solved by the present invention are not restricted to the abovementioned description, and any other technical problems not mentioned so far will be clearly appreciated from the following description by skill in the art.

Technical Solution

A lens driving device according to an exemplary embodiment comprises: a housing; a bobbin disposed in the housing; a first coil disposed on the bobbin; a magnet which is disposed on the housing and faces the first coil; a base disposed under the housing; a substrate which is disposed on an upper surface of the base and comprises a circuit member including a second coil facing the magnet; an upper elastic member disposed on an upper portion of the bobbin and coupled to the bobbin and the housing; a support member coupled to the upper elastic member; and a terminal member elastically connecting the support member with the substrate, wherein the terminal member comprises; a first connector coupled to the substrate; and a second connector coupled to the support member; and wherein the second connector is disposed under the first connector.

The terminal member may be disposed at a bottom surface of base.

The substrate may further include a PCB (Printed Circuit Board) interposed between the circuit member and the base.

The first connector may be coupled with a first terminal disposed at a bottom surface of PCB.

The upper elastic member may include a first hole passed by the support member and an upper end part of support member may be coupled with an upper surface of the upper elastic member through soldering.

The circuit member may include a second hole passed by the support member, and the PCB may include a third hole passed by the support member, and the base may include a fourth hole passed by the base.

The second connector may include a fifth hole passed by the support member, and a bottom end of the support member may be coupled with a bottom surface of the second connector using soldering.

A diameter of second hole may be greater than that of the third hole, and a diameter of third hole may be greater than that of the fourth hole.

The base may include a sixth hole passed by the first connector.

The lens driving device may further comprise a connection part disposed at a corner part between the PCB and the circuit member to electrically connect the PCB and the circuit member.

The connection part may include a second terminal formed at the PCB in a round or semi-circular shape, and a third terminal disposed at a position of the circuit member corresponding to that of the second terminal.

The terminal unit may further include a connection part connecting the first connector and the second connector, wherein the first connector, the second connector and the connection part may be integrally formed.

The first connector and the second connector may be disposed in parallel, and the connection part may have an inclination against the first connector and the second connector.

A camera module according to an exemplary embodiment of the present invention may comprise: a PCB; an image sensor disposed at the PCB; the lens driving device of claim 1 disposed at the PCB; and a lens coupled to a bobbin of the lens driving device and disposed at an upper surface of the image sensor.

A portable device according to an exemplary embodiment of the present invention may include a body, a camera module of claim 14 disposed at the body and a display part disposed at one surface of body to output an image photographed by the camera module.

A lens driving device according to an exemplary embodiment of the present invention may comprise: a bobbin moving to a first direction; a first coil disposed at an outer circumferential surface of bobbin; a housing disposed at an inside with the bobbin; a first magnet coupled with the housing; an upper elastic member disposed at an upper side of bobbin to be coupled with the bobbin and the housing; a circuit member including a second coil disposed at a bottom side of housing to face the first magnet; a PCB disposed at a bottom side of PCB to be electrically connected to the circuit member; a base disposed at a bottom side of PCB; a terminal member disposed at a bottom surface of base to electrically connect the circuit member and the PCB; and a support member disposed at a corner part of housing to connect the upper elastic member and the terminal member, wherein the terminal member may include a first connector electrically connected to the PCB, and a second connector electrically connected to the support member.

The first connector may be more closely disposed to the PCB to a first direction than the second connector.

The PCB may be formed at a bottom surface with a first terminal to be coupled with the first connector of the terminal member.

The base may be formed with a first recess part mounted at a bottom surface with the terminal member.

The support member may be coupled at an upper end with the upper elastic member and may be coupled at a bottom end with the terminal member.

The support member may be formed in a linear (wire) type, and coupled at an upper end with the upper elastic member by way of soldering, and coupled at a bottom end with the terminal member by way of soldering.

The upper elastic member may be formed with a first through hole through which the support member is inserted.

A diameter of the first through hole may be formed to be greater than a diameter of the support member.

The circuit member may be formed with a second through hole inserted by the support member, and the PCB may be formed at a position corresponding to that of the second through hole with a third through hole inserted by the support member.

Each diameter of the second through hole and the third through hole may be formed to be greater than that of the support member.

The diameter of the second through hole may be formed to be greater than that of the third through hole.

The support member may be coupled to an upper surface of the upper elastic member by passing through the first through hole.

The support member may be coupled with a bottom surface of terminal member by passing through the second through hole and the third through hole.

An exemplary embodiment of lens driving device may further comprise a first connection part disposed at a corner part between the PCB and the circuit member to electrically connect the PCB and the circuit member.

The first connection part may include a second terminal disposed at the PCB in a "C" shape or in a semi-circular shape, and a third terminal disposed at a position of the circuit member corresponding to that of the first terminal.

The base may be formed with a fourth through hole inserted by the support member, and the second connector may be formed at a position corresponding to that of the fourth through hole with a fifth through hole inserted by the support member.

Each diameter of the fourth through hole and the fifth through hole may be formed to be greater than that of the support member.

The diameter of the fifth through hole may be formed to be greater than that of the fourth through hole.

The support member may be coupled with a bottom surface of terminal member by passing through the fourth through hole and the fifth through hole.

The first connector may be formed at a position corresponding to that of the first terminal with a sixth through hole.

The sixth through hole may be formed in a round shape with a diameter of 0.1 mm to 0.5 mm.

The lens driving device according to an exemplary embodiment of the present invention may further comprise a bottom elastic member disposed at a bottom side of bobbin and coupled with the bobbin and the housing.

The lens driving device according to an exemplary embodiment of the present invention may further comprise a third coil disposed at an outside of the housing, where the third coil may generate an electromotive force in response to mutual induction with the first coil as the bobbin moves to a first direction, and may detect a first direction displacement of bobbin by measuring a voltage change of the electromotive force generated from the third coil.

A lens driving device according to an exemplary embodiment of the present invention may further comprise second sensor mounted on the base to face the second coil to detect second and third direction displacements perpendicular to the first direction of the housing.

The PCB may be formed with a fourth terminal disposed at a bottom surface to face the second sensor and to electrically connect the PCB and the second sensor.

The support member may be elastically and deformably disposed at a first section from between an upper surface of the upper elastic member and a bottom surface of the terminal member.

A lens driving device according to another exemplary embodiment of the present invention may comprise: a bobbin moving to a first direction; a first coil mounted at an outer circumferential surface of the bobbin; a housing mounted at an inside with the bobbin; a first magnet coupled with the housing; an upper elastic member disposed at an upper side of the bobbin to be coupled with the bobbin and the housing; a bottom elastic member disposed at a bottom surface of bobbin to be coupled with the bobbin and the housing; a circuit member including a second coil so disposed as to face the first magnet; a PCB disposed at a bottom side of the circuit member to be electrically connected to the circuit member; a base disposed at a bottom side of the PCB; a second sensor disposed at the base to face the second coil to detect displacements of second and third directions of the housing; a third coil disposed at an outside of housing to detect displacement of first direction of bobbin; a support member disposed at a corner part of housing to support the housing; and a terminal member disposed at a bottom surface of base to electrically connect the circuit member and the PCB.

A camera module according to an exemplary embodiment of the present invention may comprise: a lens driving device; and an image sensor mounted on the lens driving device.

In another general aspect of the present invention, there is provided a portable device, comprising: a display module including a plurality of pixels that changes in color in response to an electric signal; a camera module converting an image incident through a lens to an electric signal; and a controller controlling the operation of the display module and the camera module.

A lens driving device according to an exemplary embodiment of the present invention may comprise: a base; a mover disposed at an upper side of base to include a first coil; a first support member movably supporting the mover relative to the base to be electrically connected with the first coil; a substrate disposed at an upper surface of base; and a terminal unit disposed at the base, wherein the terminal unit includes a first coupling part coupled with the substrate, a second coupling part coupled with the support member, and a connection part connecting the first and second coupling parts, wherein the support member passes through a first through hole formed at the base, and the second coupling part may be disposed at a bottom side more underneath than the first coupling part.

The second coupling part may include a coupling hole formed at a position corresponding to that of the first through hole.

The first support member may be connected to the terminal unit by passing through the coupling hole formed at the second coupling part.

The base may include a second through hole or a groove formed at a position corresponding to that of the first coupling part.

The connection part may be connected to the second coupling part by being extended to a bottom side from the first coupling part.

The terminal unit may further include a bent part downwardly extended from the first coupling part to contact one surface of base.

The second through hole may be spaced apart from a lateral surface of base, and the terminal unit may further include a third coupling part outwardly extended from the bent part to allow at least a portion to be exposed to a lateral side of the base.

The base may include a reception groove formed by allowing a portion of a bottom surface to be recessed to thereby accommodate the terminal unit.

The second coupling part may further include an extension part extended to a lateral side of the connection part and a slant part slantly and horizontally extended from the extension part, wherein the coupling hole may be formed at the slant part.

The mover may include a bobbin coupled by a lens module, a housing spaced apart from the bobbin and a second support member coupled with the bobbin and the housing and coupled with the first coil, wherein the first support member may be coupled with the second support member.

The mover may include a bobbin disposed with the first coil and coupled by the lens module, a housing spaced apart from the bobbin and a magnet disposed at the housing to face the first coil, wherein the substrate may be disposed with a second coil facing the magnet, and the bobbin and the housing may be coupled with a second support member movably support the bobbin relative to the housing.

The mover may further include a third coil disposed at the housing to be spaced apart from the first coil, wherein the first support member may include first to fourth support units, each spaced apart from the other unit, wherein the first and second support units may be electrically connected to the first coil through the second support member and the third and the fourth support units may be electrically connected to the third coil.

The first to fourth support units may be respectively disposed at four corner parts formed between four lateral surfaces of the housing.

In another general aspect of the present invention, there is provided a camera module, comprising: a PCB; an image sensor mounted on the PCB; a base disposed at the PCB; a mover disposed at an upper side of base to include a first coil; a first support member movably support the mover relative to the base to be electrically connected to the first coil; a substrate disposed at an upper surface of base; and a terminal unit disposed at the base; wherein the terminal unit may include a first coupling part coupled with the substrate, a second coupling part coupled with the first support member, and a connection part connecting the first and second coupling parts, and wherein the first support member may pass through a first through hole formed at the base, and the second coupling part may be disposed at a bottom side more underneath than the first coupling part.

In another general aspect of the present invention, there is provided an optical device, comprising: a main body; a display part disposed at an outside of the main body; and a camera module where at least one portion thereof is accommodated into the main body; wherein the camera module may include a PCB, an image sensor mounted on the PCB, a base disposed on the PCB, a mover disposed at an upper side of the base to include a first coil, a first support member movably support the mover relative to the base to be electrically connected to the first coil, a substrate disposed at an upper surface of base, and a terminal unit disposed at the base, and wherein the terminal unit may include a first coupling part coupled with the substrate, a second coupling part coupled with the first support member, and a connection part connecting the first and second coupling parts, and wherein the first support member may pass through a first through hole formed at the base to be disposed at a position more underneath than the first coupling part.

A lens driving device according to an exemplary embodiment of the present invention may comprise: a bobbin so mounted as to move to a first direction; a first coil mounted on an outer circumferential surface of bobbin; a housing mounted at an inside with the bobbin; a first magnet coupled to the housing; an upper elastic member disposed at an upper side of bobbin and coupled with the bobbin and the housing; a circuit member including a second coil so disposed as to face the first magnet; a PCB disposed at a bottom side of circuit member to be electrically connected with the circuit member; a base disposed at a bottom side of the PCB; and a support member disposed at a corner part of the housing to support the housing, wherein the support member may be coupled at an upper end with the upper elastic member and coupled at a bottom end with the PCB.

The support member may be formed in a shape of a linear type (wire type), and may be coupled at an upper end with the upper elastic member by way of soldering, and coupled at a bottom end with the PCB by way of soldering.

The upper elastic member may be formed with a first through hole inserted by the support member.

A diameter of the first through hole may be formed to be greater than that of the support member.

The circuit member may be formed with a second through hole inserted by the support member, and the PCB may be formed at an area corresponding to that of the second through hole with a third through hole inserted by the support member.

Each diameter of the second and third through holes may be formed to be greater than that of the support member.

A diameter of second through hole may be formed to be greater than that of the third through hole.

The diameter of second through hole may be 0.3 mm~0.4 mm.

The diameter of third through hole may be 0.15 mm~0.25 mm.

The support member may be coupled with an upper surface of the upper elastic member by passing through the first through hole.

The support member may be coupled with a bottom surface of the PCB by passing through the second and third through holes.

The lens driving device according to an exemplary embodiment of the present invention may further comprise: a first connection part electrically connecting the PCB and the circuit member; and a second connection part electrically connecting the PCB and the support member.

The first and second connection parts may be disposed at corner parts of the PCB, the circuit member and the support member, wherein the first connection part may be disposed at one side or both sides of the first connection part.

The first connection part may include a first terminal formed on the PCB in a "C" shape or a semi-circular shape, and a second terminal formed on the circuit member at an area corresponding to that of the first terminal.

The first terminal may be so formed as to encompass at least an upper surface, a bottom surface and a lateral surface of PCB, and the second terminal may be disposed at a bottom surface of circuit member, being spaced apart from a lateral surface of circuit member at a predetermined distance, and a surface area of the PCB may be formed to be smaller than that of the circuit member to allow the first terminal and the second terminal to be mutually contacted or mutually coupled.

The first connection part may be formed with four pieces, and the second connection part may be formed with four pieces or eight pieces.

The first connection part may be formed with eight pieces, and the second connection part may be formed with four pieces or eight pieces.

The support member may be elastically deformably disposed at a first section between an upper surface of the upper elastic member and a bottom surface of the PCB.

The PCB may be formed with a thickness measured to a first direction in the range of 0.1 mm~0.2 mm.

The support member according to an exemplary embodiment of the lens driving device may be formed with a recess groove formed at a corner part of base in order to allow the support member to be coupled with the bottom surface of PCB.

The lens driving device according to an exemplary embodiment of the present invention may further comprise a bottom elastic member disposed at a bottom surface of bobbin to be coupled to the bobbin and the housing.

The lens driving device according to another exemplary embodiment of the present invention may comprise: a bobbin so mounted as to move to a first direction; a first coil disposed at an outer circumferential surface of bobbin; a housing mounted at an inner side with the bobbin; a first magnet coupled with the housing; an upper elastic member disposed at an upper side of bobbin to be coupled with the bobbin and the housing; a circuit member including a second coil so disposed as to face the first magnet; a PCB disposed at a bottom side of circuit member to be electrically connected to the circuit member; a base disposed at a bottom side of the PCB; and a support member disposed at a corner part of housing to support the housing, wherein the support member may be coupled at an upper end with the upper elastic member, and may be coupled at a bottom end with the PCB, and may be elastically and deformably disposed at a first section between an upper surface of the upper elastic member and a bottom surface of PCB.

A camera module according to an exemplary embodiment of the present invention may comprise: a lens driving device; and an image sensor mounted on the lens driving device.

A portable device according to an exemplary embodiment of the present invention may comprise: a display module including a plurality of pixels that changes in color in response to an electric signal; the camera module converting an image incident through a lens to an electric signal; and a controller controlling operations of the display module and the camera module.

A lens driving device according to an exemplary embodiment of the present invention may comprise: a bobbin mounted with a lens; a housing accommodated at an inside with the bobbin; a first coil disposed at an outer circumferential surface of bobbin; and a magnet disposed at the housing; wherein an inner circumferential surface of bobbin may include a first area adjacent to an upper surface of bobbin, a second area adjacent to a bottom surface of bobbin, and a third area interposed between the first area and the second area, and wherein a surface roughness of at least one of the inner circumferential surfaces of bobbin at the first area and the third area may be greater than that of the second area.

The third area may be provided with a protrusion to a horizontal direction from the inner circumferential surface of bobbin in order to support the lens.

The first area may be an area contacted by an adhesive member for fixing the lens to an inner circumferential surface of bobbin, and the second area may be an area not contacted by the adhesive member.

A surface arithmetic mean roughness of the first area at the bobbin may be greater than that of the second area.

A mean roughness between high and low at the first area of bobbin may be greater than that of second area.

A maximum height of surface at the first area of bobbin may be greater than that of the second area.

Each of the arithmetic mean roughness, mean roughness between high and low and maximum height of third area may be greater than any corresponding one of the arithmetic mean roughness, mean roughness between high and low and maximum height of second area.

An arithmetic mean roughness of surface at the first area of bobbin may be 0.32 μm~3.15 μm, an mean roughness between high and low of surface at the first area may be 1.5 μm~12.5 μm, and a maximum height of the first area may be 3.2 μm~5.0 μm.

A camera module according to an exemplary embodiment of the present invention may comprise: the lens driving device according to the exemplary embodiment; an adhesive member interposed at the lens and the first area or the third area of bobbin to fix the lens to the bobbin; and an image sensor converting an image incident through the lens driving device to an electric signal.

An optical device according to an exemplary embodiment of the present invention may comprise: a display module including a plurality of pixels that changes in color in response to an electric signal; the camera module according to the exemplary embodiment; and a controller controlling an operation of the display module and the camera module.

Advantageous Effects

According to exemplary embodiments, a length to a first direction, i.e., an elastic deformable section, of an elastic deformable area of support member can be lengthened to thereby reduce an entire length to the first direction of a lens driving device.

In other words, in the exemplary embodiments, an entire length of lens driving device to the first direction can be reduced as much as the length of the elongated elastic deformable section of the support member, whereby an entire lens driving device can be manufactured in a slim structure.

Meantime in response to the elongation of the elastic deformable section, an angle for the support member (220) to be slanted relative to the first direction, i.e., a tilt angle can be decreased when the handshake correction function is performed.

In response to reduced tilt angle, degradation in screen quality of image generated by excessive tilt of bobbin to the first direction during implementation of handshake correction function can be restricted.

Through the exemplary embodiments, a movable length of elastic member for handshake correction function can be obtained. Thus, a phenomenon of excessive stress applied on the elastic member can be inhibited.

In the exemplary embodiment, a length of an elastic deformable area of support member to the first direction, i.e., an elastic deformable section, can be elongated to thereby reduce an entire length of the lens driving device to the first direction.

In other words, a length of the lens driving device to the first direction can be decreased as much as a value where a thickness of upper elastic member measured to the first direction and a thickness of PCB measured to the first direction are combined according to the exemplary embodiment. Thus, an entire lens driving device can be manufactured in a slim structure.

Meantime, in response to elongation of elastic deformable section, an angle for the support member to be slanted relative to the first direction, i.e., a tilt angle can be decreased when the handshake correction function is performed.

In response to reduced tilt angle, degradation in screen quality of image generated by excessive tilt of bobbin to the first direction during implementation of handshake correction function can be restricted.

The disengagement of lens caused by shocks and/or the like can be inhibited according to the exemplary embodiments.

BRIEF DESCRIPTION OF DRAWINGS

FIGS. 29 to 36 illustrate a third exemplary embodiment of the present invention and FIGS. 37 to 50 illustrate a fourth exemplary embodiment of the present invention.

FIG. 1 is an exploded perspective view illustrating a lens driving device according to an exemplary embodiment.

FIG. 2 is an exploded perspective view illustrating a bobbin according to an exemplary embodiment.

FIG. 3 is a perspective view illustrating a housing according to an exemplary embodiment.

FIG. 4 is a perspective view illustrating a state where a cover member is removed from a lens driving device according to an exemplary embodiment.

FIG. 5 is a plane view of FIG. 4.

FIG. 6 is a cross-sectional view of A1 portion of FIG. 5.

FIG. 7 is a perspective view illustrating structures of circuit member, PCB and base in a lens driving device according to an exemplary embodiment of the present invention.

FIG. 8 is a bottom perspective view of FIG. 4.

FIG. 9 is a bottom view of FIG. 4.

FIG. 10 is an enlarged view of A3 portion of FIG. 9.

FIG. 11 is a perspective view illustrating a terminal member according to an exemplary embodiment of the present invention.

FIG. 12 is a schematic view illustrating a state where a terminal member is removed from FIG. 10.

FIG. 13 is a perspective view illustrating structures of circuit member, PCB, base and terminal member in a lens driving device according to an exemplary embodiment of the present invention.

FIG. 14 is a cross-sectional view illustrating A2 portion of FIG. 4.

FIG. 15 is an enlarged view illustrating A4 portion of FIG. 14.

FIG. 16 is a perspective view illustrating a portable device (200A) according to an exemplary embodiment of the present invention.

FIG. 17 is a block diagram illustrating a portable device of FIG. 16.

FIG. 18 is a perspective view illustrating a lens driving device according to an exemplary embodiment of the present invention.

FIG. 19 is an exploded perspective view illustrating a lens driving device according to an exemplary embodiment of the present invention.

FIG. 20 is a perspective view illustrating a state where a cover member is removed from a lens driving device according to an exemplary embodiment of the present invention.

FIG. 21 is an exploded perspective view illustrating some elements of a lens driving device according to an exemplary embodiment of the present invention.

FIG. 22 is a perspective view illustrating an OIS support member and a terminal unit in a lens driving device according to an exemplary embodiment of the present invention.

FIG. 23 is a perspective view illustrating a state where a lens driving device of FIG. 21 is coupled.

FIG. 24 is a plane view illustrating a lens driving device illustrated in FIG. 23.

FIG. 25 is a cross-sectional view taken along X-Y of FIG. 24.

FIG. 26 is a bottom view of a lens driving device according to an exemplary embodiment of the present invention.

FIG. 27 is a conceptual view illustrating to explain an effect of a lens driving device according to an exemplary embodiment of the present invention.

FIG. 28 is a conceptual view illustrating a comparative example in order to compare with an exemplary embodiment of the present invention.

FIG. 29 is a perspective view illustrating a lens driving device according to an exemplary embodiment of the present invention.

FIG. 31 is a perspective view illustrating a state where a cover member is removed from a lens driving device according to an exemplary embodiment of the present invention.

FIG. 32 is a plane view of FIG. 31.

FIG. 33 is an enlarged view illustrating A1 portion of FIG. 32.

FIG. 34 is a perspective view illustrating structures of circuit member and PCB in a lens driving device according to an exemplary embodiment of the present invention.

FIG. 35 is a cross-sectional view illustrating A2 portion of FIG. 31.

FIG. 37 is an exploded perspective view illustrating a lens driving device according to an exemplary embodiment of the present invention.

FIG. 38 is a coupled perspective view illustrating a lens driving device of FIG. 37 except for a cover member.

FIG. 39 is a perspective view illustrating a bobbin, a first coil and a second magnet illustrated in FIG. 37.

FIG. 40 is a first exploded perspective view of a housing, a first position sensor, a board and a first magnet illustrated in FIG. 37.

FIG. 41 is a second exploded perspective view of a housing, a first magnet, a first position sensor and a board illustrated in FIG. 37.

FIG. 42 is a schematic view illustrating mounting grooves provided on a housing in order to mount a first position sensor and a board.

FIG. 43 is a cross-sectional view cut off along a line I-I' illustrated in FIG. 38.

FIG. 44 is a coupled perspective view of an upper elastic member, a bottom elastic member, a first position sensor, a board, a base, a support member and a circuit substrate illustrated in FIG. 37.

FIG. 45 is an exploded perspective view of a base, a second coil and a circuit substrate illustrated in FIG. 37.

FIG. 46 is a perspective view illustrating a bobbin of FIG. 39 cut off to a ||-||' direction.

FIG. 48 is an exploded perspective view illustrating a camera module according to an exemplary embodiment of the present invention.

FIG. 49 is a coupled cross-sectional view of a lens illustrated in FIG. 48 and a bobbin illustrated in FIG. 47a.

FIG. 50 is a coupled perspective view of a lens illustrated in FIG. 48 and a bobbin illustrated in FIG. 47c.

BEST MODE

Figure 1:
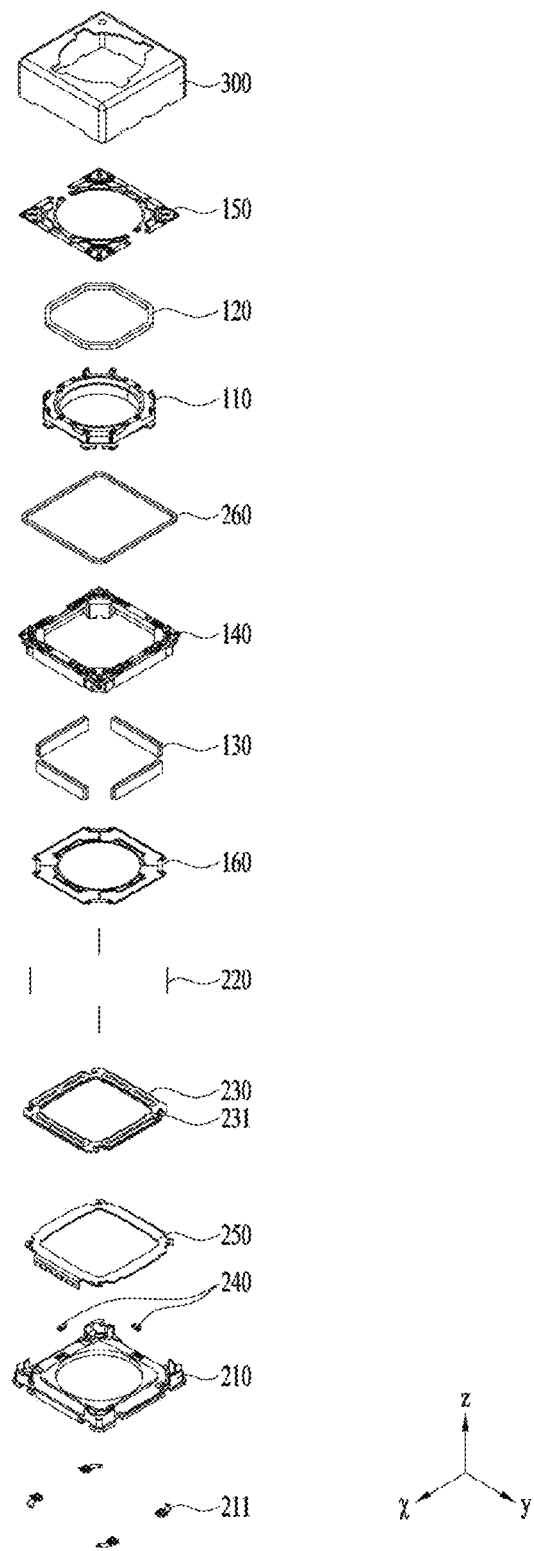
FIGS. 1 to 17 illustrate a first exemplary embodiment of the present invention.

Hereinafter, exemplary embodiments will be explained in detail with reference to the accompanying drawings. The exemplary embodiments may be applied with various changes, and may have various forms, and particular exemplary embodiments will be exemplified on the drawings, and explained in detail in the following best mode. However, these exemplary embodiments will not be restricted to particular forms and therefore, it should be appreciated that all changes, equivalents, modifications and substitutes of the embodiments described herein can be made without departing from the scope and spirit of the invention.

Furthermore, the terms "first," "second," and the like may be used in explanation of elements according to exemplary embodiments of the present invention. These terms are used merely to distinguish one element from another and are not limited to essences, orders or sequences of relevant elements by the relevant terms. Furthermore, terms specially defined in consideration of configurations and operations of the embodiments are merely used to explain the exemplary embodiments and do not limit the scope of the exemplary embodiments.

In the explanation of the exemplary embodiments, when an element is described as being formed 'on' or 'under' each element, it should be appreciated that the terms of 'on' or 'under' all include that two elements are directly contacted or one or more elements are indirectly formed between the two elements. It should be also appreciated that the terms of 'on' or 'under' mean an upward direction and a downward direction as well based on one element.

Furthermore, relational terms such as "on/upper/above" and "under/lower/bottom" do not necessarily require or contain any logical, physical or sequential relationships among the elements, and may be used to distinguish one substance or one element from other substance or other element.

Moreover, an orthogonal coordinate system (x, y, z) may be used in the drawings. x axis and y axis in the drawings mean a plane surface perpendicular to an optical axis, and for the convenience sake, an optical axis direction (z axis direction) may be defined as a first direction, x axis direction may be defined as a second direction and y axis direction may be defined as a third direction.

FIGS. 1 to 17 illustrate a first exemplary embodiment of the present invention.

FIG. 1 is an exploded perspective view illustrating a lens driving device according to an exemplary embodiment.

An auto focusing device applied to a small camera module of a mobile device such as a smart phone or a tablet PC is a device automatically capturing a focus of an image of a subject on a surface of an image sensor (not shown). The auto focusing device may be variably formed, and can implement auto focusing operation by implementing an optical module formed with a plurality of lenses to a first direction in the case of the exemplary embodiments.

Referring to FIG. 1, a lens driving device according to an exemplary embodiment may include a mover and a stator. At this time, the mover may implement an auto focusing function of lens. The mover may include a bobbin (110), and a first coil (120), and the stator may include a first magnet (130), a housing (140), an upper elastic member (150), and a bottom elastic member (160).

The bobbin (110) may be formed at an outer circumferential surface with a first coil (120) disposed at an inner side of the first magnet, and may be reciprocally installed at an inner space of the housing (140) to a first direction in response to electromagnetic interaction between the first magnet (130) and the first coil (120). The outer circumferential surface of bobbin (110) may be disposed with a first coil (120) to enable an electromagnetic interaction with the first magnet (130).

Furthermore, the bobbin (110) may be elastically supported by the upper and bottom elastic members (150, 160) to perform an auto focusing function by moving to a first direction.

The bobbin (110) may include a lens barrel (not shown) mounted therein with at least one lens. The lens barrel may be coupled to an inside of the bobbin (110) by various methods.

For example, a female screw thread may be formed at an inner circumferential surface of bobbin (110), and an outer circumferential surface of lens barrel may be formed with a male screw thread that corresponds to the female screw thread to allow the lens barrel to the bobbin (110) by way of screw connection of these screw threads.

However, the present invention is not limited thereto, and no screw thread is formed on the inner circumferential surface of bobbin (110) and the lens barrel may be directly fixed to an inside of the bobbin (110) by way of other methods than the screw connection. Alternatively, one or more lenses may be integrally formed with the bobbin (110) without recourse to the lens barrel. A lens coupled to the lens barrel may be formed with one sheet, or two more lenses may be constructed to form an optical system.

The auto focusing function may be implemented by an operation of moving the bobbin (110) to a first direction while being controlled in response to current direction and/or current amount. For example, when a current of forward direction is applied, the bobbin (110) may move upwardly from an initial position, and when a current of reverse direction is applied, the bobbin (110) may be downwardly moved from an initial position. Alternatively, a moving direction to one direction from an initial position can be increased or decreased by adjusting a current amount of one direction.

An upper surface and a bottom surface of bobbin (110) may be protrusively formed with a plurality of upper support lugs and bottom support lugs. Each of the upper support lugs may be provided with a cylindrical shape or a pillar shape, and may be coupled and fixed to the upper elastic member (150) by guiding the upper elastic member (150).

The bottom support lug may be also provided with a cylindrical shape or a pillar shape, and may be coupled and fixed to the bottom elastic member (160) by guiding the bottom elastic member (160).

The upper elastic member (150) may be formed at an upper side of bobbin (110), and the bottom elastic member (160) may be formed at a bottom side of bobbin (110), and each of the upper and bottom elastic members (150, 160) may be respectively coupled with the bobbin and the housing. At this time, the upper elastic member (150) may be formed with a through hole and/or a groove corresponding to the upper support lug and the bottom elastic member (160) may be formed with a through hole and/or a groove corresponding to the bottom support lug. Each of the support lugs, through holes and/or grooves may be fixedly coupled by adhesive member such as thermal fusion or epoxy.

The housing (140) may take a hollowed pillar shape supporting the first magnet (130), and may be formed with a substantially square shape. The housing (140) may be coupled and arranged at a lateral surface by the first magnet (130).

Moreover, as mentioned above, the housing (140) may be arranged at an inner side with the bobbin (110) moving to a first direction by being guided by the upper and bottom elastic members (150, 160). In the exemplary embodiment, the first magnet (130) may take a rod shape and maybe coupled or arranged to a side portion of the housing (140). In another exemplary embodiment, the first magnet (130) may take a trapezoidal shape to be coupled or arranged to a corner portion of the housing (140).

Meantime, the first magnet (130) may be formed with one piece or more than two pieces. Furthermore, the first magnet may be formed in a multistage structure that is arranged in a plural number to a first direction.

The upper and bottom elastic members (150, 160) may elastically support ascending and/or descending operations of bobbin (110) to a first direction. The upper and bottom elastic members (150, 160) may be formed with a leaf spring.

As illustrated in FIG. 1, the upper elastic member (150) may be formed with mutually separated two pieces. Through this bifurcated structure, each portion of the bifurcated upper elastic member (150) may receive mutually different current or mutually different power, or may be a current transmission path. Furthermore, as a modification, the bottom elastic member (160) may be formed with a bifurcated structure, and the upper elastic member (150) may be formed with an integrated structure.

Meantime, the upper elastic member (150), the bottom elastic member (160), the bobbin (110) and the housing (140) may be assembled through a bonding operation using thermal fusion and/or adhesive. At this time, the fixing operation may be finished by bonding using adhesive after thermal fixation.

The base (210) may be disposed underneath the bobbin (110) and a PCB (250) and may be provided with a substantially square shape, on which the PCB (250) may be accommodated thereto. A surface facing a portion formed with a terminal surface (253) of the PCB (250) of the base (210) may be formed with a support groove having a corresponding size. The support groove may be concavely and inwardly formed at a predetermined depth from an outer circumferential surface of base (210) to inhibit a portion formed with the terminal surface (253) from being protruded toward outside or to adjust an amount of protrusion.

A support member (220) may be disposed at a corner part of housing (140), coupled at an upper side to the upper elastic member (150) and coupled at a bottom side to the base (210), the PCB (250) or the circuit member (231) and may support to allow the bobbin (110) and the housing (140) to move to a second direction perpendicular to the first direction and/or to a third direction, and may be electrically connected to the first coil (120).

However, in the exemplary embodiment, the support member (200) may be coupled with a terminal member (211, described later) to connect the upper elastic member (150) and the terminal member (211). A coupled structure between the support member (200) and the terminal member (211) will be described in detail later with reference to the accompanying drawings.

The support member (220) according to an exemplary embodiment is disposed at edges of housing (140), i.e., is respectively disposed at corner part of the housing (140), and therefore, a total of four support members (220) may be mutually symmetrically installed. Alternatively, in another exemplary embodiment, a total of six support members (220) may be disposed, two each at two edges, and one each at remaining two edges. Alternatively, a total of seven support members or nine support members may be arranged depending on circumstances.

Moreover, the support member (220) may be electrically connected to the upper elastic member (150). That is, the support member (220) may be electrically connected to a portion formed with a through hole of the upper elastic member (150).

Furthermore, the support member (220) is separately formed from the upper elastic member (150), such that the support member (220) and the upper elastic member (150) may be electrically connected through a conductive adhesive, soldering or welding. Therefore, the upper elastic member (150) can supply a current to the first coil (120) through the electrically connected support member (220).

Meantime, although FIG. 1 has illustrated a wire type support member according to an exemplary embodiment, the present invention is not limited thereto. That is, the support member (220) may be also formed in a shape of a plate member and the like.

The handshake correction device applied to a small camera module of a portable device such as a smart phone or a tablet PC means a device configured to inhibit a borderline of a photographed image from being unclearly formed due to vibration caused by user handshake during shooting of a still image.

The second coil (230) may perform the handshake correction by moving the housing (140) to the second direction and/or the third direction through an electromagnetic interaction with the first magnet (130).

Here, the second direction and the third direction may include not only the x axis direction (or first direction), y axis direction (or second direction) direction, but also directions substantially close to the x axis direction and the y axis direction. That is, in terms of driving aspect of the exemplary embodiments, although the housing (140) may move in parallel to the x axis and y axis, the housing (140) may move a little bit slanted to the x axis and y axis while moving by being supported by the support member (220). Thus, the first magnet (130) may be required to be installed at a position corresponding to that of the second coil (230).

The second coil (230) may be disposed at a bottom side of the housing (140) to face the first magnet (130) fixed to the housing (140). In an exemplary embodiment, the second coil (230) may be disposed at an outside of the first magnet (130). Alternatively, the second coil (230) may be disposed at a bottom side of first magnet (130) by being spaced apart at a predetermined distance.

In order to implement the arrangement of the second coil (230), a lens driving device may be so disposed as to face the first magnet (130) and may include a circuit member (231) including the second coil (230).

The second coil (230) according to an exemplary embodiment may be installed in a total number of four pieces, each one at four sides of the circuit member (231), but the present invention is not limited thereto. That is, it may be possible to install two second coils (230), i.e., one for the second direction and one for the third direction, and it may be also possible to install four second coils (230).

Alternatively, a total of six second coils (230) may be arranged, i.e., one at a first side for the second direction, two at a second side for second direction, one at a third side for the third direction and two at a fourth side for the third direction. In this case, the first side and the fourth side may be adjacent, and the second side and the third side may be adjacently disposed.

In the exemplary embodiment, although the circuit member (231) may be formed with a circuit pattern of a second coil shape, or may be formed with a separate second coil at an upper surface of the circuit member (231), the present invention is not limited thereto, and the circuit member (231) may be directly formed with a circuit pattern at an upper surface of the circuit member (231) in a second coil (230) shape.

Alternatively, the second coil (230) may be configured to be formed by winding a wire in a doughnut shape, or in an FP coil shape to be electrically connected to the PCB (250).

The circuit member (231) including the second coil (230) may be installed or arranged on an upper surface of the PCB (250) disposed at an upper side of the base (210). However, the present invention is not limited thereto, and the second coil (230) may be closely disposed with the base (210), and may be spaced apart from the base (210) at a predetermined distance, or may be formed on a separate substrate to allow the substrate to be connected to the PCB (250) in a stacked manner.

The PCB (250) may be interposed between the circuit member (231) and the base (210). That is, the PCB (250) may be disposed at a bottom side of the circuit member (231) and at an upper side of the base (210). The PCB (250) may be formed with a bent terminal surface (253, see FIG. 4) mounted with a terminal (251, see FIG. 4). In the exemplary embodiment, a PCB (250) formed with two bent terminal surfaces (253) is illustrated.

The terminal surface (253) may be disposed with a plurality of terminals (251) to receive an outside power and to supply a current to the first coil (120) and the second coil (230). The number of terminals formed on the terminal surface (253) may be increased or decreased depending on the types of elements necessary for control. Furthermore, the PCB (250) may be formed with one or more than two terminal surfaces (253).

The lens driving device according to an exemplary embodiment of the present invention may further comprise a third coil (260). The third coil (260) may function to detect a displacement of the bobbin (110) to the first direction when the bobbin (110) vertically moves to the first direction in order to implement an auto focusing function.

Figure 4:
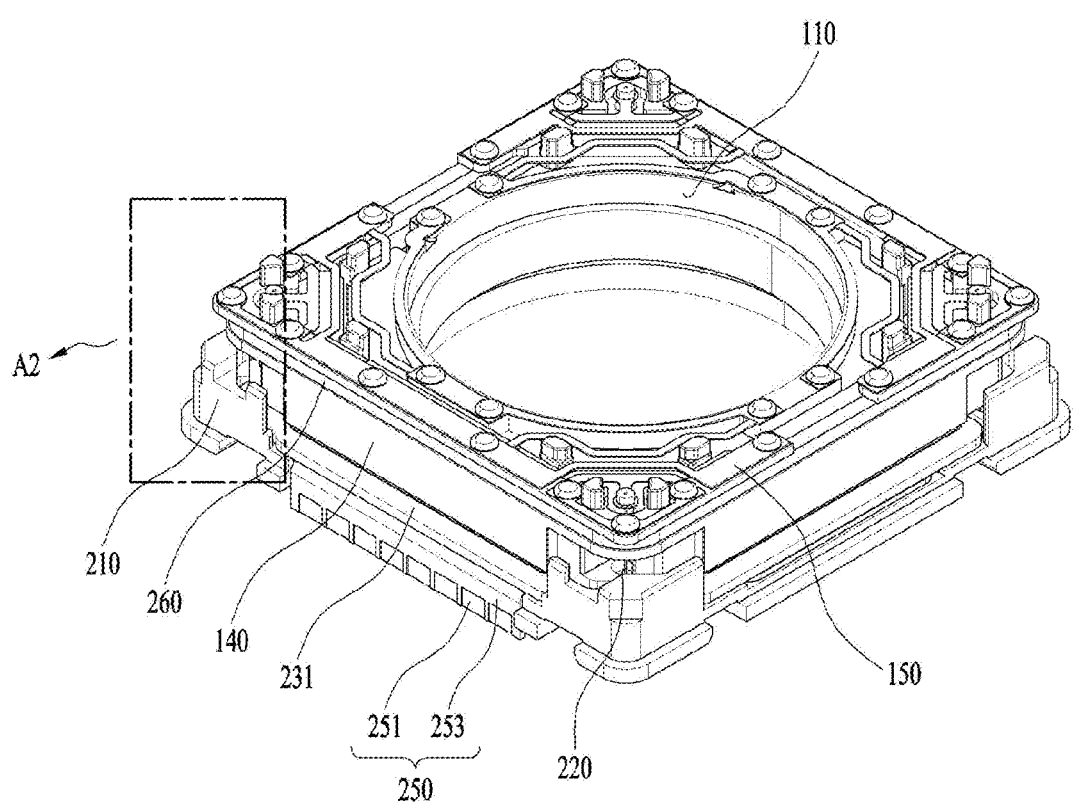

As illustrated in FIGS. 1 and 4, the third coil (260) may be disposed at an outside of the housing. At this time, the third coil (260) may generate an electromotive force in response to mutual induction with the first coil (120) when the bobbin (110) moves to the first direction.

Hence, the lens driving device according to an exemplary embodiment may detect a displacement of bobbin (110) to the first direction by measuring a voltage change in the electromotive force generated by the third coil (260).

Meantime, a means for detecting a displacement of the bobbin (110) to the first direction may be used by other than the third coil (260). For example, the bobbin (110) may be mounted with a magnet for position detection, and a position detection sensor may be disposed on the housing (140) or the cover member (300) to face the magnet, whereby the position detection sensor can detect the displacement of bobbin (110) to the first direction by detecting changes in magnetic force of the magnet.

In another exemplary embodiment, the position detection sensor may be mounted on the lens driving device to allow the position detection sensor to move along with the bobbin (110) to the first direction, and to allow the position detection sensor to detect the changes in the magnetic force of the first magnet so disposed as to face the position detection sensor, whereby the displacement of the bobbin (110) to the first direction may be detected.

The lens driving device according to the exemplary embodiment may further comprise a terminal member (211). The terminal member (211) may be mounted at a bottom surface of base (210) to electrically connect the circuit member (231) and the PCB (250).

At this time, the support member (220) may be coupled at an upper end to the upper elastic member (150) and may be coupled at a bottom end to the terminal member (211). The terminal member (211) may be explained in detail with the following accompanying drawings.

The cover member (300) may be provided in a substantially boxed shape, may accommodate part or all of the mover, the second coil and the PCB, and may be coupled with the base (210). The cover member (300) may protect the mover, the second coil (230) and the PCB (250) accommodated therein against the damages.

Furthermore, the cover member (300) may allow the electromagnetic field to be focused by restricting the electromagnetic field generated from the first magnet (130), the first coil (120) and the second coil (230) additionally accommodated therein from being exposed to an outside.

Figure 2:
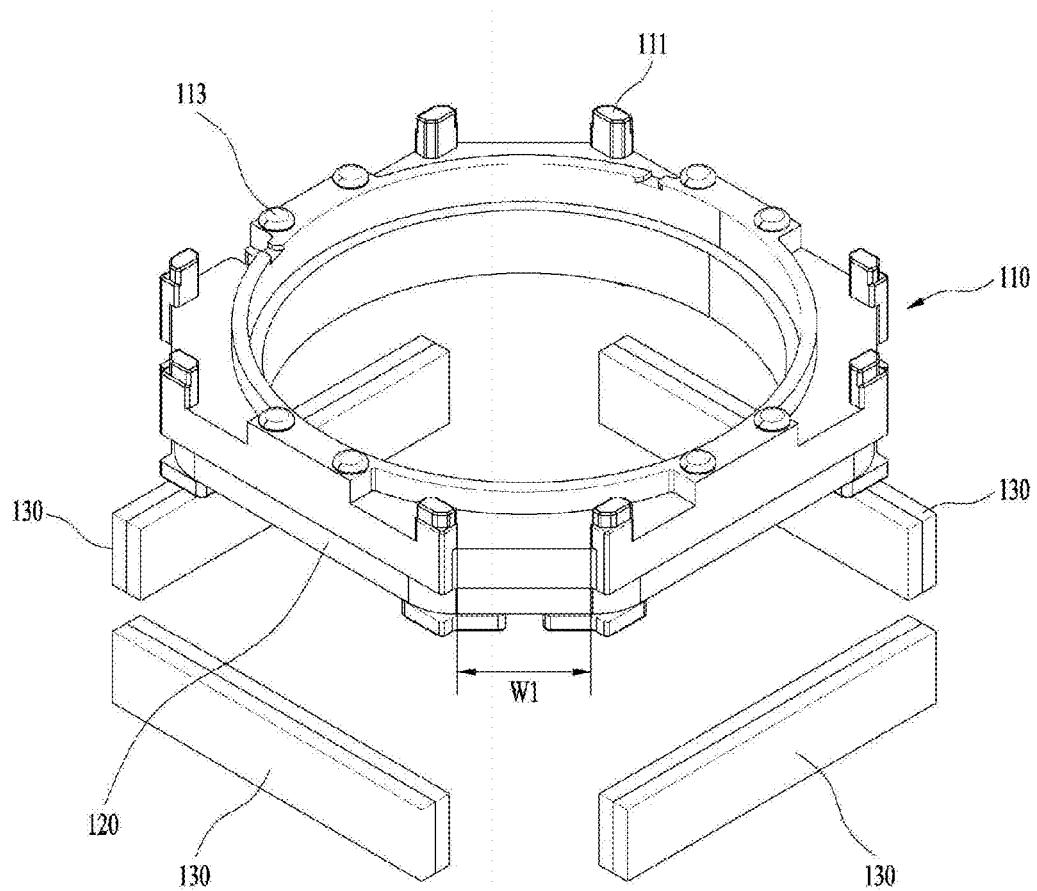

Hereinafter, referring to FIGS. 2 and 3, structures of bobbin (110) and the housing (140) will be explained in more details. FIG. 2 is an exploded perspective view illustrating a bobbin (110) according to an exemplary embodiment of the present invention.

The bobbin (110) may be disposed at an inside of the housing (140) to move to the first direction, i.e., to the z axis direction in response to the electromagnetic interaction between the first coil (120) and the first magnet (130).

The bobbin (110) may have a hollow holed structure in order to mount a lens or a lens barrel. The shape of hollow hole may be round, trapezoidal or polygonal shape. However, the present invention is not limited thereto.

The bobbin (110) may include a first upper support lug (113) and a first protrusion (111). The first upper support lug (113) may be an area where the through hole formed on the upper elastic member (150) is formed. The first upper support lug (113) may be formed in a cylindrical shape or other various shapes to couple the upper elastic member to the bobbin (110) by guiding the upper elastic member (150).

The first protrusion (111) may be formed by being protruded from an upper surface of bobbin (110). The first protrusion (111) may function to inhibit the cover member and the body of bobbin (110) from mutually colliding each other when the bobbin (110) moves to the first direction in order to implement the auto focusing function. That is, the first protrusion (111) may inhibit the cover member and the body of bobbin (110) from mutually and directly colliding when an upper surface of the first protrusion (111) hits a bottom surface of the cover member during generation of outside shock.

When an initial position of bobbin (110) is set at a position where the bobbin (110) cannot descend any more, the auto focusing of the bobbin (110) may be implemented by a single direction control. That is, when a current is supplied to the first coil (120), the bobbin (110) may ascend, and when supply of current is stopped, the bobbin (110) may descend to return to an original initial position whereby the auto focusing function can be implemented.

However, when an initial position of bobbin (110) is set to allow having a discrete distance where the bobbin (110) can descend, the auto focusing of bobbin (110) may be implemented by a bi-directional control. That is, the auto focusing function may be implemented through an operation where the bobbin (110) upwardly or downwardly moves to the first direction.

For example, when a forward current is applied, the bobbin (110) can move to an upper side, and when a reverse current is applied, the bobbin (110) can move to a bottom side.

Figure 3:
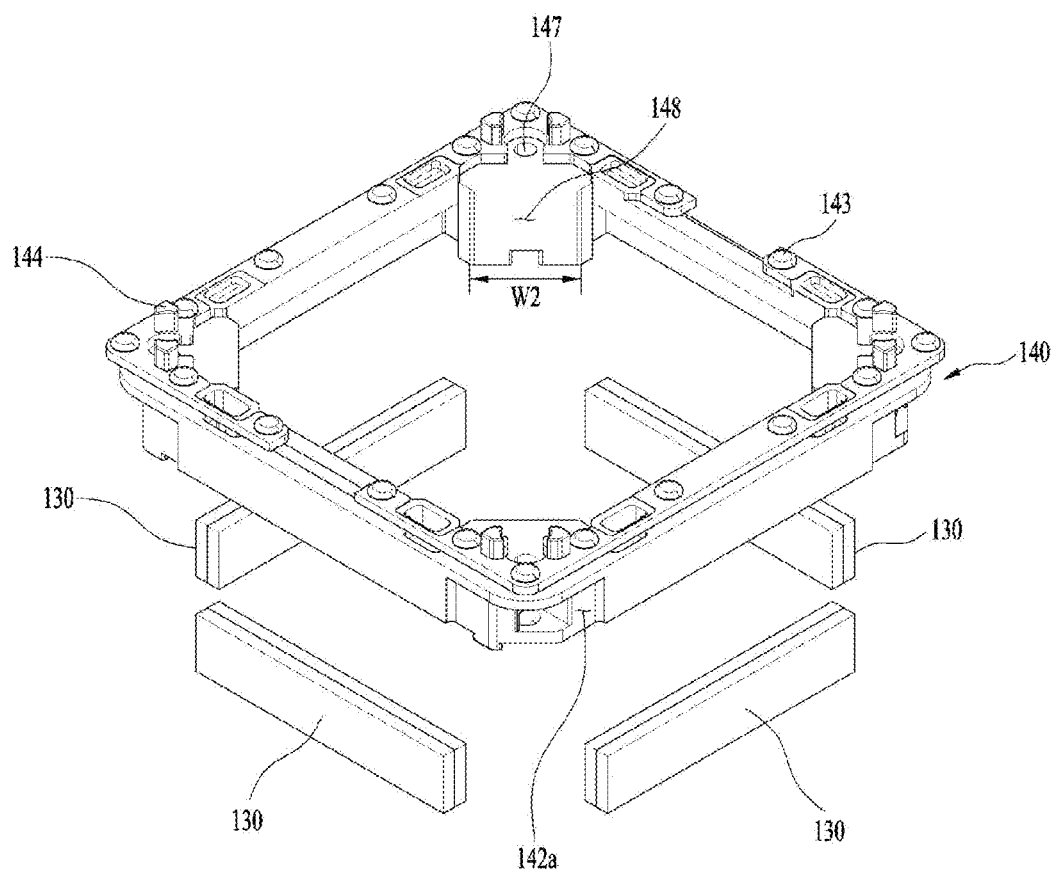

FIG. 3 is a perspective view illustrating a housing (140) according to an exemplary embodiment of the present invention. The housing (140) may support a magnet (130), and may accommodate at an inside the bobbin (110) moving to the first direction.

The housing (140) may substantially take a hollow-holed pillar shape. For example, the housing (140) may have a polygonal (i.e., square or pentagonal shape) or round hollow hole.

The housing (140) may include a second upper support lug (143) and a second protrusion (144). The second upper support lug (143) may be an area where a through hole formed at the upper elastic member (150) is coupled. The second upper support lug (143) may take a cylindrical shape and other various shapes, and may guide the upper elastic member (150) to be coupled to the housing (140).

The second protrusion (144) may be formed by being protruded from an upper surface of housing (140). The second protrusion (144) may function to inhibit the cover member and a body of housing (140) from mutually colliding. That is, the second protrusion (144) may inhibit the cover member and the body of housing (140) from directly and mutually colliding when an upper surface of the second protrusion (144) hits a bottom surface of the cover member during generation of outside shocks.

The housing (140) may include a third protrusion (148) corresponding to a space having a first width (W1) between the first upper support lugs (113) of bobbin (110).

A surface of the third protrusion (148) of housing (140) opposite to the bobbin (110) may have a same shape as a lateral shape of bobbin (110). At this time, the first width (W1) between the first upper support lugs (113) of bobbin (110) illustrated in FIG. 2 and a second width (W2) of the third protrusion (148) of housing (140) illustrated in FIG. 3 may have a predetermined tolerance.

The rotation of bobbin (110) relative to the housing (140) may be restricted by the third protrusion being fitted to the first width (W1) of bobbin (110). As a result, the third protrusion (148) of housing (140) can restrict the rotation of bobbin (110) even if the bobbin (110) receives a force to rotate about an optical axis or an axis parallel to an optical axis.

Furthermore, a corner part of housing (140) may be formed with a first through hole (147). The support member (220) may be connected to the upper elastic member (150) by passing through the first through hole (147).

The housing (140) may be formed at an upper surface with a second upper support lug (143) to be coupled with the upper elastic member (150).

For example, the second upper support lug (143) of housing (140) may be formed at an upper surface of a corner area at the housing (140). The second upper support lug (143) of the housing (140) may take a semi-sphere shape as exemplified, or alternatively may take a cylindrical shape or a pillar shape. However, the present invention is not limited thereto.

Meantime, the housing (140) may be formed with at least one bottom support lug (not shown) at a bottom surface of a corner area of the housing (140) in order to be coupled with the bottom elastic member (160). The bottom support lug may be formed in a shape corresponding to that of a position corresponding to the upper support lug, but the present invention is not limited thereto.

In order to obtain a space for filling a gel-type silicon capable of functioning as a damper, the housing (140) may be formed with a first concave groove (142a) formed at a lateral surface of corner. That is, the first concave groove (142a) of housing (140) may be filled with damping silicon.

Figure 5:
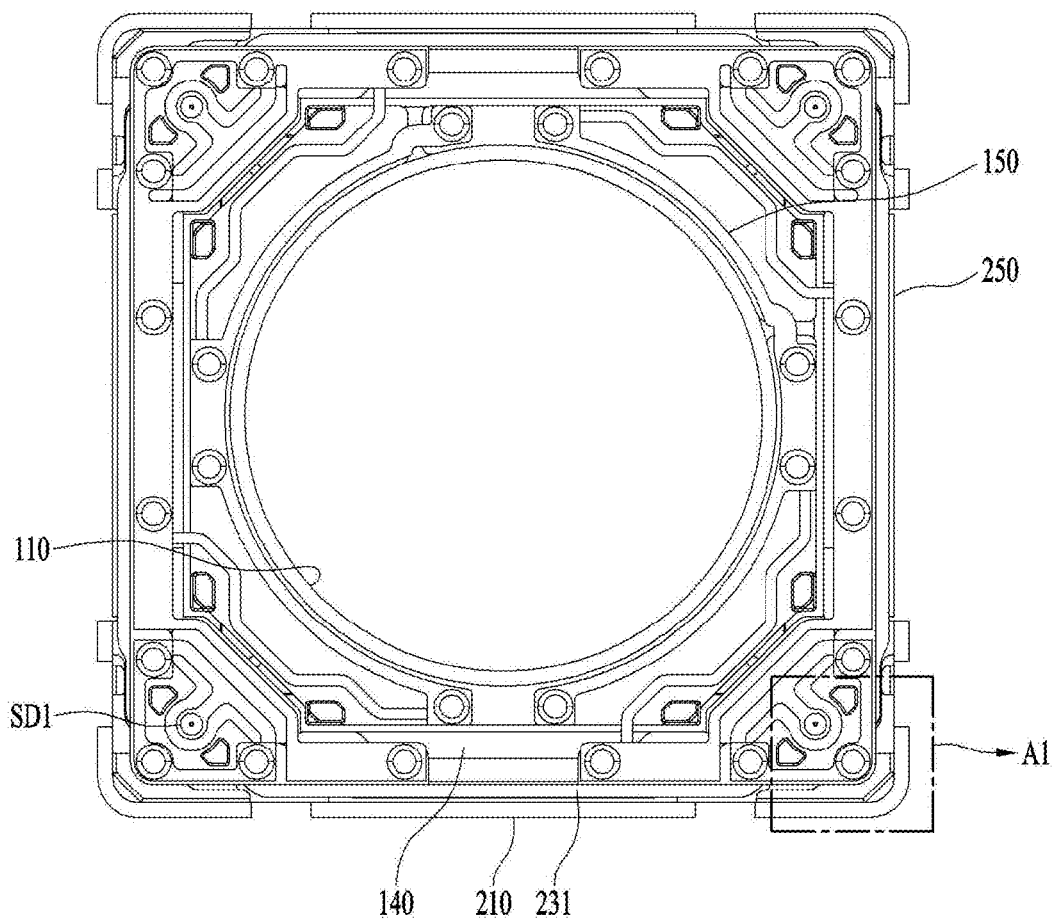
Figure 6:
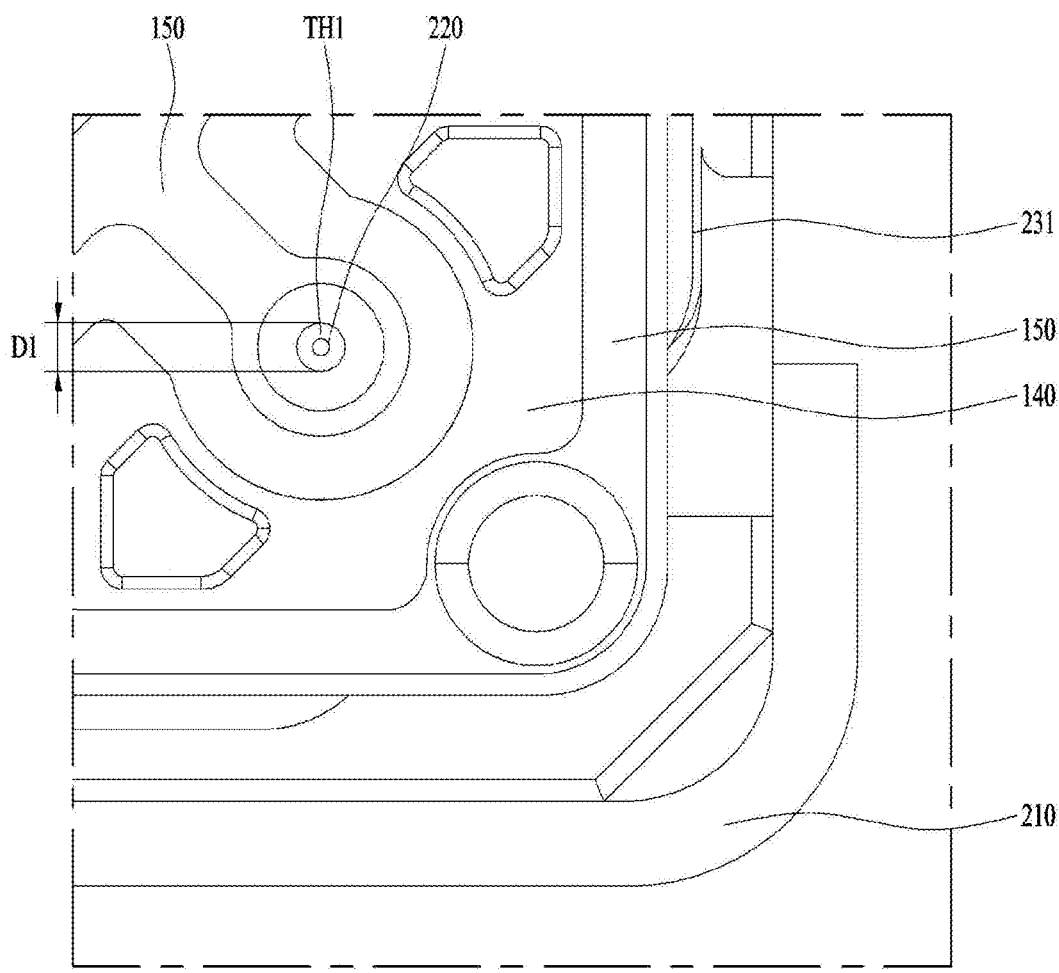

FIG. 4 is a perspective view illustrating a state where a cover member is removed from a lens driving device according to an exemplary embodiment, FIG. 5 is a plane view of FIG. 4, and FIG. 6 is a cross-sectional view of A1 portion of FIG. 5. Meantime, for clear explanation, FIG. 5 illustrates a structure removed of a first soldering part (SD1).

In an exemplary embodiment, the support member (220) may be coupled at an upper end to the upper elastic member (150) and may be coupled at a bottom end to the terminal member (211). The structure where the bottom end of the support member (220) is coupled to the terminal member (211) will be explained hereunder in detail with reference to FIG. 7. A structure where the upper end of the support member (220) is coupled to the upper elastic member (150) will be explained first.

The support member (220) may be formed in a linear shape, and coupled at an upper end to the upper elastic member (150). In order to couple the support member (220) with the upper elastic member (150), the upper elastic member (150) may be formed with a first through hole (TH1) inserted by the support member (220) as illustrated in FIG. 6. At this time, the upper end of the support member (220) and the upper elastic member (150) may be coupled by being mutually soldered.

The first through hole (TH1) may be formed in the same number as that of the support member (220) disposed on the lens driving device. Although the four through holes (TH1) are also disposed with four pieces because four support members (220) are disposed in the exemplary embodiment, it should be apparent that the number thereof can be changed in response to changes in the number of support members (220).

An upper end of support member (220) inserted into the first through hole (TH1) and the upper elastic member (150) may be coupled by being mutually soldered. That is, the support member (220) may pass through the first through hole (TH1) to be coupled by the soldering to an upper surface of the upper elastic member (150).

Toward this end, as illustrated in FIG. 5, the lens driving device may be disposed with a first soldering part (SD1) coupled to an upper surface of support member (220) to couple the support member (220) and the upper elastic member (150).

The first soldering part (SD1) is an area where the upper elastic member (150) and the support member (220) are soldered. Although FIGS. 4 to 6 have illustrated that the first soldering part (SD1) is shaped of a cylindrical pillar, this is merely for an exemplary embodiment and it should be apparent that the first soldering part (SD1) may have various types of shapes.

Meantime, a diameter (D1) of the first through hole (TH1) may be formed to be greater than that of the support member (220). This is to enable an elastic deformation at an area where the support member (220) is inserted into the first through hole (TH1).

Meantime, a diameter (D1) of the first through hole (TH1) may be adequately selected in consideration of the fact that the support member (220) should be elastically deformed on a x-y plane surface without being interrupted when handshake correction function is performed, and the solder should not be excessively introduced in to the first through hole (TH1) when the first soldering part (SD1) is formed by the soldering.

Because of the abovementioned structure, the support member (220) can be elastically deformed at a section from an area inserted into the first through hole (TH1), i.e., an upper surface of the upper elastic member (150) to a bottom surface of the upper elastic member (150). It should be apparent that the section from an upper surface of the upper elastic member (150) to a bottom surface of the upper elastic member (150) may mean a thickness measured of the upper elastic member (150) to the first direction.

That is, the area soldered by the first soldering part (SD1) at the support member (220) is an area where the elastic deformation is not realized or the elastic deformation is drastically restricted, such that the elastic deformation of support member (220) may be possible from a bottom end of the first soldering part (SD1) formed on an upper surface of the upper elastic member (150) when the lens driving device performs the handshake correction function.

As a result, the section of elastic deformation of the support member (220) may be increased as much as a thickness of the upper elastic member (150) to the first direction.

Figure 7:
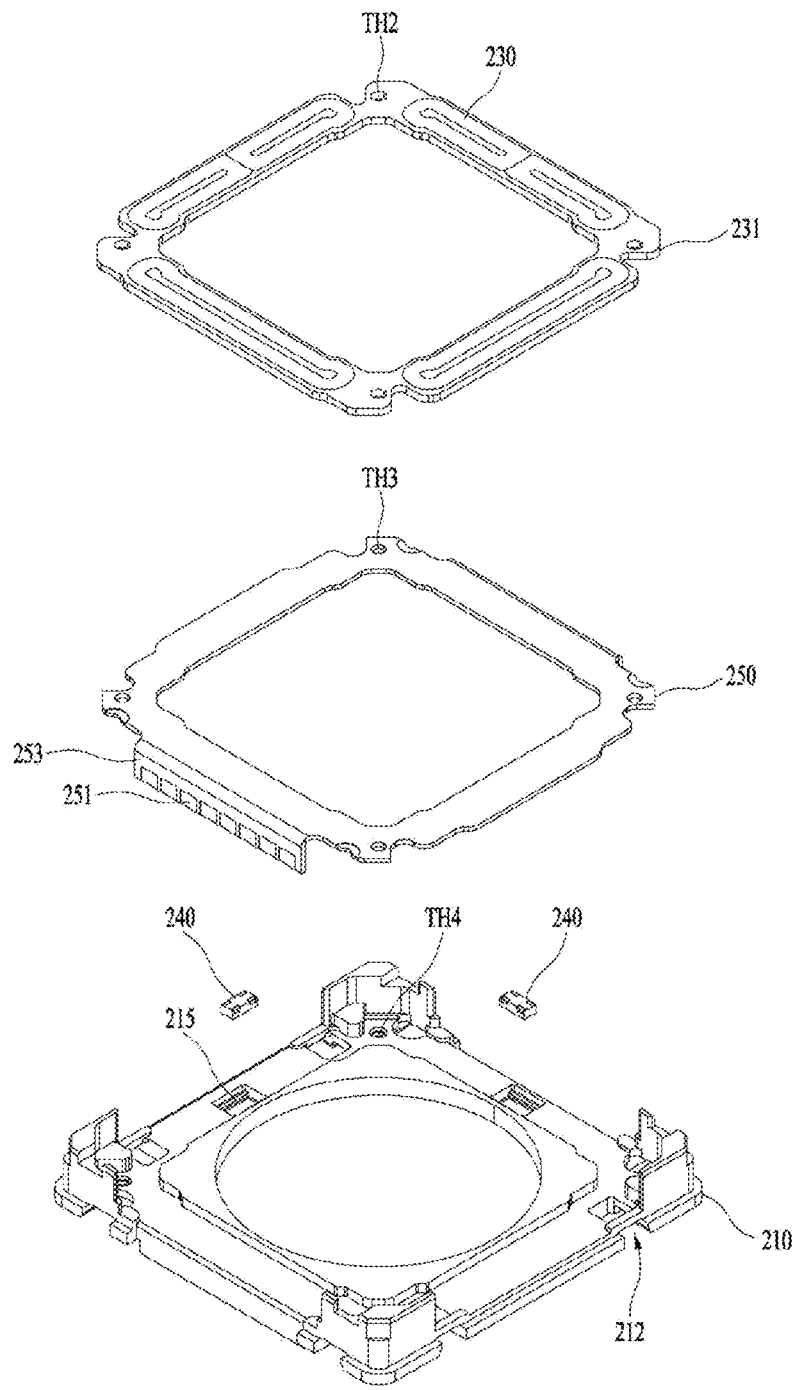

FIG. 7 is a perspective view illustrating structures of circuit member (231), PCB (250) and base (210) in a lens driving device according to an exemplary embodiment of the present invention.

Referring to FIG. 7, the circuit member (231) may be formed with a second through hole (TH2) inserted by the support member (220), the PCB (250) may be formed at an area corresponding to that of the second through hole (TH2) with a third through hole (TH3) inserted by the support member (220). The support member (220) may be coupled to a bottom surface of the terminal member (211) by passing through the second through hole (TH2) and the third through hole (TH3).

Furthermore, the base (210) may be formed at an area corresponding to that of the second through hole (TH2) and the third through hole (TH3) with a fourth through hole (TH4) inserted by the support member (220).

Meantime, because a lengthwise direction of the support member (220) is formed with the first direction, the first through hole (TH1), the second through hole (TH2), the third through hole (TH3) and the fourth through hole (TH4)

may be respectively formed with a same number at an area corresponding to each other to the first direction.

Inasmuch as four support members (220) are disposed in the exemplary embodiment, the second through hole (TH2), the third through hole (TH3) and the fourth through hole (TH4) are also formed with four pieces, but it should be apparent that the number of these through holes may be changed in response to the changed number of support member (220).

Referring to FIG. 7, the lens driving device may further comprise a second sensor (240). The second sensor (240) may be mounted on the base (210) to face the second coil (230) to detect the displacement of housing (140) to the second direction perpendicular to the first direction and the third direction.

The second sensor (240) may be provided with a Hall sensor, and may be with any sensor capable of detecting changes in the magnetic force. The second sensor (240), as illustrated in FIG. 7, may be disposed at the base (210) disposed at a bottom side of the PCB (250). For example, the second sensor (240) may be so disposed as to be inserted into a reception groove (215) formed at the base (210).

Meantime, the second sensor (240) may be disposed at a bottom side of second coil by being spaced apart at a predetermined distance from the PCB (250). That is, the second sensor (240) is not directly connected to the second coil (230), and instead, an upper surface may be disposed with the second coil (230) based on the PCB (250), and the second sensor may be disposed at a bottom surface.

Figure 8:
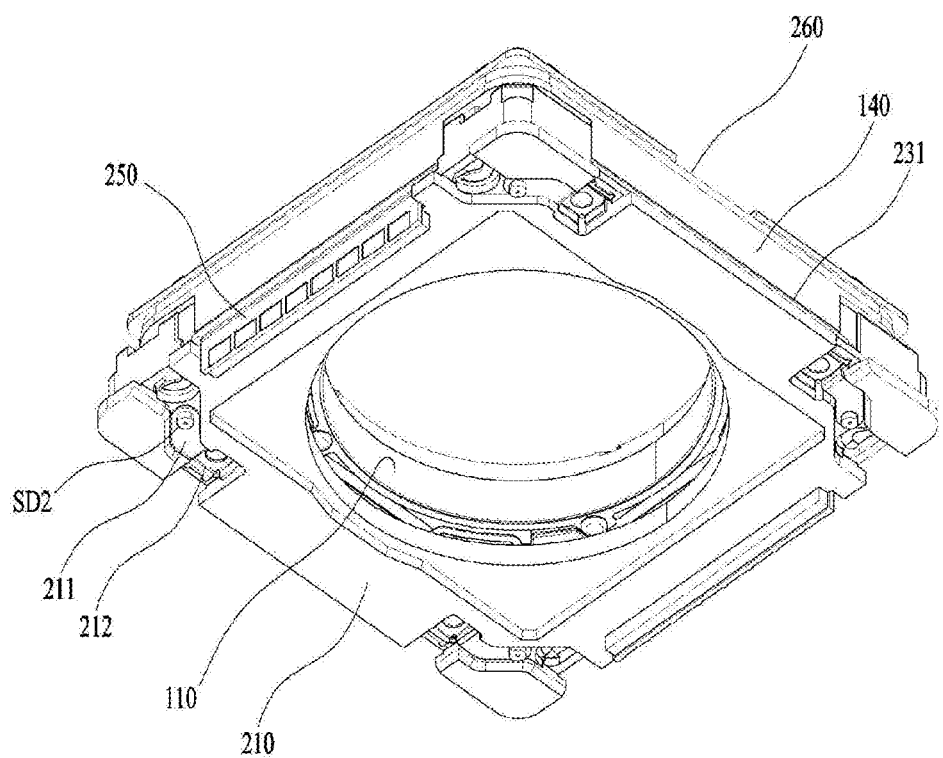
Figure 9:
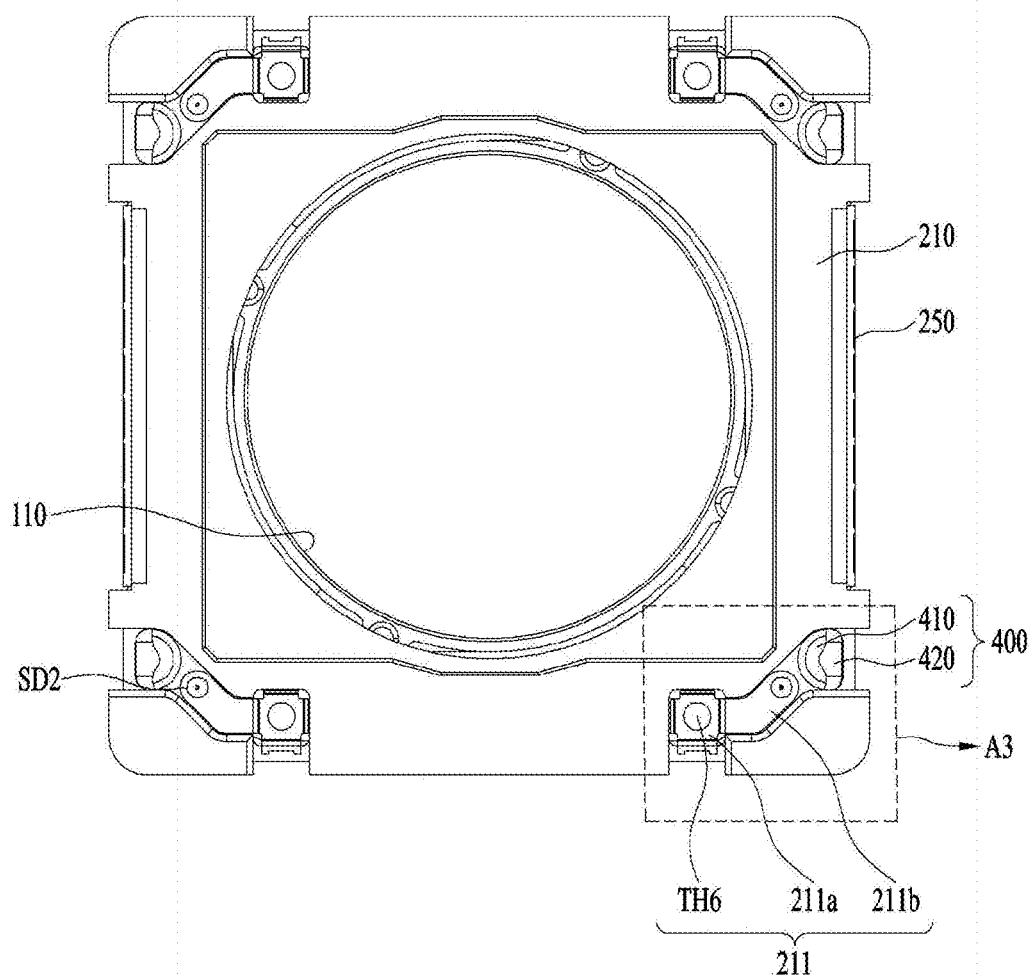
Figure 10:
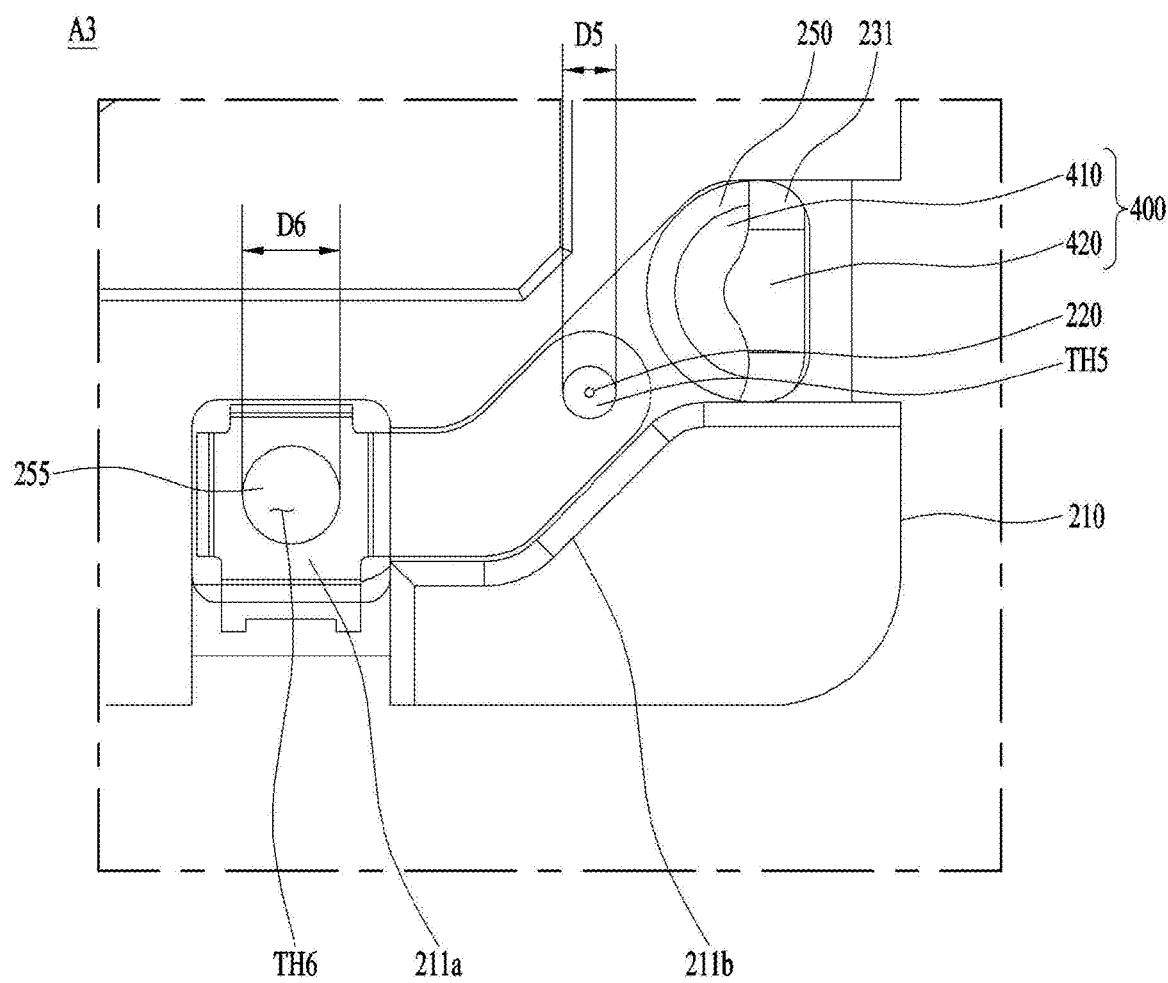
Figure 11:
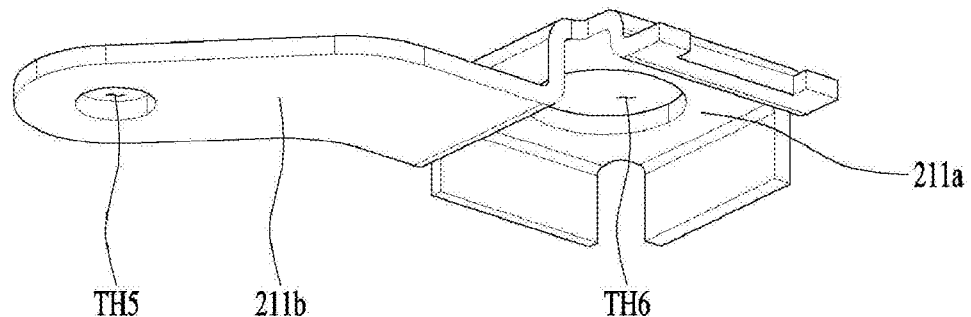

FIG. 8 is a bottom perspective view of FIG. 4, FIG. 9 is a bottom view of FIG. 4, FIG. 10 is an enlarged view of A3 portion of FIG. 9, and FIG. 11 is a perspective view illustrating a terminal member according to an exemplary embodiment of the present invention. Meantime, FIG. 10 illustrates a structure where the second soldering part (SD2) is removed in order to clearly explain the drawing.

The terminal member (211) may be disposed at a bottom surface of base (210). To this end, the base (210) may be formed at a bottom surface with a first recess part (212) mounted with the terminal member (211). The terminal member (211) may electrically connect the circuit member (231) and the PCB (250) and may be coupled with the support member (220).

Thus, the terminal member (211) may be mounted at a corner part of base (210) which is an area corresponding to the support member (220), i.e., at an edge area, whereby the first recess part (212) may be also formed at a bottom edgy area of base (210).

The terminal member (211) may be mounted at a bottom surface of base (210), may be coupled to the base (210) using an adhesive, or may be coupled to the base (210) by manufacturing the base (210) using an insert injection method.

The support member (220) may be coupled at a bottom end to the terminal member (211) using a soldering. Thus, the lens driving device may be disposed with a second soldering part (SD2) coupled to a bottom surface of the terminal member (211) to thereby couple the support member (220) to the terminal member (211).

The second soldering part (SD2) may be an area where the terminal member (211) and the support member (220) are soldered. Although FIGS. 8 to 10 have illustrated that the second soldering part (SD2) takes a cylindrical pillar shape, this illustration is a mere example and it should be apparent that the second soldering part (SD2) may take various shapes.

As illustrated in FIGS. 10 and 11, the terminal member (211) may be formed with an electrically conductive material, and may include a first connector (211a) and a second connector (211b). The first connector (211a) may be electrically connected to the PCB (250), and the second connector (211b) may be electrically connected to the support member (220).

Furthermore, as illustrated in FIGS. 10 and 11, the first connector (211a) may be disposed to be nearer to the PCB (250) to the first direction than the second connector (211b).

The support member (220) may be coupled at a bottom end to a bottom surface of the terminal member (211) by passing through the terminal member (211). In order to couple the second connector (211b) and the support member (220), the second connector (211b) may be formed at an area corresponding to the fourth through hole (TH4) with a fifth through hole (TH5) inserted by the support member (220).

Thus, the support member (220) may be coupled to a bottom surface of the second connector (211b) by passing through the fifth through hole (TH5) by way of soldering method. Toward this end, as illustrated in FIG. 9, the lens driving device may be further disposed with a second soldering part (SD2) to couple the support member (220) with the second connector (211b) and to be coupled to a bottom surface of the second connector (211b).

The second soldering part (SD2) may be an area where the second connector (211b) of terminal member (211) and the support member (220) are soldered. Although FIGS. 8 and 9 have illustrated that the second soldering part (SD2) takes a cylindrical pillar shape, it should be apparent that it is merely an example and other various types of shapes may be formed for the second soldering part (SD2).

The first connector (211a) may be an area at the terminal member (211) electrically connected with the PCB (250). To this end, as illustrated in FIGS. 10 and 11, the PCB (250) may be formed at a bottom surface with a first terminal (255) for electrical connection with the terminal member (211). Furthermore, the first connector (211a) may be formed at an area corresponding to the first terminal (255) with a sixth through hole (TH6) and the first connector (211a) may be coupled with the first terminal (255).

At this time, a diameter (D6) and shape of the sixth through hole (TH6) may be adequately selected in consideration of the size of the first connector (211a), and for example, the diameter of the sixth through hole (TH6) may be in the range of 0.1 mm to 0.5 mm in a round shape, and may be 0.4 mm in a round shape, to be more adequate. However, the diameter (D6) and shape of the sixth through hole (TH6) are not limited thereto.

For example, when the sixth through hole (TH6) is filled with conductive adhesive agent or filled with solders through the soldering while the terminal member (211) is mounted on the base (210), the terminal member (211) and the first terminal (255) of the PCB (250) may be mutually coupled and electrically connected.

Figure 12:
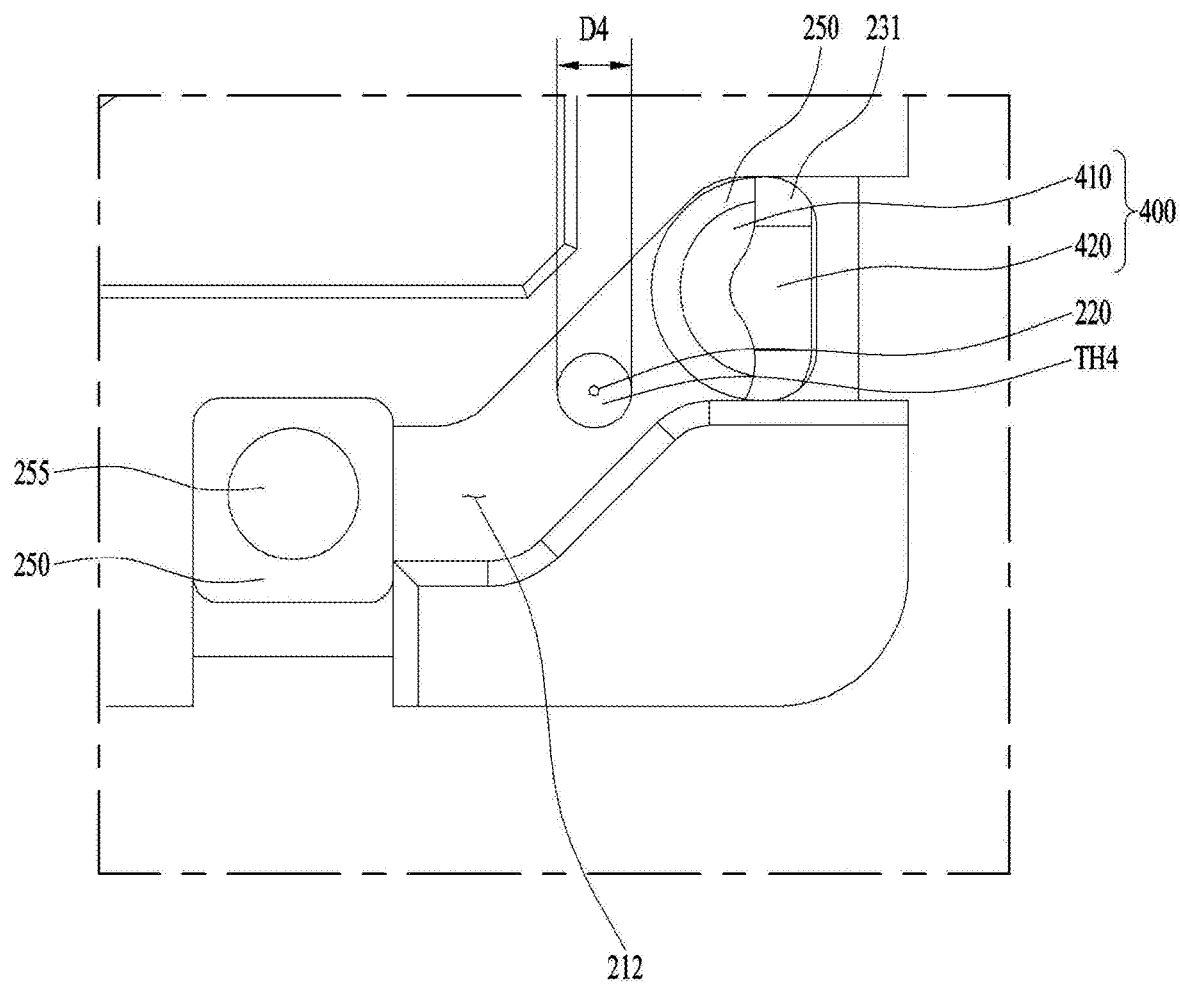

FIG. 12 is a schematic view illustrating a state where the terminal member (211) is removed in FIG. 10. As illustrated in FIGS. 10 and 12, a diameter (D5) of fourth through hole (TH4) and a diameter of fifth through hole (TH5) may be formed to be greater than that of support member (220), which is to enable an easy elastic deformation of the support member (220) at an area where the fourth through hole (TH4) and the fifth through hole (TH5) are inserted.

The first terminal (255) may be formed at a bottom surface of PCB (250). Although FIG. 12 has illustrated that the first terminal (255) is round, the present invention is not limited thereto, and the first terminal (255) may be formed in various shapes including a closed curved shape including an oval type and other polygonal shapes including a multi-angled shape.

A surface area of first terminal (255) may be formed to be greater than that of the sixth through hole (TH6) that is disposed opposite thereto. An area not facing the sixth through hole (TH6) in the first terminal (255) is made to directly contact an upper surface of the first connector (211a) to allow increasing a contact surface between the first connector (211a) and the first terminal (255), whereby an electrical connection between the first terminal (255) and the first connector (211a) can be further promoted and secured.

As illustrated in FIGS. 10 and 12, the lens driving device may further comprise a first connection part (400). The first connection part (400) may be disposed at a corner part between the PCB (250) and the circuit member (231) to electrically connect the PCB (250) and the circuit member (231). The substrate may include the circuit member (231) and the PCB (250).

The first connection part (400) may include a second terminal (410) and a third terminal (420). The second terminal (410) may be formed on the PCB (250) in a "C" shape or a semi-circular shape, for example. The third terminal (420) may be disposed at the circuit member (231) on an area corresponding to that of the second terminal (410).

The second terminal (410) may be so disposed as to encompass a portion of an upper surface, a bottom surface and a lateral surface of PCB (250), such that when the circuit member (231) is mounted on an upper surface of PCB (250), the second terminal (410) and the third terminal (420) can be mutually contacted.

The mutual contact between the second terminal (410) and the third terminal (420) may enable the PCB (250) and the circuit member (231) to be electrically connected, and allow a current to flow from the PCB (250) to the circuit member (231).

The PCB (250) and the circuit member (231) may be electrically connected more securely by mutually soldering the second terminal (410) and the third terminal (420) or by coupling the second terminal (410) and the third terminal (420) with a conductive adhesive agent.

Figure 13:
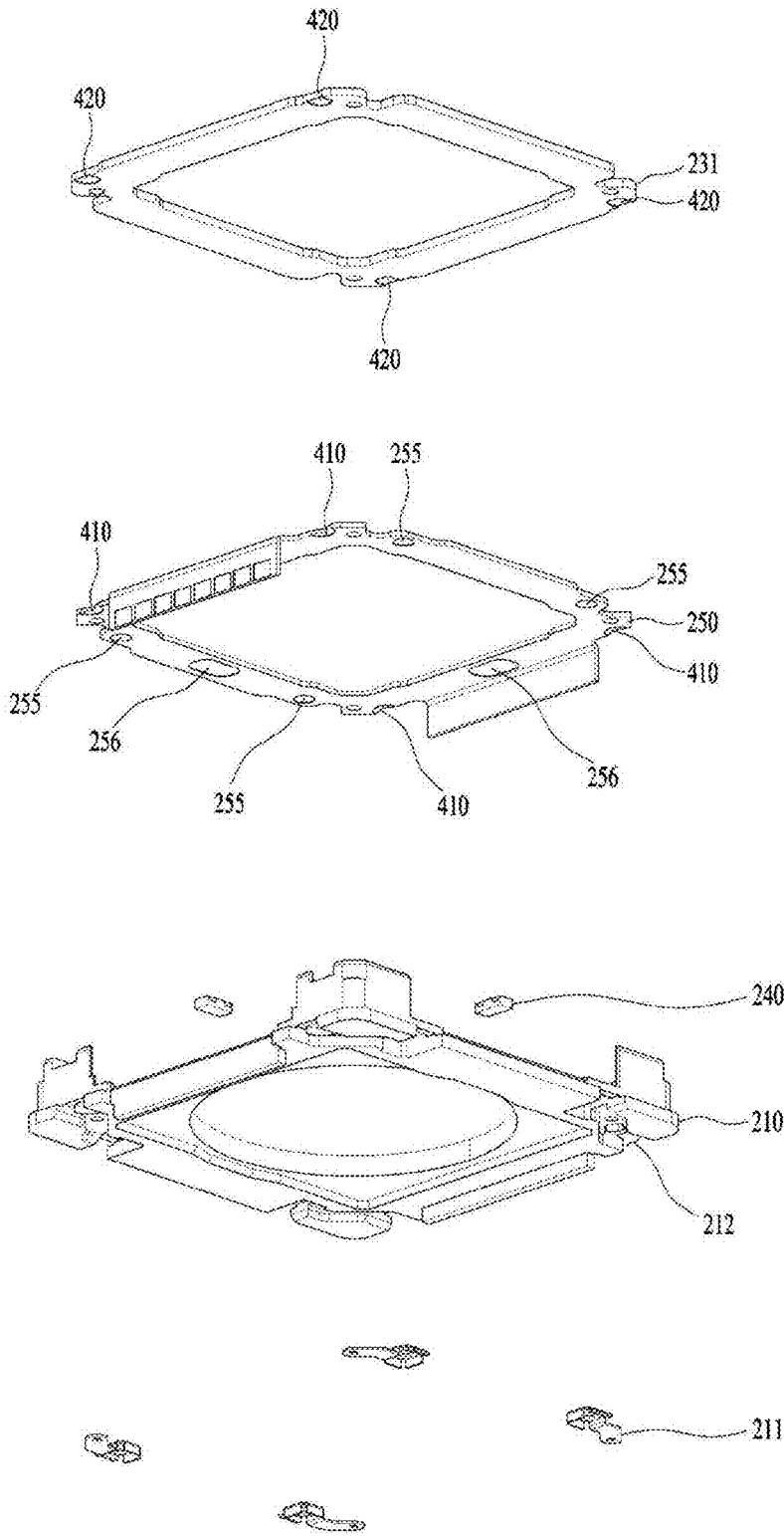

FIG. 13 is a perspective view illustrating structures of PCB (250), base (210) and terminal member (211) in a lens driving device according to an exemplary embodiment of the present invention. As illustrated in FIG. 13, the PCB (250) may be formed with a fourth terminal (256).

The fourth terminal (256) may be arranged or disposed at a bottom surface of PCB (250) so as to face the second sensor (240). The fourth terminal (256) may electrically connect the PCB (250) and the second sensor (240). The fourth terminal (256) may be formed to take any shape as long as the fourth terminal (256) can electrically connect the second sensor (240) and the PCB (250). The second sensor (240) may be fixed with the third terminal (420) using a conductive adhesive agent and soldering.

When the base (210) is mounted with the second sensor (240) and the PCB (250), the second sensor (240) may be electrically connected with the PCB (250) the fourth terminal (256), whereby a current may be applied to the second sensor (240) from the PCB (250).

Meantime, the second terminal (410) in the exemplary embodiment illustrated in FIG. 13 may be disposed, one each on a corner area of the circuit member (231), thus, a total of four second terminals may be disposed, and the third terminal (420) may be disposed, one each on a corner area of the PCB (250), but the present invention is not limited thereto.

That is, as long as the second terminal (410) and the third terminal (420) are mutually corresponded, and same number is mounted, the number and position of the second terminal (410) and the third terminal (420) are variably selected.

Figure 14:
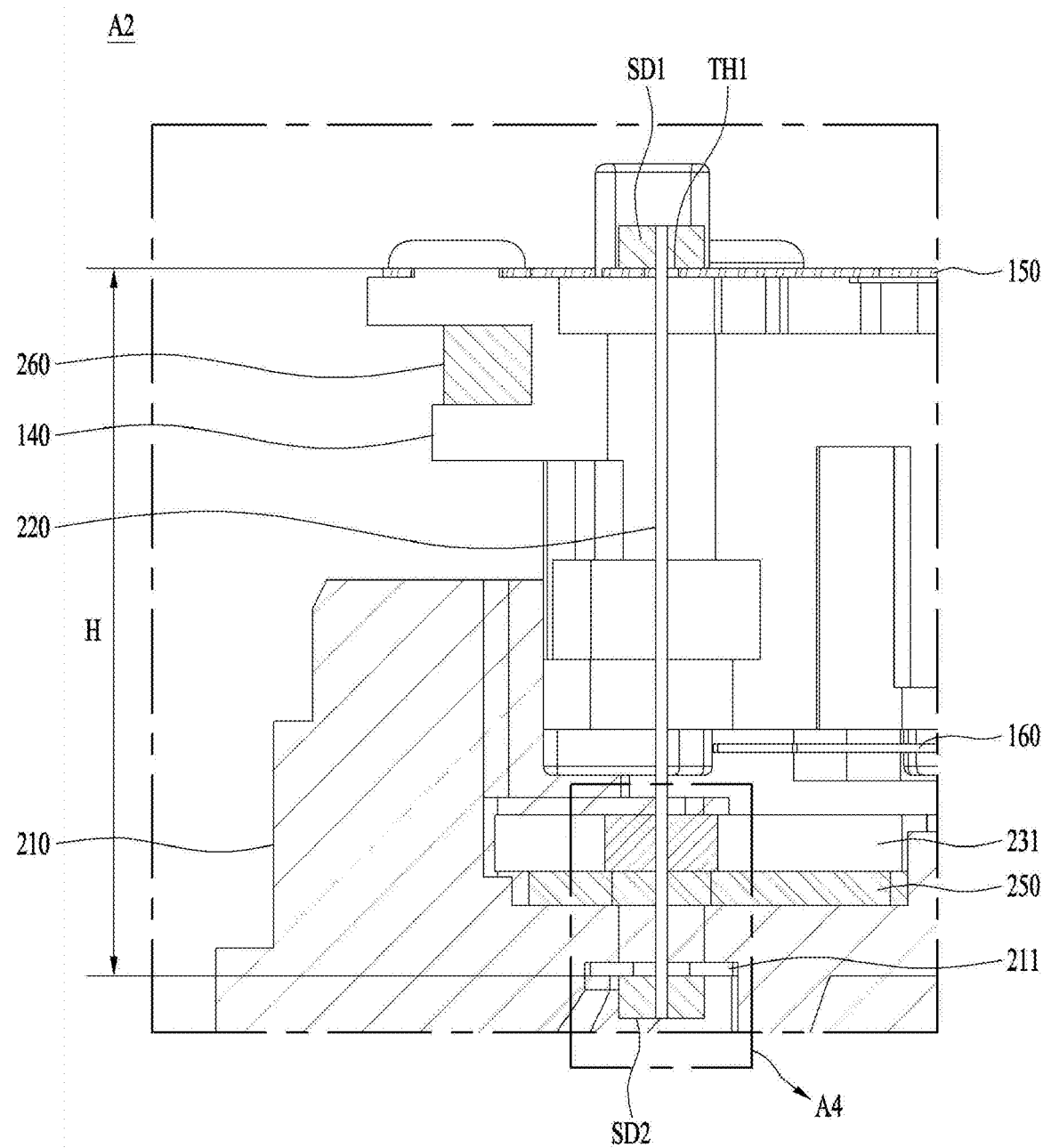
Figure 15:
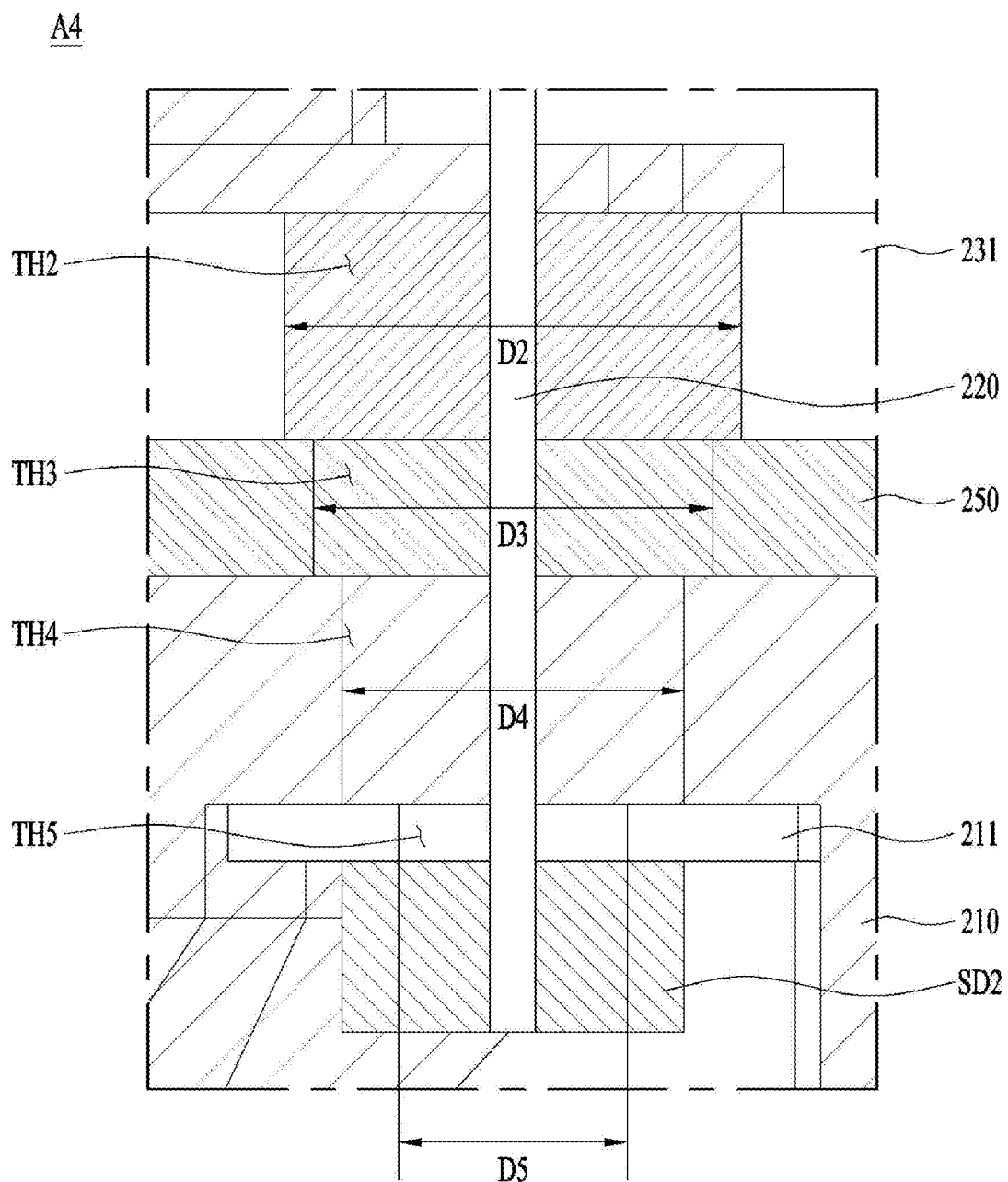

FIG. 14 is a cross-sectional view illustrating A2 portion of FIG. 4. FIG. 15 is an enlarged view illustrating A4 portion of FIG. 14.

As illustrated in FIG. 14, the support member (220, 220) may be coupled at a bottom end to the terminal member (211). For example, the bottom end of the support member (220) may be coupled to the terminal member (211) by being soldered to the terminal member (211).

As illustrated in FIGS. 13 and 15, the circuit member (231) may be formed with a second through hole (TH2) inserted by the support member (220), and the PCB (250) may be formed at an area corresponding to that of the second through hole (TH2) with a third through hole (TH3) inserted by the support member (220).

Furthermore, as illustrated in FIG. 15, the base (210) may be formed at an area corresponding to that of the third through hole (TH3) with a fourth through hole (TH4) inserted by the support member (220), and the terminal member (211) may be formed at an area corresponding to that of the fourth through hole (TH4) with a fifth through hole (TH5) inserted by the support member (220).

The support member (220) may be coupled to a bottom surface of terminal member (211) by passing through the second through hole (TH2) to the fifth through hole (TH5). At this time, the second soldering part (SD2) may couple the support member (220) and the terminal member (211) by being soldered to a bottom surface of terminal member (211).

A diameter (D3) of second through hole (TH2) and third through hole (TH3) may be formed to be greater than that of the support member (220), which is to enable an easy elastic deformation of support member (220) at an area where the second through hole (TH2) and the third through hole (TH3) are inserted thereby.

Furthermore, diameter (D2) of the second through hole (TH2) may be formed to be greater than that (D3) of the third through hole (TH3), which is due to the fact that width of elastic deformation of support member (220) on the x-y plane surface is greater on the second through hole (TH2) than on the third through hole (TH3).

A diameter (D5) of fourth through hole (TH4) and fifth through hole (TH5) may be formed to be greater than that of the support member (220), which is, just like what is mentioned above, to enable an easy elastic deformation of support member (220) at an area where the fourth through hole (TH4) and the fifth through hole (TH5) are inserted thereby.

Furthermore, diameter (D4) of the fourth through hole (TH4) may be formed to be greater than that (D5) of the fifth through hole (TH5), which is, just like what is mentioned above, due to the fact that width of elastic deformation of support member (220) on the x-y plane surface is greater on the fourth through hole (TH4) than on the fifth through hole (TH5).

Furthermore, a diameter (D3) of third through hole (TH3) may be formed to be greater than that of the fourth through hole (TH4), which is, just like what is mentioned above, due to the fact that width of elastic deformation of support member (220) on the x-y plane surface is greater on the third through hole (TH3) than on the fourth through hole (TH4).

Therefore, as illustrated in FIG. 15, each diameter of through holes may be formed to be gradually smaller from the fifth through hole (TH5) to the second through hole (TH2), for example.

An area of the support member (220) soldered by the second soldering part (SD2) may not be elastically deformed or may be drastically restricted, such that when the lens driving device implements the handshake correction function, the elastic deformation of support member (220) may be performed from an upper end of the second soldering part (SD2) formed at a bottom surface of terminal member (211).

Through this structure, an elastic deformation section of the support member (220) may be increased to the first direction over a structure where the support member (220) is soldered to the circuit member (231) or to the PCB (250).

In the exemplary embodiment, an elastic deformation section for the support member (220) to implement the handshake correction function may be a section between the first soldering part (SD1) and the second soldering part (SD2). That is, as illustrated in FIG. 14, the support member (220) may perform the elastic deformation for handshake correction function at a first section (H) between an upper surface of the upper elastic member (150) and a bottom surface of the terminal member (211).

In the exemplary embodiment, an entire length of the lens driving device to the first direction can be shortened by elongating a length to the first direction of elastic deformable area of the support member (220), i.e., by elongating the elastic deformable section of the support member (220).

In other words, an entire length to the first direction of the lens driving device can be shortened as much as the elongated length of elastic deformable section of support member (220) according to the exemplary embodiment. As a result, the lens driving device can be entirely manufactured in a slim structure.

Meantime, as the elastic deformable section is increased, an angle for the support member (220) to be slanted to the first direction, i.e., a tilt angle, can be reduced during the implementation of handshake correction function.

As the tilt angle is decreased, screen quality degradation of image that may be generated by excessive tilt of bobbin (110) to the first direction during handshake correction function can be restricted.

Meantime, the lens driving device according to the above-mentioned exemplary embodiment can be used for various fields such as camera modules. The camera modules may be applicable to mobile devices such as mobile phones, for example.

A camera module according to an exemplary embodiment of the present invention may include a lens barrel coupled with the bobbin (110) and an image sensor (not shown). At this time, the lens barrel may include at least one sheet of lens that transmits an image to the image sensor. Furthermore, the camera module may further include an infrared cut-off filter (not shown). The infrared cut-off filter may function to shield a light of infrared range from entering the image sensor.

In this case, the infrared cut-off filter may be formed at an area corresponding to that of the image sensor at the base (210) exemplified in FIG. 1, and may be coupled with a holder member (not shown). Furthermore, the holder member may support a bottom side of the base (210).

Meantime, the base (210) may function as a sensor holder protecting the image sensor, and in this case, may be formed with a protrusion to a bottom side direction along a lateral surface of base (210). However, the configuration is not an essential element, and albeit not being illustrated, a separate sensor holder may be disposed at a bottom surface of base (210) for function thereof.

Figure 16:
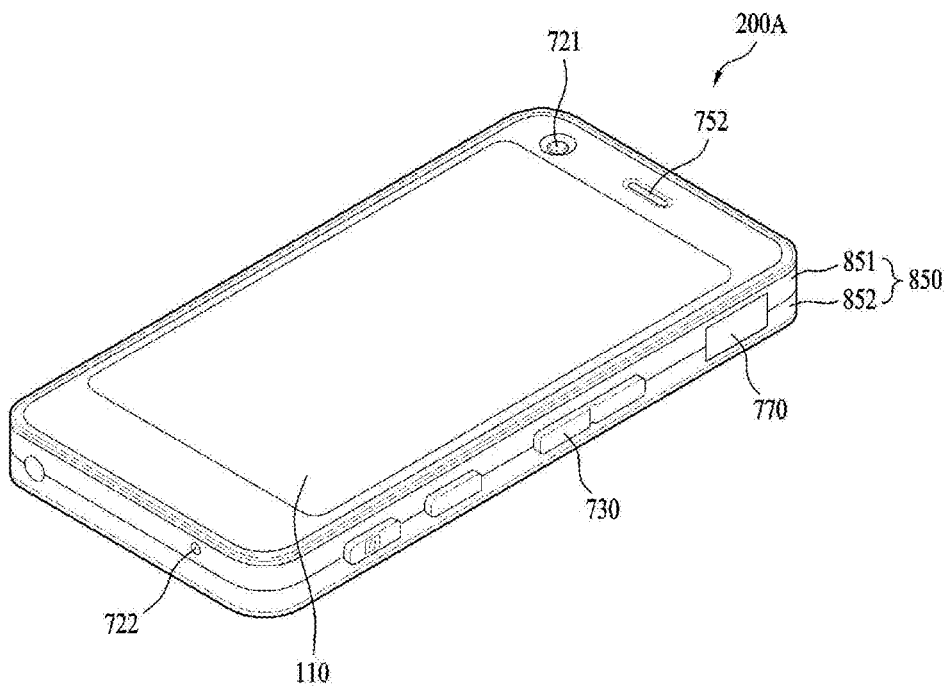
Figure 17:
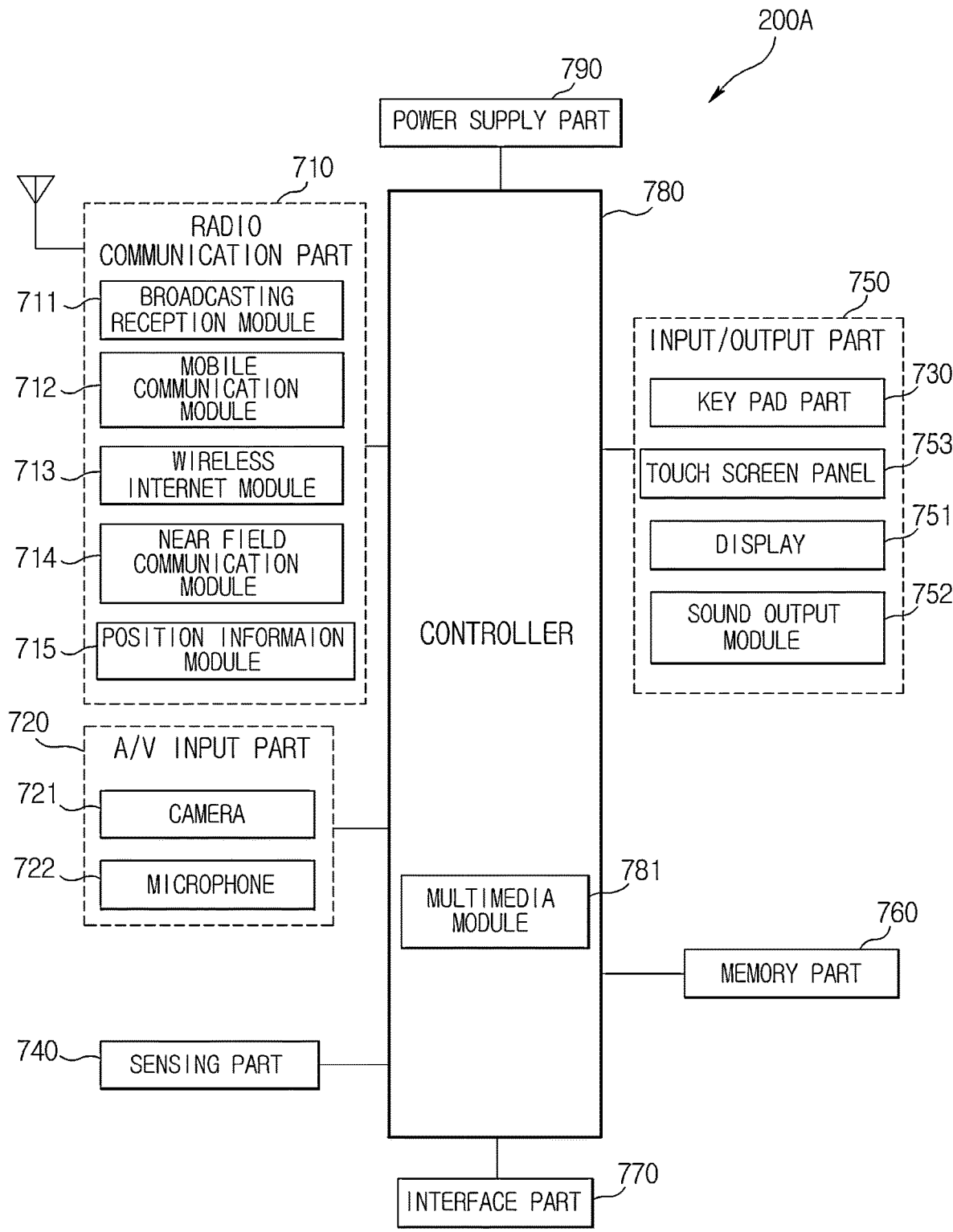

FIG. 16 is a perspective view illustrating a portable device (200A) according to an exemplary embodiment of the present invention, and FIG. 17 is a block diagram illustrating a portable device of FIG. 16.

Referring to FIGS. 16 and 17, a portable device (200A, hereinafter referred to as "device") may include a body part (850), a wireless communication part (710), an A/V (Audio/Video) input part (720), a sensing part (740), an input/output part (750), a memory part (760), an interface part (770), a controller (780) and a power supply part (790).

Various electronic elements of device may be inherently disposed at a space between a front case (851) and a rear case (852) of body part (850).

The wireless communication part (710) may be formed by including a broadcasting reception module (711), a mobile communication module (712), a wireless internet module (713), a near field communication module (714) and a position information module (715).

The A/V input part (720) is disposed to perform the function of inputting an audio signal or a video signal, and may include a camera (721) and a microphone (722). The camera (721) may include a camera including the lens driving device (100) according to an exemplary embodiment of the present invention.

The sensing part (740) may generate a sensing signal for controlling the operation of device (200A) by detecting a current state of device (200A) such as open/close state and position of device (200A), contact with user, azimuth of device (200A) and acceleration/deceleration of device (200A). Furthermore, the sensing part (740) may take charge of sensing functions such as power supply of power supply part (790) and coupled state of interface part (770) with outside devices.

The input/output part (750) is to generate an input or output related to visual sense, audio sense or tactic sense. The input/output part (750) may generate an input data for operation control of device (200A), and may display information processed by the device (200A) as well.

The input/output part (750) may include a key pad part (730), a display module (751), a sound output module (752) and a touch screen panel (753). The key pad part (730) may generate an input data in response to a key pad input.

The display module (751) may include a plurality of pixels that changes colors in response to an electric signal. The sound output module (752) may output an audio data such as signal reception, call mode, recording mode, voice recognition mode or broadcasting reception received from the wireless communication part (710) or output an audio data stored in the memory part (760).

The touch screen panel (753) may convert changes in capacitance generated by a user's touch relative to a particular region on a touch screen to an electric input signal. The memory part (760) may store programs for processing and controlling of the controller (780), input/output data and images photographed by the camera (721).

The interface part (770) may receive data from outside devices, transmit a power to each element inside the device (200A) by receiving the power from outside, or transmit inside data of device (200A) to outside devices. The controller (780) may control an entire operation of device (200A). The controller (780) may include a panel control part (144) of a touch screen panel driving part illustrated in FIG. 1, or may perform a function of panel control part (144).

The controller (780) may include a multimedia module (781) for multimedia reproduction. The controller (780) may implement a pattern recognition process in which writing input or drawing input performed on a touch screen is recognized as a character and an image respectively.

The power supply part (790) may supply a power necessary for operation of each element by receiving an outside power in response to control of the controller (780), or receiving an inside power.

Although several exemplary embodiments have been described as noted above, various other types of exemplary embodiments may be implemented than is described in the foregoing, and the above exemplary embodiments may be combined in various combinations through which new exemplary embodiments may be implemented unless the abovementioned exemplary embodiments are mutually incompatible, FIGS. 18 to 28 illustrate a second exemplary embodiment of the present invention.

"Optical axis direction" used hereinafter is defined as an optical axis direction of a lens module while being coupled to a lens driving device. Meantime, the "optical axis direction" may be interchangeably used with horizontal direction and z axis direction and the like.

"Auto focus function" hereinafter used may be defined as a function of matching a focus to a subject by adjusting a distance to an image sensor by moving a lens module to an optical axis direction in response to a distance to the subject in order to obtain a clear image of the subject on the image sensor. Meantime, "auto focus" may be interchangeably used with "AF (Auto Focus)".

Hereinafter, any one of an AF coil (1220), a driving magnet (1320) and an OIS coil (1430) may be called a "first driving part", another called a "second driving part" and still another called a "third driving part".

Hereinafter, any one of an AF coil (1220), an OIS coil (1430) and a sensing coil (1710) may be called a "first coil", another called a "second coil" and still another called a "third coil".

Hereinafter, any one of an AF support member (1500) and an OIS support member (1600) may be called a "first support member" and another called a "second support member".

Hereinafter, although the AF support member (1500) is explained as being distinguished from a mover (1200, 1300), the AF support member (1500) may be explained as one element of movers (1200, 1300), because the AF support member (1500) is also a member that integrally moves along with the movers (1200 1300) during OIS driving.

Now, a configuration of an optical device according to an exemplary embodiment of the present invention will be described hereinafter.

The optical device according to an exemplary embodiment of the present invention may be a hand phone, a mobile phone, a smart phone, a portable smart device, a digital camera, a notebook computer (laptop computer), a digital broadcasting terminal, a PDA (Personal Digital Assistance), a PMP (Portable Multimedia Player) and a navigation device. However, the present invention is not limited thereto, and may include any device capable of photographing an image or a photograph.

The optical device according to an exemplary embodiment of the present invention may include a main body (not shown), a display part (not shown) disposed at one surface of main body to display information, and a camera (not shown) having a camera module and disposed at the main body to photograph an image or a photograph. Hereinafter, a configuration of camera module according to the exemplary embodiment of the present invention will be described.

The camera module may further include a lens driving device, a lens module (not shown), an infrared filter (not shown), a PCB (Printed Circuit Board, not shown), an image sensor (not shown), and a controller (not shown).

The lens module may include one or more lenses (not shown). The lens module may include a lens and a lens barrel (not shown). However, one element of the lens module is not limited by the lens barrel, and any holder structure capable of supporting one or more lenses will suffice. The lens module may be coupled to the lens driving device to move along with a portion of the lens driving device. The lens module may be coupled to an inside of the lens driving device. The lens module may be screw-coupled with the lens driving device. The lens module may be screw-coupled with the lens driving device using an adhesive (not shown). Meantime, a light having passed the lens module may be irradiated on an image sensor.

The infrared filter may be disposed at an opening (1411) of a base (1410).

Alternatively, the infrared filter may be disposed at a holder member (not shown) separately formed independent from a base (1410). The infrared filter may stop a light of infrared range from being incident on an image sensor.

The infrared filter may an infrared blue filter. The infrared filter may include an infrared cut-off filter. The infrared filter may be interposed between a lens module and an image sensor. The infrared filter may be formed with a film material or a glass material. The infrared filter may be formed by allowing an infrared cut-off coating material to be coated on a plate-shaped optical filter such as an imaging plane protection cover glass or a cover glass. However, the present invention is not limited thereto.

The PCB may support a lens driving device. The PCB may be disposed with an image sensor. For example, an inner upper surface of PCB may be disposed with an image sensor, and an outer upper surface of PCB may be disposed with a sensor holder (not shown). An upper side of sensor holder may be disposed with a lens driving device. Alternatively, an inner upper surface of PCB may be disposed with an image sensor, and an outer upper surface of PCB may be disposed with a lens driving device. Through this structure, a light having passed the lens module accommodated at an inside of the lens driving device may be irradiated on the image sensor mounted on the PCB. The PCB can supply a power to the lens driving device. Meantime, the PCB may be disposed with a controller in order to control the lens driving device.

The image sensor may be mounted on the PCB. The image sensor may be so disposed as to match with the lens module in terms of optical axis, through which the image sensor may obtain a light having passed the lens module. The image sensor may output the irradiated light as an image. The image sensor may be, for example, any one of a CCD (charge coupled device), an MOS (metal oxide semiconductor), a CPD and a CID, for example. However, the types of image sensor are not limited thereto, The controller may be mounted on a PCB. The controller may individually control a direction, intensity and an amplitude of a current supplied to each element forming the lens driving device. The controller may perform any one or more of an AF function and an OIS function of the camera module by controlling the lens driving device. That is, the controller may move the lens module to an optical axis direction or tile the lens module to a direction orthogonal to the optical axis direction by controlling the lens driving device. Furthermore, the controller may perform any one or more of feedback controls in the AF function and OIS function. To be more specific, the controller may provide a more accurate auto focus function and OIS function by controlling a current or a power supplied to an AF coil (1220) and/or an OIS coil (1430) by receiving a position of a bobbin (1210) detected by a sensing coil (1710) and/or a position of a housing (1310) detected by an OIS sensor (1720).

Hereinafter, configuration of lens driving device according to an exemplary embodiment of the present invention will be described with reference to the accompanying drawings.

Figure 18:
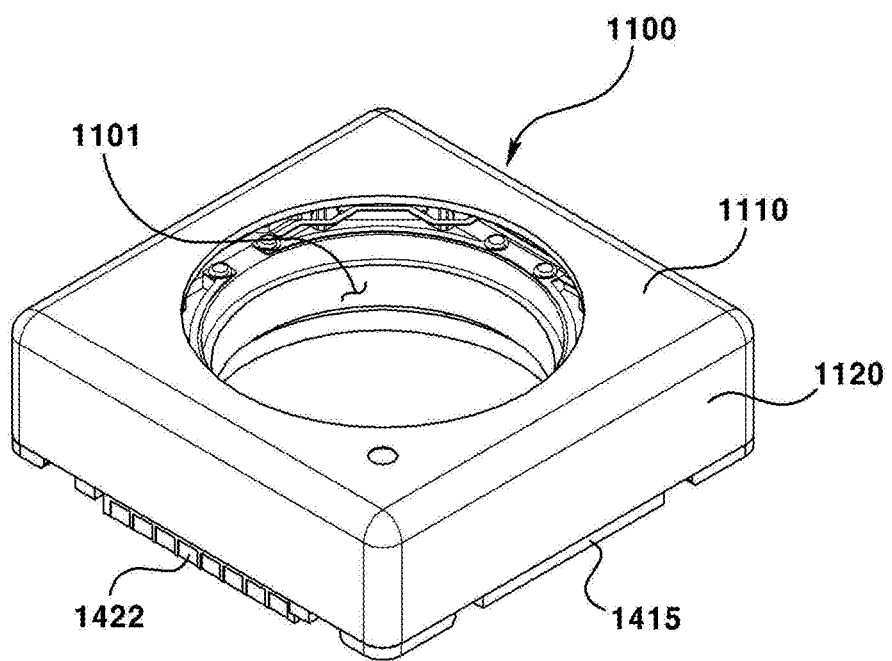
FIGS. 18 to 28 illustrate a second exemplary embodiment of the present invention.
Figure 19:
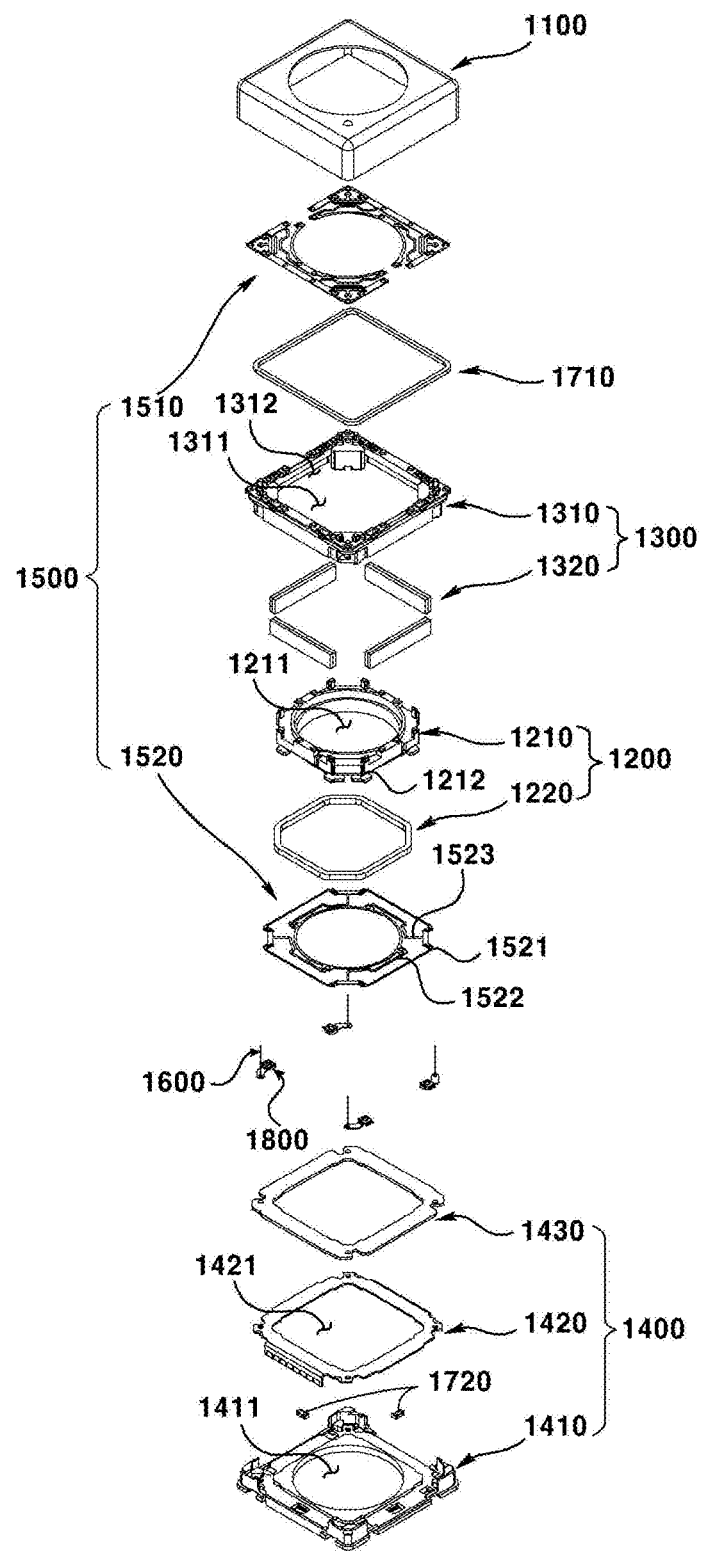
Figure 20:
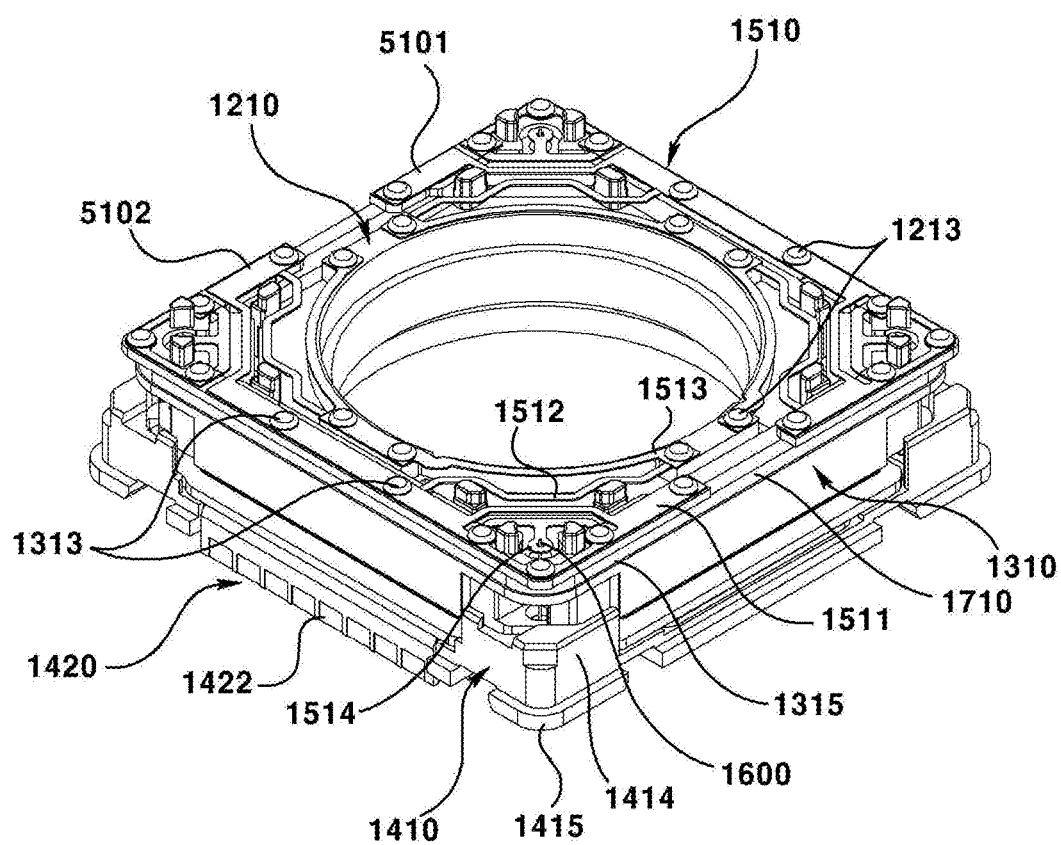
Figure 21:
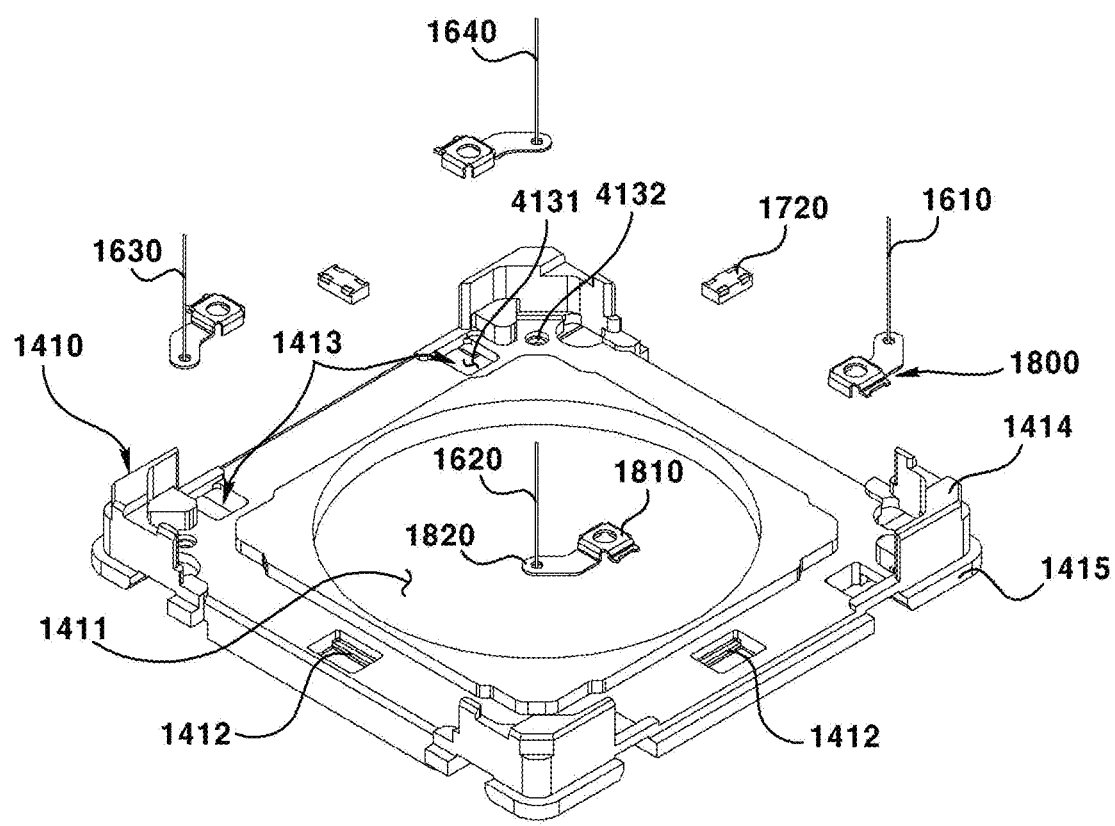
Figure 22:
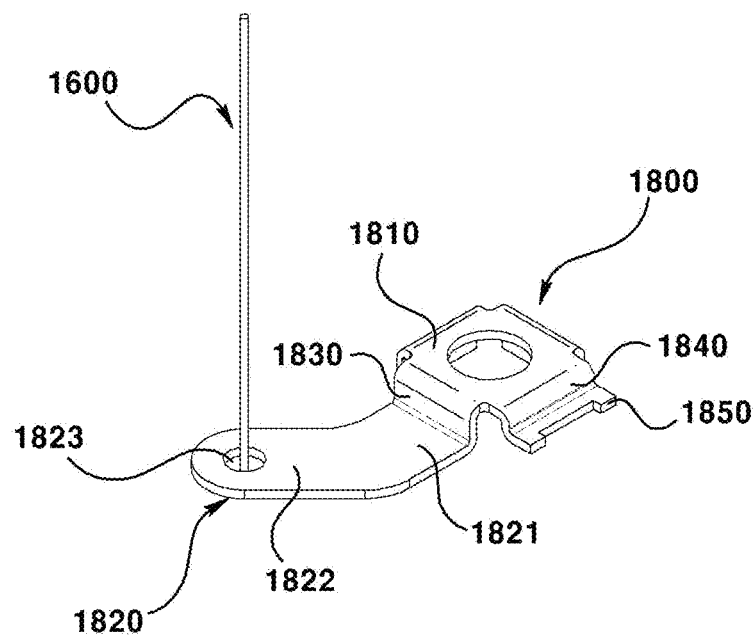
Figure 23:
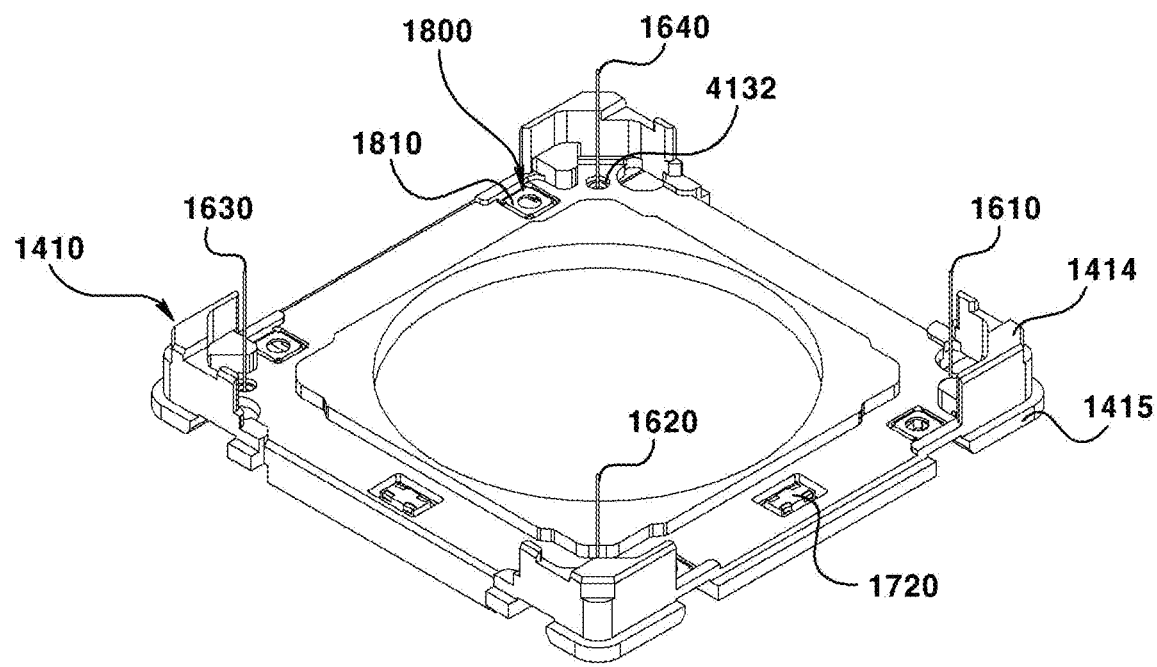
Figure 24:
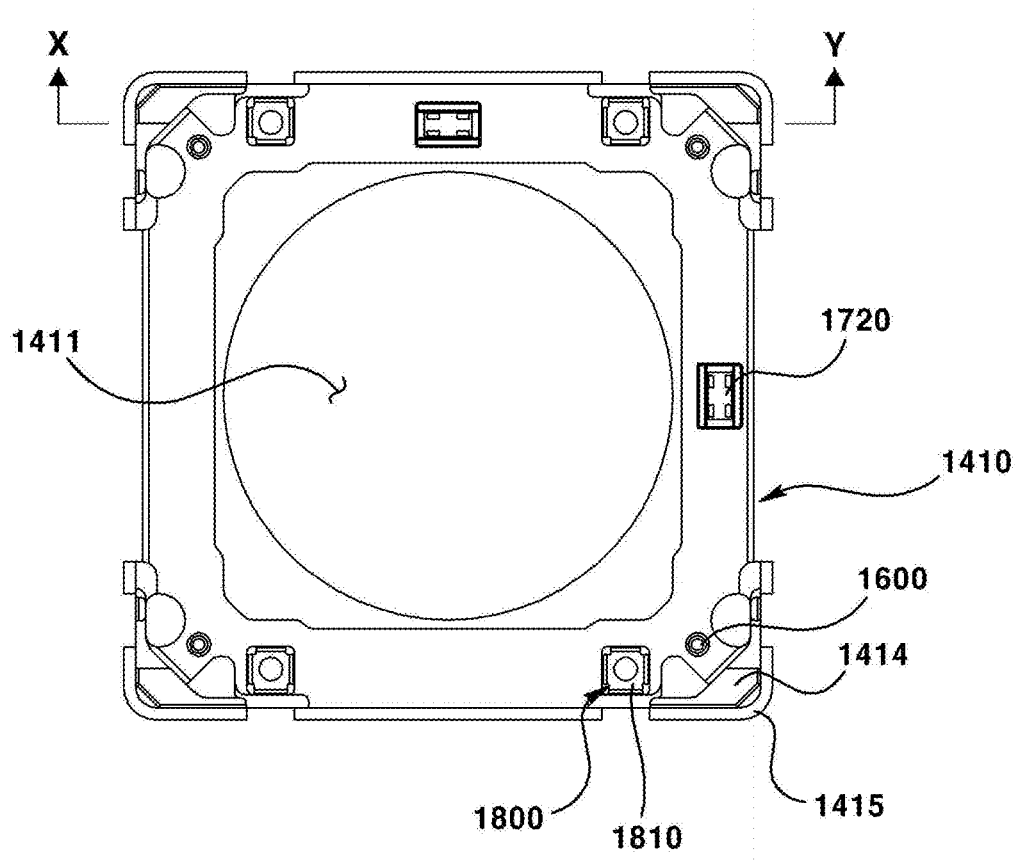
Figure 25:
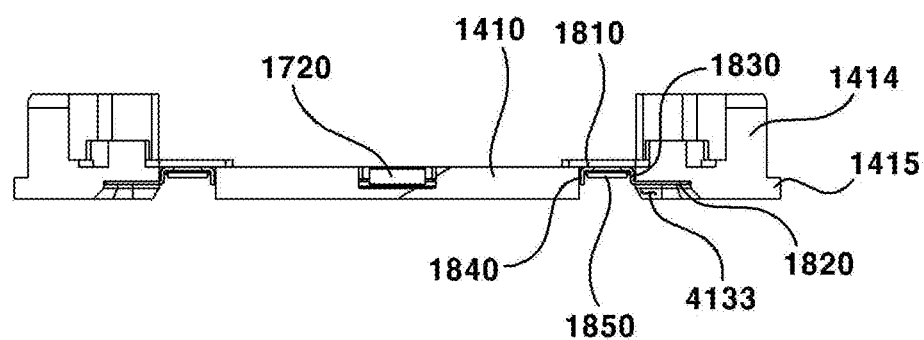
Figure 26:
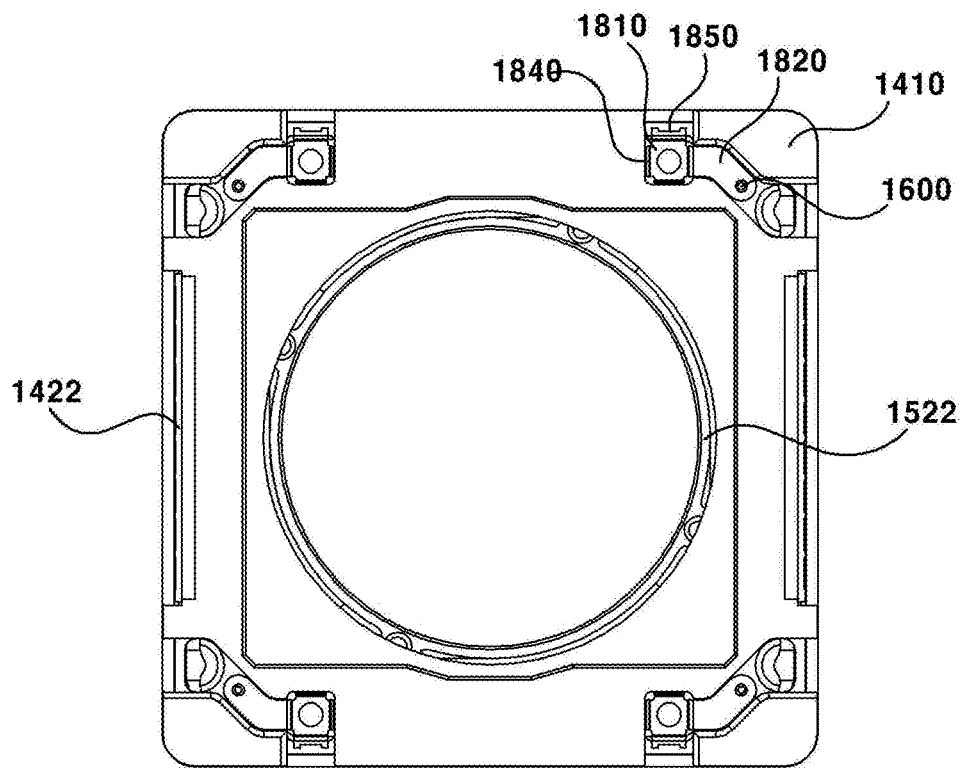

FIG. 18 is a perspective view illustrating a lens driving device according to an exemplary embodiment of the present invention, FIG. 19 is an exploded perspective view illustrating a lens driving device according to an exemplary embodiment of the present invention, FIG. 20 is a perspective view illustrating a state where a cover member is removed from a lens driving device according to an exemplary embodiment of the present invention, FIG. 21 is an exploded perspective view illustrating some elements of a lens driving device according to an exemplary embodiment of the present invention, FIG. 22 is a perspective view illustrating an OIS support member and a terminal unit in a lens driving device according to an exemplary embodiment of the present invention, FIG. 23 is a perspective view illustrating a state where a lens driving device of FIG. 21 is coupled, FIG. 24 is a plane view illustrating a lens driving device illustrated in FIG. 23, FIG. 25 is a cross-sectional view taken along X-Y of FIG. 24, and FIG. 26 is a bottom view of a lens driving device according to an exemplary embodiment of the present invention.

The lens driving device according to an exemplary embodiment of the present invention may include a cover member (1100), a mover (1200, 1300), a stator (1400), a support member (1500, 1600), a sensor part and a terminal unit (1800). However, any one or more of the cover member (1100), the mover (1200, 1300), the stator (1400), the support member (1500, 1600), the sensor part and the terminal unit (1800) may be omitted from the lens driving device according to the exemplary embodiment of the present invention. Particularly, the sensor part may be omitted because the sensor part is a configuration for auto focus feedback function and/or OIS function.

The cover member (1100) nay include a housing (1310) and a bobbin (1210) at an inner space. The cover member (1100) may be coupled with a base (1410). The cover member (1100) may form an exterior look of the lens driving device. The cover member (1100) may take a bottom-opened cubic shape. However, the present invention is not limited thereto. The cover member (1100) may be formed with a metal material, for example. To be more specific, the cover member (1100) may be formed with a metal plate. In this case the cover member (1100) can shield off an EMI (Electro Magnetic Interference). The cover member may be called an "EMI shield can" because of this characteristic. The cover member (1100) may shield off a radio wave generated from outside of the lens driving device from entering into an inside of the cover member (1100) Furthermore, the cover member (1100) may shield off a radio wave generated from inside of the cover member (1100) from being emitted to outside of the cover member (1100). However, the material of cover member (1100) is not limited thereto.

The cover member (1100) may include an upper plate (1110) and a lateral plate (1120). The cover member (1100) may include a lateral plate (1120) coupled at a bottom end to the base (1410). The cover member (1100) may include an upper plate (1110) disposed at an upper side of the housing (1310). The bottom end of the lateral plate (1120) at the cover member (1100) may be mounted on the base (1410). The bottom end of the lateral plate (1120) at the cover member (1100) may be disposed at a drop-off (stepped) part (1415) of the base (1410). An inner lateral surface of cover member (1100) may be mounted on the base (1410) by being tightly contacted to a partial or whole lateral surface of base (1410). An inner space formed by the cover member (1100) and the base (1410) may be disposed with movers (1200, 1300), a stator (1400) and support members (1500, 1600). Through this structure, the cover member (1100) can protect inner elements against outside shocks and to simultaneously inhibit outside foreign objects from being introduced into the cover member (1100). However, the present invention is not limited thereto, and a bottom end of lateral plate (1120) of the cover member (1100) may be directly coupled with a PCB disposed at a bottom side of the base (1410).

The cover member (1100) may include an opening (1101) exposing a lens module formed on the upper plate (1110). The opening (1101) may be formed in a shape corresponding to that of the lens module. The opening (1101) may be formed to be greater than a diameter of the lens module so as to allow the lens module to be assembled through the opening (1101). Meantime, a light having introduced through the opening (1101) can pass the lens module. At this time, the light having passed the lens module may be obtained as an image by an image sensor.

The mover (1200, 1300) may relatively move against the stator (1400). The mover (1200, 1300) may be disposed at an upper side of the base (1410). the mover (1200, 1300) may include a bobbin (1210) coupled with the lens module. The mover (1200, 1300) may include a bobbin (1210) coupled with the lens module and disposed with an AF coil (1220). The mover (1200, 1300) may include an AF coil (1220). The mover (1200, 1300) may include a housing (1310) spaced apart from the bobbin (1210). The mover (1200, 1300) may include a driving magnet (1320) disposed at the housing (1310) and facing the AF coil (1220). The mover (1200, 1300) may include an upper support member (1510) coupled with the bobbin (1210) and the housing (1310) and coupled with the AF coil (1220). The AF support member (1500) may be so structured as to move integrally with the bobbin (1210) and the housing (1310) during an OIS driving, and therefore may be explained as one element of the movers (1200, 1300). However, the AF support member (1500) may be also explained as a separate element of the movers (1200, 1300).

The mover (1200, 1300) may include a first mover (1200) and a second mover (1300).

The first mover (1200) may move for auto focus driving. The first mover (1200) may include a bobbin (1210) and an AF coil (1220). The first mover (1200) may include a bobbin (1210) coupled with the lens module. The first mover (1200) may include an AF coil (1220) disposed at the bobbin (1210) and being moved by electromagnetic interaction with a driving magnet part (1320).

The bobbin (1210) may be accommodated into an inner space of the cover member (1100). The bobbin (1210) may be coupled with the lens module. To be more specific, an inner circumferential surface of bobbin (1210) may be coupled with an outer circumferential surface of lens module. The bobbin (1210) may be disposed with an AF coil (1220). The bobbin (1210) may be coupled with the AF coil (1220). The bobbin (1210) may be coupled at an upper surface with an upper support member (1600). The bobbin (1210) may be disposed at an inside of the housing (1310).

The bobbin (1210) may relatively move to the housing (1310) to an optical axis direction.

The bobbin (1210) may include a lens receptor (1211), a first driving part coupling part (1212), an upper coupling part (1213) and a bottom coupling part (not shown).

The bobbin (1210) may include at an inner side thereof an upper/bottom opened lens receptor (1211). The bobbin (1210) may include a lens receptor (1211) formed at an inside thereof. The lens receptor (1211) may be coupled with the lens module. An inner circumferential surface of lens receptor (1211) may be formed with a screw thread having a shape corresponding to that of the lens module formed at an outer circumferential surface. That is, the lens receptor (1211) may be screw-connected with the lens module. An adhesive may be interposed between the lens module and the bobbin (1210). At this time, the adhesive may be an epoxy hardened by UV or heat. That is, the lens module and the bobbin (1210) may be adhered by a UV-curing epoxy and/or thermally-cured epoxy.

The bobbin (1210) may include a first driving part coupling part (1212) disposed with the AF coil (1220). The first driving part coupling part (1212) may be integrally formed with an outside surface of bobbin (1210). Furthermore, the first driving part coupling part (1212) may be continuously formed along an outside surface of bobbin (1210) or may be formed by being spaced apart at a predetermined distance. For example, the first driving part coupling part (1212) may be concavely formed at a portion of the outside surface of bobbin (1210) in order to correspond in shape to that of the AF coil (1220). At this time, the AF coil (1220) may be directly wound on the first driving part coupling part (1212). In a modification, the first driving part coupling part (1212) may be formed with an upper side opened, or with a bottom side opened. At this time, AF coil (1220) may be coupled to the first driving part coupling part (1212) by being inserted through the pre-wound state of opened portion.

The bobbin (1210) may include an upper coupling part (1213) coupled with the upper support member (1510). The upper coupling part (1213) may be coupled with an inner lateral part (1512) of the upper support member (1510). For example, a lug of the upper coupling part (1213) may be coupled by being inserted into a groove or a hole of the inner lateral part (1512) at the upper support member (1510). At this time, the lug of upper coupling part (1213) may be thermally-fused while being inserted into a hole of the inner lateral part (1512) to fix the upper support member (1510).

The bobbin (1210) may include a bottom coupling part coupled with the bottom support member (1520). The bottom coupling part may be coupled with an inner lateral part (1522) of bottom support member (1520). For example, a lug of the bottom coupling part may be coupled by being inserted into a groove or a hole of inner lateral part (1522) of bottom support member (1520). At this time, may fix the bottom support member (1520) by being fused or melted in a state of being inserted into the hole of the inner lateral part (1522).

The AF coil (1220) may be disposed at the bobbin (1210). The AF coil (1220) may be coupled with the bobbin (1210). The AF coil (1220) may be wound on an outer surface of bobbin (1210) by being guided to the first driving part coupling part (1212). Furthermore, in another example, the AF coil (1220) may be configured in such a manner that four coils are independently formed to allow adjacent two coils to be disposed at an outside surface of bobbin (1210) thereby forming a 90° between two adjacent coils. The AF coil (1220) may face a driving magnet (1320). The AF coil (1220) may be so disposed as to electromagnetically and interactively work with the driving magnet (1320). The AF coil (1220) can move the bobbin (1210) relative to the housing (1310) through the electromagnetic interaction with the driving magnet (1320).

The AF coil (1220) may include a pair of lead cables for power supply. At this time, the pair of lead cables in the AF coil (1220) may be respectively connected to a first upper support unit (5101) and a second upper support unit (5102). That is, the AF coil (1220) may receive a power through the upper support member (1510). The power may be supplied from a substrate (1420) to the AF coil (1220) through the first support unit (1610) coupled with the first upper support unit (5101) and the second support unit (1620) coupled with the second upper support unit (5102). To be more specific, a current supplied to a terminal part (1412) of the substrate (1420) may be sequentially transmitted to the first support unit (1610), the first upper support unit (5101), the AF coil (1220), the second upper support unit (5102), the second support unit (1620) and the substrate (1420). When a power is supplied to the AF coil (1220) through this structure, an electromagnetic field may be formed about the AF coil (1220).

The second mover (1300) may move for implementation of OIS driving. The first mover (1200) may integrally move with the second mover (1300) during the OIS driving implementation. The second mover (1300) may be disposed to face the first mover (1200) at an outside of the first mover (1200). The second mover (1300) may move the first mover (1200) or move with the first mover (1200). The second mover (1300) may be movably supported by the stator (1400) disposed at a bottom side. The second mover (1300) may be disposed at an inner space of cover member (1100).

The second mover (1300) may include a housing (1310) and a driving magnet (1320). The second mover (1300) may include a housing (1310) disposed at an outside of bobbin (1210). In addition, the second mover (1300) may include a driving magnet (1320) disposed in opposition to the AF coil (1220) and fixed to the housing (1310).

At least one portion of housing (1310) may take a shape corresponding to that of an inner lateral surface of cover member (1100). Particularly, an outside surface of housing (1310) may take a shape corresponding to that of an inner lateral surface of a lateral plate (1120) of the cover member (1100). The housing (1310) may take a cubic shape including four lateral surfaces, for example. However, the housing (1310) may take any shape as long as the housing (1310) can be disposed at an inside of cover member (1100). The housing (1310) may be formed with an insulation material, and may be formed by way of injection in consideration of productivity.

The housing (1310) may be disposed at an outside of the bobbin (1210). The housing (1310) may be spaced apart from the bobbin (1210). However, in this case, a portion of bobbin (1210) and a portion of housing (1310) may be contacted as the bobbin (1210) moves. The housing (1310) may be disposed at an upper side of base (1410). The housing (1310) is a moving part for OIS driving and therefore may be disposed by being spaced apart from the cover member (1100) at a predetermined distance. However, the housing (1310) in the AF model may be fixed on the base (1410). Alternatively, the housing (1310) in the AF model may be omitted and the driving magnet (1320) may be fixed to the cover member (1100). The housing (1310) may be coupled at an upper side with the upper support member (1510). The housing (1310) may be coupled at a bottom surface with a bottom support member (1520).

The housing (1310) may include an inner space (1311), a second driving part coupling part (1312), an upper coupling part (1313), a bottom coupling part (not shown) and a sensing coil coupling part (1315).

The housing (1310) may be opened at an upper side and a bottom side to accommodate the first mover (1200) for a vertical movement. The housing (1310) may include therein an upper-bottom opened inner space (1311), where the inner space (1311) may be movably disposed with the bobbin (1210). That is, the inner space (1311) may be formed in a shape corresponding to that of the bobbin (1210). Furthermore, an inner circumferential surface of housing (1310) forming the inner space (1311) may be spaced apart from an outer circumferential surface of bobbin (1210).

The housing (1310) may include at a lateral surface a second driving part coupling part (1312) formed in a shape corresponding to that of the driving magnet (1320) to accommodate the driving magnet (1320). The second driving part coupling part (1312) may fix the driving magnet (1320) by accommodating the same. The driving magnet (1320) may be fixed to the second driving part coupling part (1312) by an adhesive (not shown). Meantime, the second driving part coupling part (1312) may be disposed at an inner circumferential surface of housing (1310). In this case, there is an advantageous effect in the electromagnetic interaction with the AF coil (1220) disposed at an inner side of driving magnet (1320). Furthermore, the second driving part coupling part (1312) may take a bottom-opened shape, for example. In this case, there is an advantageous effect in the electromagnetic interaction between an OIS coil (1430) disposed at a bottom side of the driving magnet (1320) and the driving magnet (1320). The second driving part coupling part (1312) may be formed in four pieces, for example. Each of the four second driving part coupling parts (1312) may be coupled with a driving magnet (1320).

The housing (1310) may include an upper coupling part (1313) coupled with the upper support member (1510). The upper coupling part (1313) may be coupled with an outer part (1511) of upper support member (1510). For example, a lug of the upper coupling part (1313) may be coupled by being inserted into a groove or a hole of the outer part (1511) of the upper support member (1510). At this time, the lug of upper coupling part (1313) may be heat-fused in a state of being inserted into a hole of the outer part (1511) to fix the upper support member (1510).

The housing (1310) may include a bottom coupling part coupled with a bottom support member (1520). The bottom coupling part may be coupled with the outer part (1521) of the bottom support member (1520). For example, the lug of bottom coupling part may be coupled by being inserted into a groove or a hole of the outer part (1521) of bottom support member (1520). At this time, the lug of bottom coupling part may be heat-fused in a state of being inserted into a hole of the outer part (1521) to fix the bottom support member (1520).

The housing (1310) may include a sensing coil coupling part (1315) coupled by a sensing coil (1710). The sensing coil coupling part (1315) may be coupled with a sensing coil (1710). The sensing coil coupling part (1315) may be disposed at an upper surface of housing (1310). The sensing coil coupling part (1315) may be disposed at an upper end of housing (1310). The sensing coil coupling part (1315) may be formed by a receptor groove where a portion of outer surface of housing (1310) is inwardly concaved.

The driving magnet (1320) may be accommodated into an inner space of cover member (1100). The driving magnet (1320) may be so disposed as to face the AF coil (1220). The driving magnet (1320) may move the AF coil (1220) through an electromagnetic interaction with the AF coil (1220). The driving magnet (1320) may be disposed at the housing (1310). The driving magnet (1320) may be fixed to the second driving part coupling part (1312) of housing (1310).

The driving magnet (1320) may be disposed at the housing (1310) to allow two adjacent magnets to mutually form a 90° by independently disposing four (4) magnets. That is, the driving magnet (1320) can promote an efficient utilization of inner volume through magnets equidistantly mounted on four lateral surfaces of housing (1310). Furthermore, the driving magnet (1320) may be adhered to the housing (1310) by an adhesive. However, the present invention is not limited thereto.

The stator (1400) can movably support the movers (1200, 1300). The stator (1400) may movably support the second mover (1300). The stator (1400) may include a base (1410), a substrate (1420) and an OIS coil (1430). The stator (1400) may include a substrate (1420) interposed between the OIS coil (1430) and the base (1410). Furthermore, the stator (1400) may include an OIS coil (1430) that faces the driving magnet (1320).

The base (1410) may be disposed with a PCB. The base (1410) may be fixed to the PCB by an active alignment adhesive. The base (1410) may be disposed at a bottom side of bobbin (1210). The base (1410) may be disposed at a bottom side of housing (1310). The base (1410) may support the second mover (1300). A bottom side of base (1410) may be disposed with a PCB. The base (1410) may implement a sensor holder function protecting an image sensor mounted on the PCB.

The base (1410) may include an opening (1411), a sensor receptor (1412), a foreign object collector (not shown), a terminal receptor (1413), a support part (1414) and a stepping stair (1415).

The base (1410) may include an opening (1411) formed at an area corresponding to that of a lens receptor (1211) of bobbin (1210). Meantime, the opening (1411) of base (1410) may be coupled with an Infrared Ray Filter. However, an infrared ray filter may be coupled with a separate sensor holder disposed at a bottom surface of base (1410).

The base (1410) may include a sensor receptor (1412) coupled with an OIS sensor (1720). That is, the OIS sensor (1720) may be accommodated into the sensor receptor (1412). At this time, the OIS sensor (1720) may detect a horizontal movement or tilt of housing (1310) by detecting the driving magnet (1320) coupled to the housing (1310). The sensor receptor (1412) may be formed in two pieces, for example. Each of the two sensor receptors may be disposed with an OIS sensor (1720). In this case, the OIS sensor (1720) may include a first axis sensor and a second axis sensor so disposed as to detect both the x axis and y axis direction movements of housing (1310).

The base (1410) may include a foreign object collector collecting foreign objects introduced into the cover member (1100). The foreign object collector may be disposed at an upper surface of base (1410) and include an adhesive substance to collect foreign objects inside an inner space formed by the cover member (1100) and the base (1410).

The base (1410) may include a terminal receptor (1413) accommodating at least a portion of terminal unit (1800). The terminal receptor (1413) may accommodate at least a portion of terminal unit (1800). Thus, the terminal receptor (1413) may be formed with a shape corresponding to that of the terminal unit (1800) for at least a portion thereof.

The base (1410) may include a second through hole (4131) disposed with a first coupling part (1810). The second through hole (4131) may be formed with a first groove as a modification. The base (1410) may include a second through hole (4131) or a first groove disposed with the first coupling part (1810). The terminal receptor (1413) may include a second through hole (4131) disposed with the first coupling part (1810) of the terminal unit (1800). The second through hole (4131) may be so formed as to vertically (optical axis direction) pass through the base (1410). The first coupling part (1810) disposed at the second through hole (4131) may be exposed upwardly. In this structure, the first coupling part (1810) may be coupled to a bottom surface of substrate (1420). The second through hole (4131) may be spaced apart from a lateral surface of base (1410). That is, the second through hole (4131) may not be opened toward a lateral side of base (1410). The second through hole (4131) may be formed in a shape corresponding to that of the first coupling part (1810).

The base (1410) may include a first through hole (4132) passed through by an OIS support member (1600). The first through hole (4132), as a modification, may be formed as a second groove. The base (1410) may include a first through hole (4132) passed through by the OIS support member (1600) or a second groove. The terminal receptor (1413) may include a first through hole (4132) passed through by the OIS support member (1600). The first through hole (4132) may be so formed as to allow passing through the base (1410) to a vertical direction. The first through hole (4132) may be so formed as to allow the OIS support member (1600) to pass through. The first through hole (4132) may be formed in a shape corresponding to that of the through hole formed on the substrate (1420). The OIS support member (1600) may be coupled with a second coupling part (1820) of the terminal unit (1800) by passing through the through hole of substrate (1420) and the first through hole. That is, a bottom side of first through hole (4132) may be disposed with the second coupling part (1820). The first through hole (4132) may be overlapped with the second coupling part (1820) to a vertical direction.

The base (1410) may include a receptor groove (14133) formed by being recessed to an upper side at a portion of bottom surface to accommodate the second coupling part (1820). However, in a modification, the receptor groove (14133) may be formed as a through hole by another groove recessed downwardly from an upper surface of base (1410). The terminal receptor (1413) may be formed by allow a portion of bottom surface to be recessed upwardly and include a receptor groove (14133) accommodating the second coupling part (1820). The receptor groove (14133) may be formed by allowing a portion of bottom surface of base (1410) to be recessed upwardly. The receptor groove (14133) may accommodate at least a portion of the second coupling part (1820) of the terminal unit (1800). A bottom surface of base (1410) forming the receptor groove (14133) may be contacted by an upper surface of second coupling part (1820) of terminal unit (1800). An adhesive member (not shown) may be interposed between a bottom surface of base (1410) forming the receptor groove (14133) and an upper surface of second coupling part (1820) of terminal unit (1800). The receptor groove (14133) may be formed with a shape corresponding that of the second coupling part (1820).

The first through hole (4132) and the receptor groove (14133) may be connected. The first through hole (4132) and the receptor groove (14133) may be explained as an integral member by the abovementioned characteristics. The receptor groove (14133) may be disposed at a lower side of the first through hole (4132). The first through hole (4132) may accommodate the OIS support member (1600) so as to allow passing therethrough. The receptor groove (14133) may accommodate the second coupling part (1820) coupled with the OIS support member (1600).

The base (1410) may include a support part (1414) supporting the housing (1310). The support part (1414) may support the housing (1310). The support part (1414) may support four (4) corner parts of housing (1310). The support part (1414) may be protruded from an upper surface of base (1410) to an upper side. The support part (1414) may be respectively formed on four (4) corner parts to accommodate therein the housing (1310). Through this structure, the support part (1414) may function as a stopper restricting a moving distance of housing (1310) to a lateral direction.

The base (1410) may include a stepping stair (1415) accommodated by the cover member (1100). The stepping stair (1415) may be accommodated by a bottom end of a lateral plate (1120) of cover member (1100). The stepping stair (1415) may directly contact a bottom end of the lateral plate (1120) of cover member (1100). Furthermore, an adhesive member (not shown) may be interposed between the lateral plate (1120) of cover member (1100) and the stepping stair (1415). The stepping stair (1415) may be so formed as to be protruded from a lateral surface of base (1410) to a lateral side. The stepping stair (1415) may be formed at a bottom end of base (1410). However, the present invention is not limited thereto.

The substrate (1420) may be disposed at an upper surface of base (1410). The substrate (1420) may be disposed at a bottom side of housing (1310). The substrate (1420) may be disposed with an OIS coil (1430). The substrate (1420) may be coupled with the OIS coil (1430). The substrate (1420) may include a flexible substrate which is an FPCB (Flexible Printed Circuit Board). The substrate (1420) may be interposed between the base (1410) and the housing (1310). The substrate (1420) may be interposed between the OIS coil (1430) and the base (1410). The substrate (1420) can supply a power to the OIS coil (1430). The substrate (1420) can supply a power to the AF coil (1220). For example, the substrate (1420) can supply a power to the AF coil (1220) through the OIS support member (1600) and the upper support member (1510). Furthermore, the substrate (1420) may be electrically communicated with the sensing coil (1710) through the OIS support member (1600) and the upper support member (1510).

The substrate (1420) may include an opening (1421) and a stepped part (1422). The substrate (1420) may include an opening (1421) passing through a light having passed the lens module. The substrate (1420) may include a stepped part (1422) extended and bent from one side of body part to a bottom side. The stepped part (1422) may be protruded to a bottom side of cover member (1100). Through this structure, the stepped part (1422) may be exposed to an outside. The stepped part (1422) may supply a power to the lens driving device according to an exemplary embodiment of the present invention by being electrically connected to an outside configuration using a soldering. The stepped part (1422) may be accommodated into a terminal receptor concavely formed at a lateral surface of base (1410).

The OIS coil (1430) may be so formed as to face the driving magnet (1320). The OIS coil (1430) may move the driving magnet (1320) through an electromagnetic interaction. The OIS coil (1430) may be disposed on the substrate (1420). The OIS coil (1430) may be interposed between the base (1410) and the housing (1310). The OIS coil (1430) may be so formed as to face the driving magnet (1320). When an electric power is supplied to the OIS coil (1430), the driving magnet (1320) and the housing (1310) fixed by the driving magnet (1320) may be integrally moved by an interaction between the OIS coil (1430) and the driving magnet (1320).

The OIS coil (1430) may be formed by a pattern coil (FP coil, Fine Pattern coil) mounted on the substrate (1420). In this case, there may be an advantageous effect in the aspect of miniaturizing a lens driving device (reducing a height to a z axis direction which is an optical axis direction). The OIS coil (1430) may be so formed as to minimize an interference with the OIS sensor (1720) disposed at a bottom side, for example. The OIS coil (1430) may be so disposed as not to be overlapped with the OIS sensor (1720) to a vertical direction.

The support member (1500, 1600) may connect more than two elements out of the first mover (1200), the second mover (1300) and the stator (1400). The support member (1500, 1600) can elastically connect more than any of the two elements out of the first mover (1200), the second mover (1300) and the stator (1400) to enable a relative supportive movement between each element. The support member (1500, 1600) may be so formed as to allow having elasticity at least on a portion of the support member (1500, 1600). In this case, the support member (1500, 1600) may be called an elastic member or a spring.

The support member (1500, 1600) may include an AF support member (1500) and an OIS support member (1600). The AF support member (1500) is a support member for AF driving, and may be coupled to the first mover (1200) and the second mover (1300). The OIS support member (1600) is a support member for OIS driving and may be coupled to the second mover (1300) and the stator (1400).

The AF support member (1500) may include an upper support member (1510) and a bottom support member (1520). The AF support member (1500) may be coupled to the bobbin (1210) and the housing (1310). The AF support member (1500) may support the bobbin in such a manner that the bobbin (1210) can move relative to the housing (1310) during the AF driving. The AF support member (1500) may elastically support the bobbin (1210) when the AF driving is finished to allow the bobbin (1210) to be moved to an initial position.

The upper support member (1510) may be coupled to the housing (1310) and the bobbin (1210). The upper support member (1510) may be coupled to an upper surface of bobbin (1210) and to an upper surface of housing (1310). The upper support member (1510) may movably support the bobbin (1210) relative to the housing (1310). An inner lateral part (1512) of the upper support member (1510) may be coupled with the upper coupling part (1213) of bobbin (1210). T An outer lateral surface (1511) of the upper support member (1510) may be coupled to the upper coupling part (1313) of housing (1310).

The upper support member (1510) may include an external part (1511), an internal part (1512), a connection part (1513) and a coupling part (1514). The upper support member (1510) may include an external part (1511) coupled with the housing (1310). The upper support member (1510) may include an internal part (1512) coupled with the bobbin (1210). The upper support member (1510) may include a connection part (1513) connecting the external part (1511) and the internal part (1512). The upper support member (1510) may include a coupling part (1514) extended from the external part (1511) to be coupled with the OIS support member (1600).

The upper support member (1510) may be disposed by being separated to two bodies in order to supply a power to the AF coil (1220). The upper support member (1510) may include a pair of upper support units (5101, 5102) each spaced apart from the other. The upper support member (1510) may include a first upper support unit (5101) and a second upper support unit (5102). The second upper support unit (5102) may be spaced apart from the first upper support unit (5101). Each of the first and second support units (5101, 5102) may be electrically connected to the AF coil (1220). The first upper support unit (5101) may be coupled with the first support unit (1610). The second upper support unit (5102) may be coupled with the second support unit (1610).

The bottom support member (1520) may be coupled with the bobbin (1210) and the housing (1310). The bottom support member (1520) may be coupled to a bottom surface of bobbin (1210) and a bottom surface of housing (1310). The bottom support member (1520) may include an external part (1521), an internal part (1522) and a connection part (1523). The bottom support member (1520) may include an external part (1512) coupled with the housing (1310), an internal part (1522) coupled with the bobbin (1210) and a connection part (1523) elastically connecting the external part (1521) and the internal part (1522). The bottom support member (1520) may be integrally formed. However, the present invention is not limited thereto. As a modification, the bottom support member (1520) may replace the upper support member (1510) to be separately disposed in a pair and may be used for supply of a power to the AF coil (1220).

The OIS support member (1600) may movably support the movers (1200, 1300) relative to the base (1410). The OIS support member (1600) may be electrically connected to the AF coil (1220). The OIS support member (1600) may be coupled with the upper support member (1510).

The OIS support member (1600) may be coupled with the upper support member (1510) and the terminal unit (1800). The OIS support member (1600) may be electrically connected with the upper support member (1510) and the substrate (1420). The OIS support member (1600) may be electrically connected to the substrate (1420) through the terminal unit (1800). The OIS support member (1600) may elastically support the housing (1310) relative to the (1410). The OIS support member (1600) may be coupled at one side to the terminal unit (1800) disposed at the stator (1400), and may be coupled at the other side to the upper support member (1510) and/or to the housing (1310). Through this structure, the OIS support member (1600) may elastically support the second mover (1300) relative to the stator (1400) to allow the second mover (1300) to horizontally move or to tilt. An upper surface of OIS support member (1600) may be coupled with the upper support member (1510) by way of soldering. A bottom surface of OIS support member (1600) may be coupled to the terminal unit (1800) by way of soldering. The OIS support member (1600) may include a plurality of wires, for example. Alternatively, the OIS support member (1600) may include a plurality of leaf springs, as a modification. Meantime, the OIS support member (1600) may be integrally formed with the upper support member (1510).

The OIS support member (1600) may include first to fourth support units (1610, 1620, 1630, 1640), each spaced apart from the other. The first to fourth support units (1610, 1620, 1630, 1640) may be spaced apart from the other unit. The first to fourth support units (1610, 1620) may be electrically connected to the AF coil (1220) through the upper support member (1510). The third and fourth support units (1630, 1640) may be electrically connected to the sensing coil (1710). The first to fourth support units (1610, 1620, 1630, 1640) may be respectively disposed on four (4)

corner parts formed among four lateral surfaces of housing (1310). The first to fourth support units (1610, 1620, 1630, 1640) may be symmetrically disposed based on a center of housing (1310).

The sensor part may be disposed for any one or more of the autofocus feedback and OIS feedback. The sensor part may detect any one or more of the position and movement of the first mover (1200) and the second mover (1300).

The sensor part may include an AF sensor part and an OIS sensor part, for example. The AF sensor part may provide information for AF feedback by sensing a relative vertical movement of bobbin (1210) relative to the housing (1310). The OIS sensor part may provide information for OIS feedback by detecting a horizontal movement or tilt of the second mover (1300).

The AF sensing part may include a sensing coil (1710), a high frequency current applier (not shown) and a voltage detector (not shown). The sensing coil (1710) is an element for autofocus feedback and may be omitted if not of a lens driving device of autofocus feedback type. That is, the sensing coil (1710) may be omitted from the exemplary embodiments of the present invention. Meantime, the sensing coil (1710) may be replaced by a Hall sensor unit, as a modification. The Hall sensor unit may include a Hall sensor and a sensing magnet. When a Hall sensor is disposed on any one of the housing (1310) and the bobbin (1210), and a sensing magnet is disposed on any other in the modification, the position and/or movement of bobbin (1210) can be detected because the intensity of magnetic force detected by the Hall sensor can be changed in response to movement of bobbin (1210).

As a modification, in an exemplary embodiment where no AF sensor part is disposed, because application of current only to the AF coil (1220) will suffice, only two wires, elements according to an example of OIS support member (1600), may be connected to the substrate (1420) through the AF support member (1500) or can receive a signal. In the abovementioned modification, two wires are connected to the substrate (1420) through the terminal unit (1800), and may be connected to outside through the terminal part (1422) formed on the substrate (1420). However, in still another modification, two wires may be directly connected to an outside element of the lens driving device through the terminal unit (1800). At this time, a portion of terminal unit (1800) may be directly exposed to an outside of lens driving device.

The sensing coil (1710) may be disposed at the housing (1310). The sensing coil (1710) may be so disposed as to encompass an upper surface of housing (1310). The sensing coil (1710) may be disposed at a sensing coil coupling part (1315) of housing (1310). The sensing coil (1710) may be disposed at an upper end of housing (1310). The sensing coil (1710) may take a closed curve, for example, but the present invention is not limited thereto. The sensing coil (1710) may be spaced apart from the AF coil (1220). Through this structure, when a power is applied to the AF coil (1220), an inductive voltage may be generated on the sensing coil (1710). The sensing coil (1710) may be induced with a voltage in response to a distance to the sensing coil (1710) and the AF coil (1220). That is, the voltage induced on the sensing coil (1710) may be changed in response to a distance to the sensing coil (1710) and to the AF coil (1220). In the present exemplary embodiment, the movement and/or position of bobbin (1210) can be detected by measurement alone of voltage induced on the sensing coil (1710) using the above characteristic. The movement and/or position of bobbin (1210) thus detected may be used for autofocus feedback function.

The sensing coil (1710) may electrically connected with the substrate (1420) by a third support unit (1630) and a fourth support unit (1640). Through this structure, an inductive voltage induced on the sensing coil (1710) can be measured by a high frequency current supplied to the AF coil (1220).

The high frequency current applier may apply a high frequency current to the AF coil (1220). That is, the high frequency current applier can apply a high frequency current such as an impulse current to the AF coil (1220). At this time, the high frequency current applied to the AF coil (1220) does not affect the movement of bobbin (1210) and can induce a voltage to the sensing coil (1710). That is, the high frequency current applier can generate an inductive voltage onto the sensing coil (1710) while not giving an influence to the autofocus driving of bobbin (1210) by applying a high frequency current to the AF coil (1220). The high frequency current applier can supply a high frequency current to the AF coil (1220) in response to predetermined time interval.

A voltage detector may detect a voltage induced on the sensing coil (1710). That is, the voltage detector may detect a voltage induced on the sensing coil (1710) and a detected value may be transmitted to the controller where the controller can discriminate a position of bobbin (1210).

The OIS sensor part may include an OIS sensor (1720). The OIS (1720) can detect the movement of second mover (1300). The OIS sensor (1720) may include a Hall sensor. The OIS sensor (1720) can detect the driving magnet (1320). The OIS sensor (1720) may be accommodated into a sensor receptor (1412) of base (1410). The OIS sensor (1720) may be coupled with a bottom surface of substrate (1420). The OIS sensor (1720) may include a first axis sensor and a second axis sensor so disposed as to detect all the x-axis and y-axis direction movements of housing (1310).

The terminal unit (1800) may be coupled with the substrate (1420). The terminal unit (1800) may be coupled with the OIS support member (1600). The terminal unit (1800) may be formed for at least one portion thereof with an electrically conductive material. The OIS support member (1600) coupled with the terminal unit (1800) and the substrate (1420) may be electrically conducted.

The terminal unit (1800) may include a first coupling part (1810) coupled with the substrate (1420). The terminal unit (1800) may include a second coupling part (1820) coupled with the OIS support member (1600). The terminal unit (1800) may include a connection part (1830) connecting the first coupling part (1810) and the second coupling part (1820). The terminal unit (1800) may include a bent part (1840) extended from the first coupling part (1810) to a bottom side to contact an inner surface of base (1410) forming a first through hole (4132). Furthermore, the terminal unit (1800) may include a third coupling part (1850) extended from the bent part (1840) to an outside to be exposed for at least a portion thereof to a lateral side of base (1410).

The first coupling part (1810) may be coupled with the substrate (1420). The first coupling part (1810) may be coupled to a bottom surface of substrate (1420) by way of soldering and/or welding. The first coupling part (1810) may surface-contact a bottom surface of substrate (1420) for at least a portion thereof. The first coupling part (1810) may include a through hole accommodated by solder balls. The first coupling part (1810) may take a square shape. However, the present invention is not limited thereto.

The second coupling part (1820) may be disposed at a position lower than the first coupling part (1810). The second coupling part (1820) may be disposed at a position lower than the first coupling part (1810) coupled to a bottom surface of substrate (1420). That is, the second coupling part (1820) may be disposed at a position lower than the substrate (1420). In the present exemplary embodiment, a moving section of the OIS support member (1600) may be additionally obtained as much as a difference of height between the second coupling part (1820) and the substrate (1420). That is, when compared with a case where the OIS support member (1600) is coupled with the substrate (1420), a moving length of the OIS support member (1600) may be increased when the OIS support member (1600) is coupled to the second coupling part (1820) of terminal unit (1800).

The second coupling part (1820) may include an extension part (1821) extended from a bottom end of connection part (1830) to a lateral end. The second coupling part (1820) may include a slant part (1822) slantly extended from the extension part (1821). The second coupling part (1820) may include a coupling hole (1823) formed on the slant part (1822) to be coupled with the OIS support member (1600).

The extension part (1821) may be extended from a bottom end of connection part (1830) to a lateral side. The extension part (1821) may connect the connection part (1830) and the slant part (1822). The slant part (1822) may be slantly extended from the extension part (1821). The slant part (1822) may be horizontally and slantly extended from the extension part (1821). The slant part (1822) may be horizontally and/or vertically slantly extended from the extension part (1821). The slant part (1822) may be extended from the extension part (1821) with a same width. The coupling hole (1823) may be formed on the slant part (1822). The coupling hole (1823) may be coupled with the OIS support member (1600). The coupling hole (1823) may be coupled with a solder ball coupled with the OIS support member (1600).

A soldering part or solder ball coupling the OIS support member (1600) and the second coupling part (1820) may be disposed at an upper surface and/or at a bottom surface of the coupling hole (1823). That is, soldering may be implemented at an upper side and/or a bottom side of coupling hole (1823). At this time, a portion of the soldering part may move from an upper side to a bottom side or from a bottom side to an upper side through the coupling hole (1823).

The connection part (1830) may connect the first coupling part (1810) and the second coupling part (1820). The connection part (1830) may be extended from a distal end of one side of the first coupling part (1810) to a bottom side. The connection part (1830) may be extended from a distal end of one side of the second coupling part (1820) to an upper side. The connection part (1830) may connect the second coupling part (1820) and the first coupling part (1810) to allow the second coupling part (1820) to be disposed at a position lower than the first coupling part (1810). At least a portion of connection part (1830) may be formed in a round shape. The connection part (1830) may be formed by bending. However, the present invention is not limited thereto.

The bent part (1840) may be extended from the first coupling part (1810) to a bottom side. The bent part (1840) may contact an inner surface of base (1410) forming the first through hole (4132). The bent part (1840) may surface-contact an inner surface of base (1410). The bent part (1840) may be formed with a shape corresponding to that of the second through hole (4131) of base (1410). Through this structure, the bent part (1840) may guide the terminal unit (1800) so that the terminal unit (1800) can be disposed on a proper position on the base (1410).

In the present exemplary embodiment, as illustrated in FIG. 24, one connection part (1830) and three bent parts (1840) may be extended from the first coupling part. That is, any one lateral surface of the four lateral surfaces of first coupling part (1810) may be formed with the connection part (1830), and the bent part may be formed on remaining three lateral surfaces of the first coupling part (1810). However, the present invention is not limited thereto, and the number and/or position of extension part (1830) and the bent part (1840) may be changed.

The third coupling part (1850) may be extended from the bent part (1840) to an outside. The third coupling part (1850) may be exposed to a lateral side for at least one portion thereof. The third coupling part (1850) may be electrically connected to an outside element.

Hereinafter, operation of camera module according to an exemplary embodiment of the present invention will be described.

First, the auto focus function of camera module according to an exemplary embodiment will be described. When a power is supplied to the AF coil (1220), the AF coil (1220) performs a movement relative to the driving magnet (1320) in response to the electromagnetic interaction between the AF coil (1220) and the driving magnet (1320). At this time, the bobbin (1210) coupled by the AF coil (1220) integrally moves with the AF coil (1220). That is, the bobbin (1210) coupled to an inside of the lens module vertically moves relative to the housing (1310). The vertical movement of bobbin (1210) results in a movement in which the lens module comes near to the image sensor or distances from the image sensor, whereby the focus control can be performed to an object.

Meantime, an auto focus feedback may be applied in order to implement a more accurate realization of auto focus function in the camera module according to the present invention. The sensing coil (1710) formed on the housing (1310) may be induced with a voltage by a high frequency current applied to the AF coil (1220). Meantime, when a driving current is applied to the AF coil (1220) to allow the bobbin (1210) to implement a relative movement against the housing (1310), a value of voltage induced on the sensing coil (1710) may be changed. At this time, supply of high frequency current to the AF coil (1220) may be implemented by a predetermined time interval. Meantime, the voltage detector may detect a voltage value induced on the sensing coil (1710) and may transmit the voltage value to the controller. The controller may determine whether to implement an additional movement relative to the bobbin (1210) through the received voltage value. These series of processes are generated in real time, whereby the auto focus function of the camera module according to the present exemplary embodiment can be more accurately performed through the auto focus feedback.

Now, the OIS function of camera module according to the exemplary embodiment will be described. When a power is supplied to an OIS coil (1430), the driving magnet (1320) performs a movement relative to the OIS coil (1430) through the electromagnetic interaction between the OIS coil (1430) and the driving magnet (1320). At this time, the housing (1310) coupled by the driving magnet (1320) integrally moves with the driving magnet (1320). That is, the housing (1310) horizontally moves relative to the base (1410). Meantime, at this time, the housing (1310) may be induced of tilt relative to the base (1410). The aforementioned movement of the housing (1310) results in the lens module moving to a direction relative to the image sensor parallel to a direction where the image sensor is placed (direction perpendicular to an optical axis of the lens module), such that the OIS function can be implemented.

Meantime, in order to perform a more accurate realization of OIS function by the camera module according to the present exemplary embodiment, an OIS feedback may be applied. The OIS sensor (1720) may detect a magnetic field of the driving magnet (1320) fixed to the housing (1310). Meantime, when the housing (1310) performs a relative movement to the base (1410), the amount of magnetic field detected by the OIS sensor (1720) can be changed. Meantime, a pair of OIS sensors (1720) detects the horizontal movement (x axis and y axis directions) or the position of the housing (1310) using the thus-mentioned method and transmits a received detection value to the controller. The controller determines whether to perform an additional movement to the housing (1310) through the received detection value. These series of processes are generated in real time, whereby the OIS function of the camera module according to the present exemplary embodiment can be more accurately performed through the OIS feedback.

Hereinafter, effect of lens driving device according to an exemplary embodiment of the present invention will be described with reference to FIGS. 27 and 28.

Figure 27:
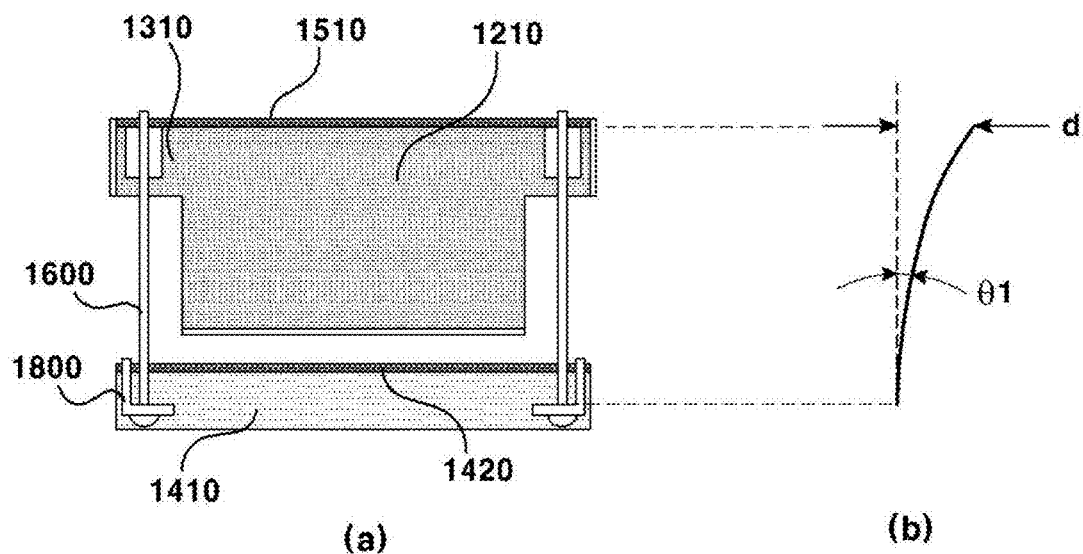
Figure 28:
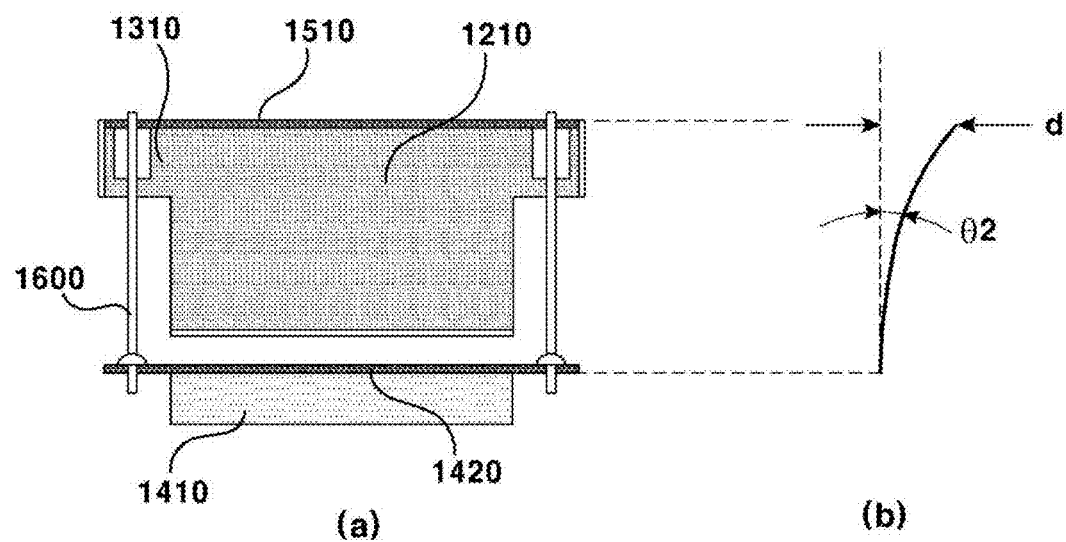

FIG. 27 is a conceptual view illustrating to explain an effect of a lens driving device according to an exemplary embodiment of the present invention, and FIG. 28 is a conceptual view illustrating a comparative example in order to compare with an exemplary embodiment of the present invention.

Referring to FIG. 27, the OIS support member (1600) in the lens driving device according to an exemplary embodiment of the present invention may be coupled to the upper support member (1510) and the second coupling part (1820) of terminal unit (1800). To be more specific, an upper end of OIS support member (1600) may be coupled with the upper support member (1510), and a bottom end of OIS support member (1600) may be coupled to the second coupling part (1820) of terminal unit (1800). At this time, the second coupling part (1820) may be disposed at a position lower than the substrate (1420). Meantime, in the abovementioned structure according to an exemplary embodiment, an operation section of the OIS support member (1600) may be defined by a distance between the upper support member (1510) and the second coupling part (1820) of terminal unit (1800). In the present exemplary embodiment, when an upper end (a coupled area between the OIS support member (1600) and the upper support member (1510) moves as much as a moving distance (d), the OIS support member (1600) may be generated with a deflection as much as a first angle (θ1).

Referring to FIG. 28, the OIS support member (1600) in the lens driving device according to a comparative example may be coupled to the upper support member (1510) and the substrate (1420). To be more specific, an upper end of the OIS support member (1600) may be coupled with the upper support member (1510), and a bottom end of OIS support member (1600) may be coupled with an upper surface of substrate (1420). At this time, a height {height from a floor surface of base (1410)} of substrate (1420) according to the comparative example may correspond to a height of substrate (1420) of the present exemplary embodiment. That is, the height of substrate (1420) according to the comparative example may be higher than the height of second coupling part (1820) of terminal unit (1800) of present exemplary embodiment. Meantime, in the structure of the abovementioned comparative example, an operation section of OIS support member (1600) may be defined by a distance between the upper support member (1510) and the substrate (1420). In the comparative example, when an upper end of OIS support member (1600) moves as much as a moving distance (d), a deflection as much as a second angle (θ2) may be generated on the OIS support member (1600).

At this time, the second angle (θ2) may be greater than a first angle (θ1). That is, the OIS support member (1600) according to a comparative example may receive a stress greater than that of the OIS support member (1600) according to the present exemplary embodiment when a same moving distance (d) is driven. In other words, the OIS support member (1600) according to an exemplary embodiment may receive a less stress than that of the OIS support member (1600) according to the comparative example when a same moving distance (d) is driven.

A distal end of one side of OIS support member (1600) in the OIS structure according to the comparative example may be fixed to the upper support member (1510) by soldering and a distal end of the other side may be fixed to the substrate (1420) by soldering. Thus, a length of operation part at the OIS support member (1600) may be determined by a distance between the upper support member (1510) and the substrate (1420). As structure of smart phone gets thinner, and when a distance between the upper support member (1510) and the substrate (1420) grows gradually shorter, the length of operation part of the OIS support member (1600) also gets shorter. At this time, the OIS support member (1600) may be increased in deflection relative to a repeated same moving distance (d) to thereby increase a stress. When the stress applied to the OIS support member (1600) as discussed above increases, a more electricity is required for driving and time for driving is also increased to the disadvantage of the mobile phone.

Moreover, when time persists while the stress applied to the OIS support member (1600) is increased, there is a problem of the OIS support member (1600) being destroyed.

The present exemplary embodiment is to provide an assembly structure configured to shorten a length of OIS support member (1600) even if structure of smart phone is gradually thinner. In the exemplary embodiment, a distal end of one side of the OIS support member (1600) is fixed to the upper support member (1510) by soldering and the other side is fixed to the terminal unit (1800) by soldering. At this time, because the terminal unit (1800) is fixed to the (1410) and a soldered position between the terminal unit (1800) and the OIS support member (1600) is formed at a position lower than the substrate (1420), a length of operation part of OIS support member (1600) may be lengthened over a structure of being soldered to the substrate (1420).

FIGS. 29 to 36b illustrate a lens driving device according to a third exemplary embodiment of the present invention.

Figure 29:
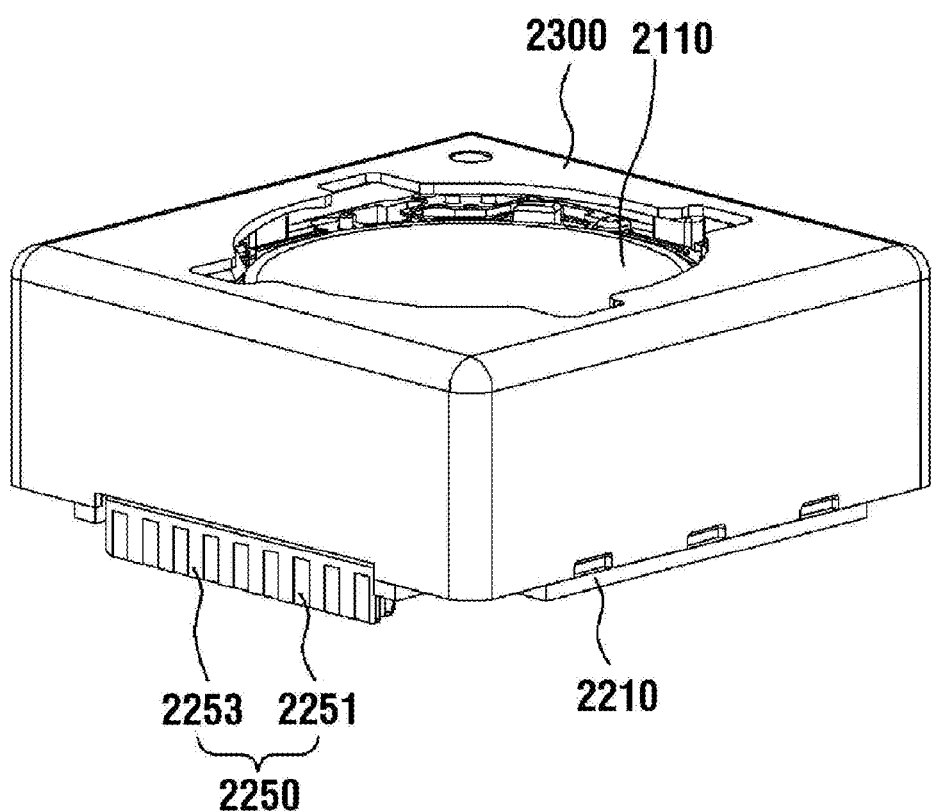
Figure 30A:
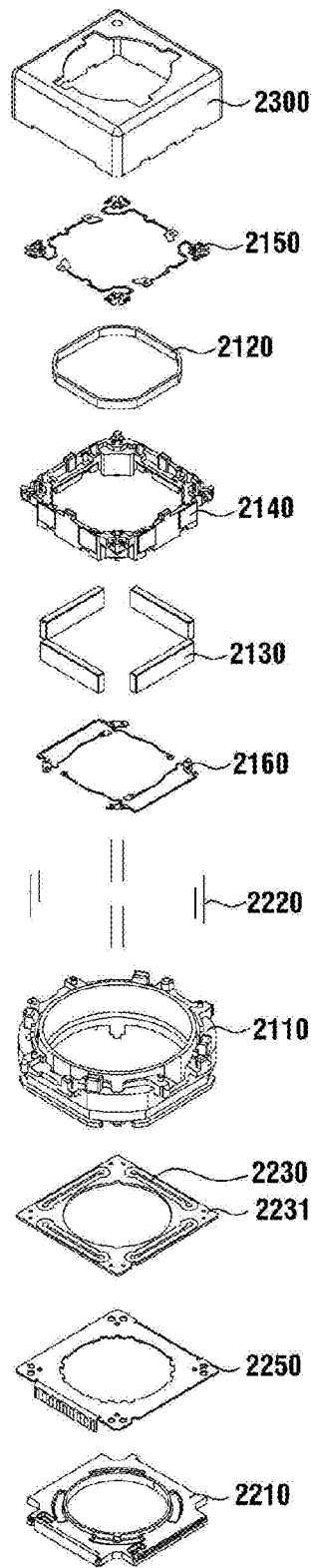
FIG. 30a is an exploded perspective view illustrating a lens driving device according to an exemplary embodiment of the present invention.

FIG. 29 is a perspective view of lens driving device according to an exemplary embodiment of the present invention. FIG. 30a is an exploded perspective view of lens driving device according to an exemplary embodiment.

A handshake correction device (OIS device) applied to a small camera module of a portable device such as a smart phone or a tablet PC means a device configured to inhibit an outline of a photographed image from being unclearly formed by vibration from a user's handshake during photographing of a still image.

Furthermore, an autofocusing device is a device automatically capturing a focus of an image of a subject on a surface of an image sensor (not shown). The OIS device and autofocusing device thus described may be variably configured, where in the case of exemplary embodiment, an optical module formed with a plurality of lenses may be moved to a first direction, or moved to a direction perpendicular to the first direction, whereby the OIS operation and/or autofocusing operation can be implemented.

As illustrated in FIG. 30a, the lens driving device according to an exemplary embodiment may include a mover and a stator. At this time, the mover may perform an autofocusing function of a lens. The mover may include a bobbin (2110) and a first coil (2120), and the stator may include a first magnet (2130), a housing (2140), an upper elastic member (2150) and a bottom elastic member (2160).

The bobbin (2110) may be disposed at an inside of the housing (2140), and an outer circumferential surface may be disposed with a first coil (2120) disposed at an inside of the first magnet (2130), and the bobbin (2110) may be reciprocally disposed at an inner space of housing (2140) to a first direction through an electromagnetic interaction between the first magnet (2130) and the first coil (2120). The outer circumferential surface of bobbin (2110) may be disposed with the first coil (2120) to enable an electromagnetic interaction with the first magnet (2130).

Furthermore, the bobbin (2110) may be elastically supported by the upper and bottom elastic members (2150, 2160) and perform the autofocusing function by moving to the first direction.

The bobbin (2110) may include a lens barrel (not shown) mounted therein with at least one lens. The lens barrel may be variably coupled to an inner side of bobbin (2110) using various methods. For example, a female screw thread may be formed at an inner surface of bobbin (2110) and a male screw thread corresponding to the female screw thread may be formed at an outside of lens barrel to thereby screw-couple the lens barrel to the bobbin (2110). However, the present invention is not limited thereto, and a screw thread may not be formed on the inside of bobbin (2110) and the lens barrel may be directly fixed to the inside of bobbin (2110) using methods other than the screw-coupling method. Alternatively, one or more sheets of lenses may be integrally formed with the bobbin (2110) without recourse to the lens barrel.

The lens coupled with the lens barrel may be formed with one sheet, two sheets or more than two sheets of lenses, and an optical system may be configured to be formed with two or more sheets of lenses.

The autofocusing function may be controlled by direction of current and/or amount of current, and may be implemented by an operation of moving the bobbin (2110) to the first direction. For example, when a forward current is applied, the bobbin (2110) may move upwardly from an initial position, and when a reverse current is applied, the bobbin (2110) may move downwardly from an initial position. Alternatively, an amount of current of one direction may be controlled to increase or decrease a moving distance to the one direction from the initial position.

An upper surface and a bottom surface of bobbin (2110) may be protrusively formed with a plurality of upper support protrusions and bottom support protrusions. The upper support protrusion may be provided with a cylindrical shape or a prism shape, and the upper elastic member (2150) may be guided to allow being coupled and fixed with the upper elastic member (2150). The bottom support protrusion may be also provided with a cylindrical shape or a prism shape as the upper support protrusion, and the bottom elastic member (2160) is guided to allow being coupled and fixed with the bottom elastic member (2160).

At this time, the upper elastic member (2150) may be formed with through hole and/or groove corresponding to the upper support protrusion, and the bottom elastic member (2160) may be formed with through holes and/or grooves corresponding to the bottom support protrusion. Each of the support protrusions, through holes and/or grooves may be fixedly coupled using heat fusion or epoxy such as an adhesive member.

The housing (2140) may take a hollowed cylindrical shape supporting the first magnet (2130), and may substantially take a square shape. A lateral surface of housing (2140) may be coupled and disposed with a first magnet (2130). Furthermore, as mentioned above, the housing (2140) may be mounted therein with a bobbin (2110) that is guided by the elastic members (2150, 2160) to move to the first direction.

The upper elastic member (2150) may be disposed at an upper side of bobbin (2110), and the bottom elastic member (2160) may be disposed at a bottom side of bobbin (2110). The upper elastic member (2150) and the bottom elastic member (2160) may be coupled with the housing (2140) and the bobbin (2110), and the upper elastic member (2150) and the bottom elastic member (2160) may elastically support an ascending and/or descending operations to the first direction of bobbin (2110). The upper elastic member (2150) and the bottom elastic member (2160) may be formed with leaf springs.

The upper elastic member (2150), as illustrated in FIG. 30a, may be separately disposed and formed in a plural number. Through this multi-divisional structure, each divided section of upper elastic member (2150) may be applied with mutually different polarities of currents or powers, or may become a current transfer path. Furthermore, the bottom elastic member (2160) may be also formed with multi-divisional structure to be electrically connected to the upper elastic member (2150).

Meantime, the upper elastic member (2150), the bottom elastic member (2160), the bobbin (2110) and the housing (2140) may be assembled through heat fusion and/or bonding operations using an adhesive agent.

The base (2210) may be disposed underneath a PCB (2250) and a circuit member (2231), and provided with a substantially square shape, and disposed or accommodated with the PCB (2250). That is, the PCB (2250) may be interposed between the circuit member (2231) and the base (2210).

A surface opposite to an area formed with a terminal surface (2253) of PCB (2250) of base (2210) may be formed with a support groove with a corresponding size. The support groove may be inwardly recessed at a predetermined depth from an outside of base (2210) to inhibit an area formed with the terminal surface (2253) from being protruded to outside or to adjust an amount of protrusion.

The support member (2220) may be spaced apart, at a lateral surface of housing (2140), i.e., a corner of the housing (2140), from the housing (2140) to allow an upper side to be coupled with the upper elastic member (2150), and a bottom side to be coupled with the PCB (2250), to allow the bobbin (2110) and the housing (2140) to move to a second and/or third direction perpendicular to the first direction, and to allow being electrically connected to the first coil (2120). The support member (2220), as another exemplary embodiment, may be also coupled at a bottom side with the base (2210) or with the circuit member (2231).

The support member according to an exemplary embodiment may be respectively disposed at an outside surface of an edge of the housing (2140) in a pair, and therefore a total of eight support members is installed. In another exemplary embodiment, a total of four (4) the support members (2220) may be respectively formed, each at outside of a corner of the housing (2140). Alternatively, in still another exemplary embodiment, two support members on two corners, and one support member on the remaining two corners, a total of six (6) support members may be formed. Alternatively, a total of seven or nine or more support members may be disposed.

Furthermore, the support member (2220) may be electrically connected with the upper elastic member (2150). That is, for example, the support member (2220) may be electrically connected with an area formed with a through hole of upper elastic member (2150).

Moreover, the support member (2220) may be provided as a member separate from the upper elastic member (2150) to allow being electrically connected to the upper elastic member (2150) using a conductive adhesive agent, soldering or welding. Thus, the upper elastic member (2150) may apply an electric power to the first coil (2120) through the electrically connected support member (2220).

The support member (2220) may be connected to the PCB (2250) through a through hole formed on the circuit member (2231) and/or PCB (2250). Alternatively, the support member (2220) may be formed by an electrical soldering on an area corresponding to the circuit member (2231) while the circuit member (2231) and/or the PCB (2250) are not formed with through hole.

Meantime, although FIG. 30a has illustrated a wire type support member (2220) as one exemplary embodiment, the present invention is not limited thereto, and the support member (2220) may be formed with a plate type member.

The second coil (2230) may implement the OIS function by moving the housing (2140) to the second and/or third direction through an electromagnetic interaction with the first magnet (2130).

Here, the second and third directions may include not only x axis (or first direction) and y axis (or second direction) but also a direction substantially close to x axis and y axis directions. That is, in light of a driving aspect of the exemplary embodiment, although the housing (2140) may move in parallel with the x axis and y axis, the housing (2140) may also a bit slantly move relative to the x axis and y axis when moving by being supported by the support member (2220). Thus, there may be required a need of the first magnet (2130) being formed at a position corresponding to that of the second coil (2230).

The second coil (2230) may be so disposed as to face the first magnet (2130) fixed to the housing (2140). As an exemplary embodiment, the second coil (2230) may be disposed outside of the first magnet (2130). Alternatively, the second coil (2230) may be disposed at a bottom side of the first magnet (2130) while being spaced apart at a predetermined distance.

According to the exemplary embodiment, the second coil (2230) may be formed on four sides of circuit member (2231), a total of four pieces, but the present invention is not limited thereto, and only two second coils (2230) may be formed, i.e., each one for second direction and for third direction, and a total of four pieces may be also installed.

Alternatively, a total of six second coils may be formed, i.e., one at a first side for the second direction, two second coils at a second side for second direction, one second coil at a third side for third direction and two second coils at a fourth side for third direction. Alternatively, in this case, the first side and the fourth side may be mutually adjacent, and the second side and the third side may be mutually adjacent.

In case of exemplary embodiment, a circuit pattern may be formed on the circuit member (2231) in a shape of the second coil (2230), or a separate second coil may be disposed at an upper surface of circuit member (2231). However, the present invention is not limited thereto and a circuit pattern may be directly formed at an upper surface of circuit member (2231) in a shape of the second coil (2230).

Alternatively, a wire is wound in a shape of a doughnut to form a second coil (2230), or a second coil (2230) may be formed in an FP coil style to be electrically connected to the PCB (2250).

The circuit member (2231) including the second coil (2230) may be so disposed as to face the first magnet, and may be installed or disposed at an upper surface of PCB (2250) disposed at an upper side of base (2210). However, the present invention is not limited thereto, and the second coil (2230) may be tightly disposed with the base (2210), and spaced apart from the base (2210) at a predetermined distance, or may be formed on a separate substrate where the substrates are stacked on the PCB (2250) for connection.

The PCB (2250) may be electrically connected to at least one of the upper elastic member (2150) and the bottom elastic member (2160), and may be coupled to an upper surface of base (2210), and as illustrated in FIG. 30a, and a through hole inserted by the support member (2220) may be formed at an area corresponding to that of a distal end of the support member (2220). Alternatively, the PCB may be electrically connected and/or coupled by being bonded to the support member, without forming a through hole.

Furthermore, the PCB (2250) may be disposed at a bottom side of circuit member (2231) to be electrically connected to the circuit member (2231), and may be also electrically connected to the second coil (2230) disposed at the circuit member (2231).

The PCB (2250) may be disposed or formed with a terminal (2251), and the terminal (2251) may be disposed at a bent terminal surface (2253). the terminal surface (2253) may be disposed with a plurality of terminals (2251) to receive an outside power and to supply a current to the first coil (2120) and/or to the second coil (2230). The number of terminals formed on the terminal surface (2253) may be increased or decreased depending on the types of elements necessary for control. Furthermore, the PCB (2250) may be formed with one or two or more terminal surfaces (2253).

The cover member (2300) may be provided with a substantially boxed shape to accommodate in part or in whole the mover, the second coil (2230) and the PCB (2250), and may be coupled with the base (2210). Moreover, a portion of the cover member (2300) may be disposed at an upper side of support member (2220).

The cover member (2300) may protect the mover, the second coil (2230) and the PCB (2250) accommodated therein against damage, and may restrict the electromagnetic field generated from the first magnet (2130), the first coil (2120) and the second coil (2230) accommodated therein from being leaked to an outside to thereby enable the electromagnetic fields to be concentrated.

Figure 30B:
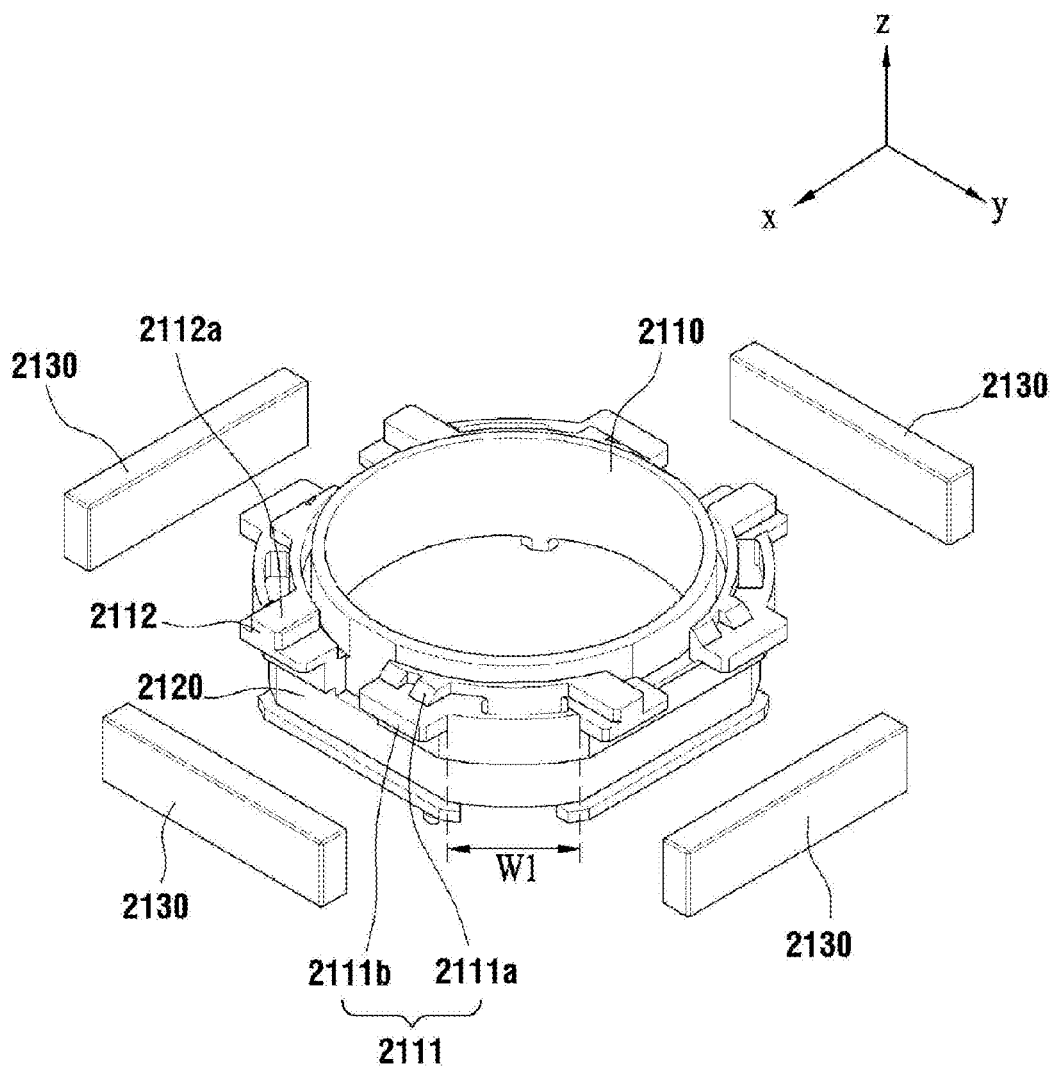
FIG. 30b is an exploded perspective view illustrating an arrangement state of a bobbin and a first magnet according to an exemplary embodiment of the present invention.

Hereinafter, the structure of bobbin (2110) and housing (2140) will be described in more detail with reference to FIGS. 30b and 30c. FIG. 30b is an exploded perspective view illustrating an arranged state of the bobbin (2110) and the first magnet (2130) according to an exemplary embodiment of the present invention.

The bobbin (2110) may be disposed inside of the housing (2140), and may move to a first direction, i.e., z axis direction, by the electromagnetic interaction between the first coil (2120) and the first magnet (2130).

The bobbin (2110) may take a shape of a hollow-holed structure for mounting a lens or a lens barrel. The shape of hollow hole may be round, oval or polygonal shape, but the present invention is not limited thereto.

The bobbin (2110) may include first and second lugs (2111, 2112). The first lug (2111) of bobbin (2110) may include a guide part (2111a) and a stopper (2111b).

The guide part (2111a) of bobbin (2110) may perform a function of guiding an installation position of the upper elastic member (2150). For example, the guide part (2111a) of bobbin (2110) may guide a path in which a portion of upper elastic member (2150) passes.

For example, the plurality of guide parts (2111a) may be protrusively formed to second and third directions perpendicular to the first direction. Furthermore, the guide parts (2111a) may be symmetrically provided relative to a center of bobbin (2110) on a plane surface where the x axis and y axis are formed, and unlike the exemplary embodiment, may be provided with non-symmetrical structure ruled out of interference with other elements.

The second lug (2112) of bobbin (2110) may be protrusively formed to the second and third directions perpendicular to the first direction. Moreover, an upper surface (2112a) of second lug (2112) of bobbin (2110) may take a shape to allow the upper elastic member (2150) to be accommodated thereon.

The first stopper (2111b) of first lug (2111) and second lug (2112) may implement a function of inhibiting a floor surface of body part at the bobbin (2110) from directly colliding with the base (2210) and an upper surface of circuit substrate (2250) even if the bobbin (2110) is moved beyond a specified scope by an outside shock when the bobbin (2110) moves to a first direction for autofocusing function.

When a state, where a bottom surface of first and second lugs (2111, 2112) of bobbin (2110) and a floor surface (2146a) of first receptor groove (2146) of the housing (2140) are contacted, is set as an initial position, the autofocusing function may be controlled as in a single direction control at the conventional VCM (Voice Coil Motor). That is, when a current is supplied to the first coil (2120), the bobbin (2110) ascends and when the current supply is interrupted, the bobbin (2110) descends to realize the autofocusing function.

However, when a state, where a bottom surface of first and second lugs (2111, 2112) of bobbin (2110) and a floor surface (2146a) of first receptor groove (2146) of the housing (2140) are spaced apart at a predetermined distance, is set as an initial position, the autofocusing function may be controlled to a bi-direction depending on a direction of current. That is, the autofocusing function may be implemented through an operation where the bobbin (2110) is moved upwardly and downwardly to the first direction.

For example, when a forward current is applied, the bobbin (2110) may be upwardly moved, and when a reverse current is applied, the bobbin (2110) may be downwardly moved.

Figure 30C:
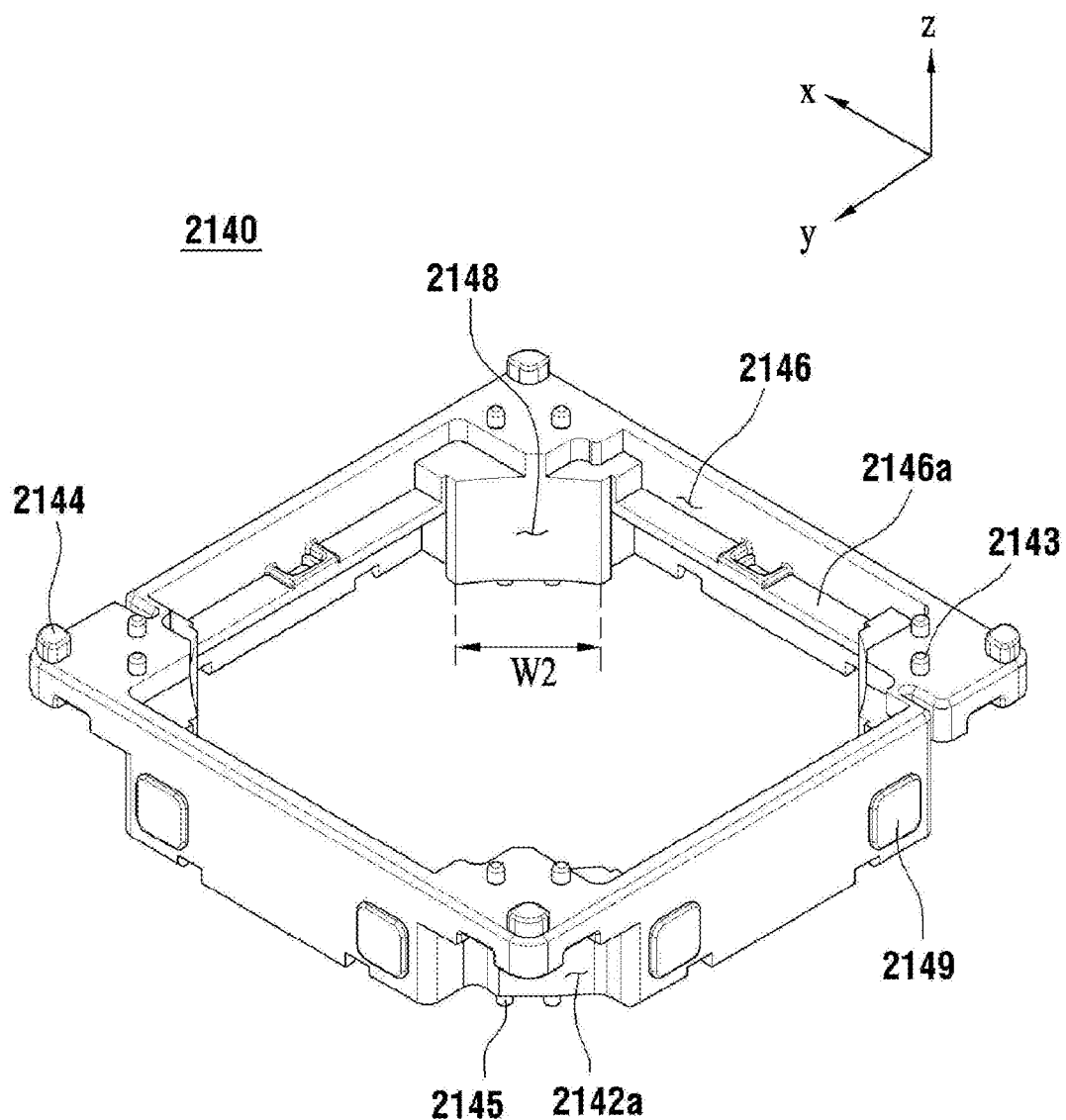
FIG. 30c is a perspective view illustrating a housing according to an exemplary embodiment of the present invention.

FIG. 30c illustrates a perspective view of a housing (2140) according to an exemplary embodiment of the present invention. The housing (2140) may include a first receptor groove (2146) formed at a position corresponding to that of the first and second lugs (2111, 112) of bobbin (2110). The housing (2140) may include a third lug (2148) corresponding to a space having a first width (W1) between the first and second lugs (2111, 112) of bobbin (2110).

A surface of the third lug (2148) of housing (2140) facing the bobbin (2110) may have a same shape as that of lateral surface of the bobbin (2110). At this time, there may be a predetermined tolerance between the first width (W1) formed between the first and second lugs (2111, 2112) of bobbin (2110) illustrated in FIG. 30c and a second width (W2) of the third lug (2148) of housing (2140) illustrated in FIG. 34.

This tolerance may restrict the third lug (2148) of housing (2140) from rotating between the first and second lugs (2111, 112) of bobbin (2110). Then, even if a force is received to a direction rotating not to a direction of optical axis but about a center of optical axis, the third lug (2148) of housing (2140) can inhibit the bobbin (2110) from rotating.

Meantime, the housing (2140) may be provided at an upper end with a second stopper (2144) in order to inhibit from being directly collided with an inner surface of cover member (2300) illustrated in FIGS. 29 and 30a.

The housing (2140) may be formed at an upper surface with at least one upper support lug (2143) in order to be coupled with the upper elastic member (2150).

For example, the upper support lug (2143) of housing (2140) may be formed at an upper surface of a corner area of housing (2140). The upper support lug (2143) of housing (2140) may take a hemispheric shape as exemplified, and may take a cylindrical or prism shape as opposed to the hemispheric shape, but the present invention is not limited thereto.

Meantime, albeit not being illustrated, the housing (2140) may be formed at a bottom surface at a corner area of housing with at least one bottom support lug (2145) in order to be coupled with the bottom elastic member (2160). The bottom support lug (2145) may be formed at a position corresponding to that of the upper support lug with a shape corresponding to that of upper support lug, but the present invention is not limited thereto.

In order to obtain a space to be filled with gel-type silicon capable of functioning as a damper, the housing (2140) may be formed at a lateral surface of a corner with a first concave groove (2142a). That is, the concave groove (2142a) of housing (2140) may be filled with damping silicon.

The housing (2140) may include a plurality of third stoppers (2149) that is protruded from a lateral surface of each side. The third stopper (2149) may function to inhibit from being collided with the cover member (2300) when the housing (2140) moves to the second and third directions.

In order to inhibit a floor surface of housing (2140) from colliding with the base (2210) or the circuit substrate (2250), the housing (2140) may further include a fourth stopper (not shown) protruded from a bottom surface. Through this structure, the housing (2140) may be spaced apart from the base (2210) at a bottom side to thereby maintain a height to the optical axis direction without being vertically interfered at an upper side by being spaced apart from the cover member (2300).

Figure 31:
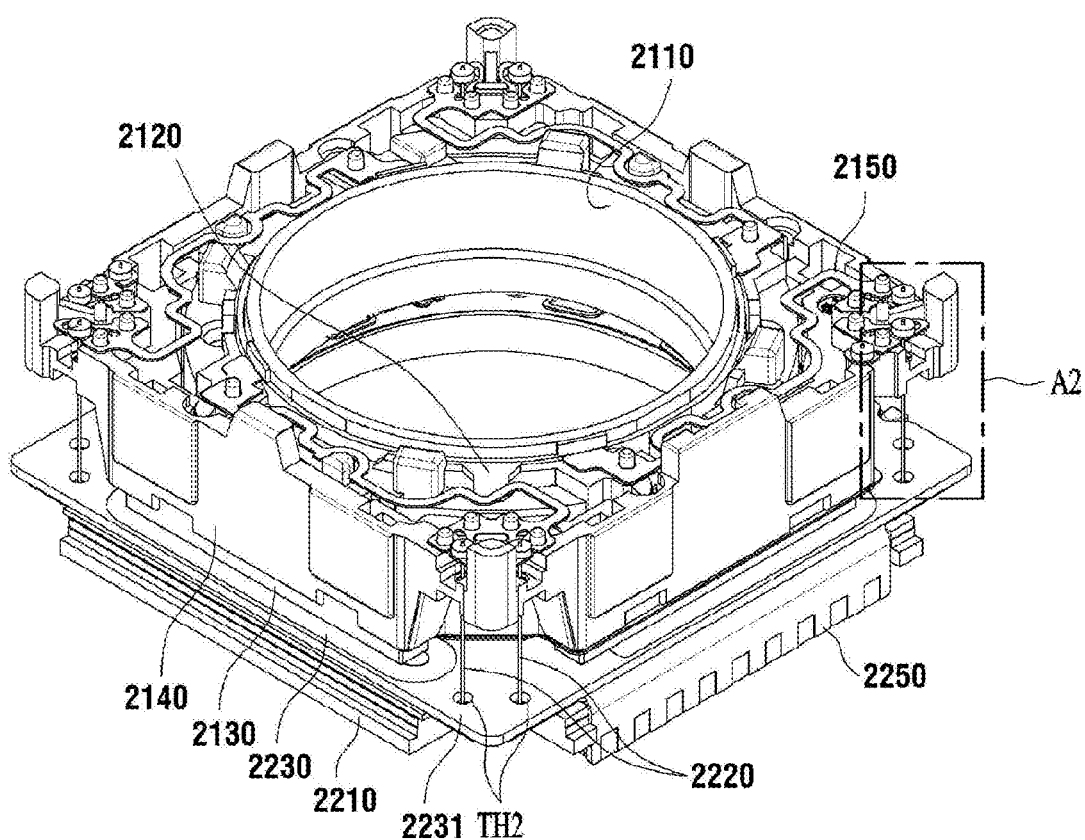
Figure 32:
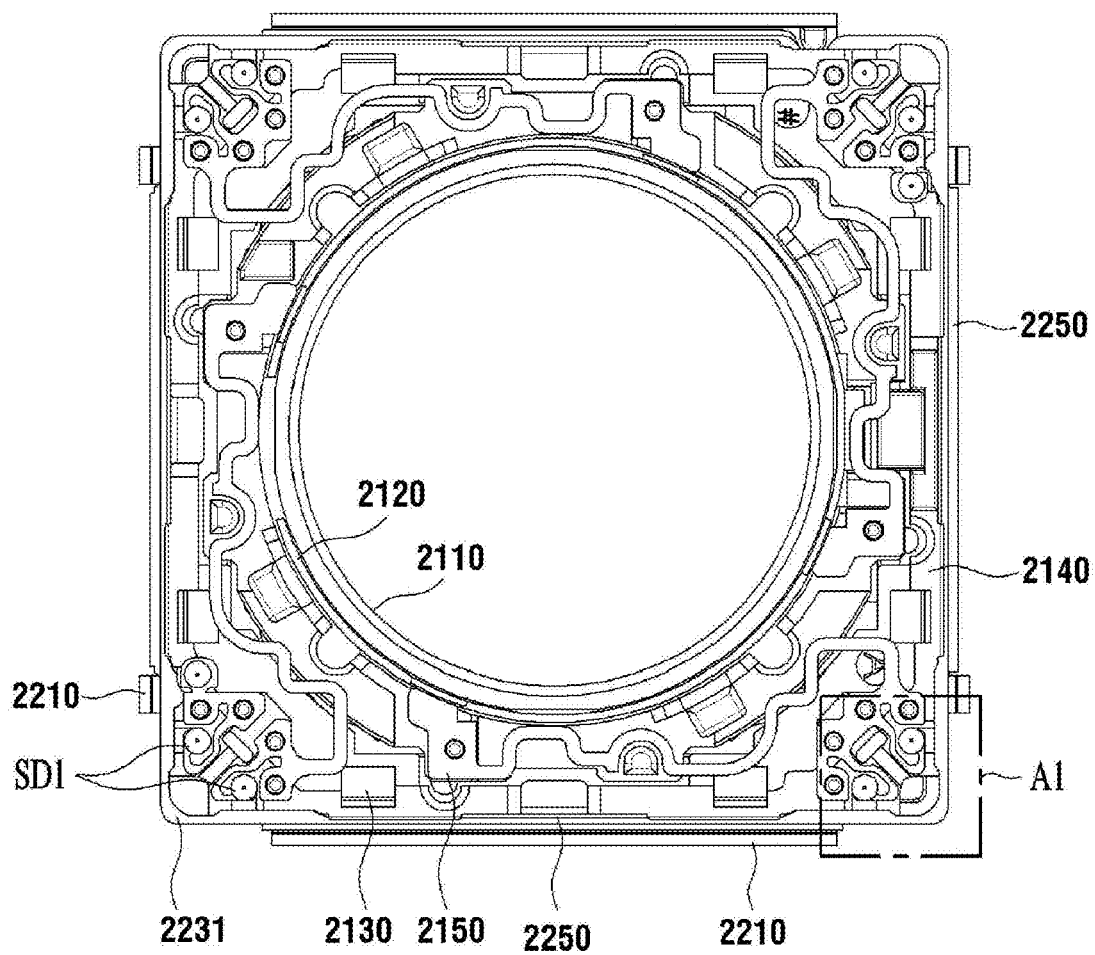
Figure 33:
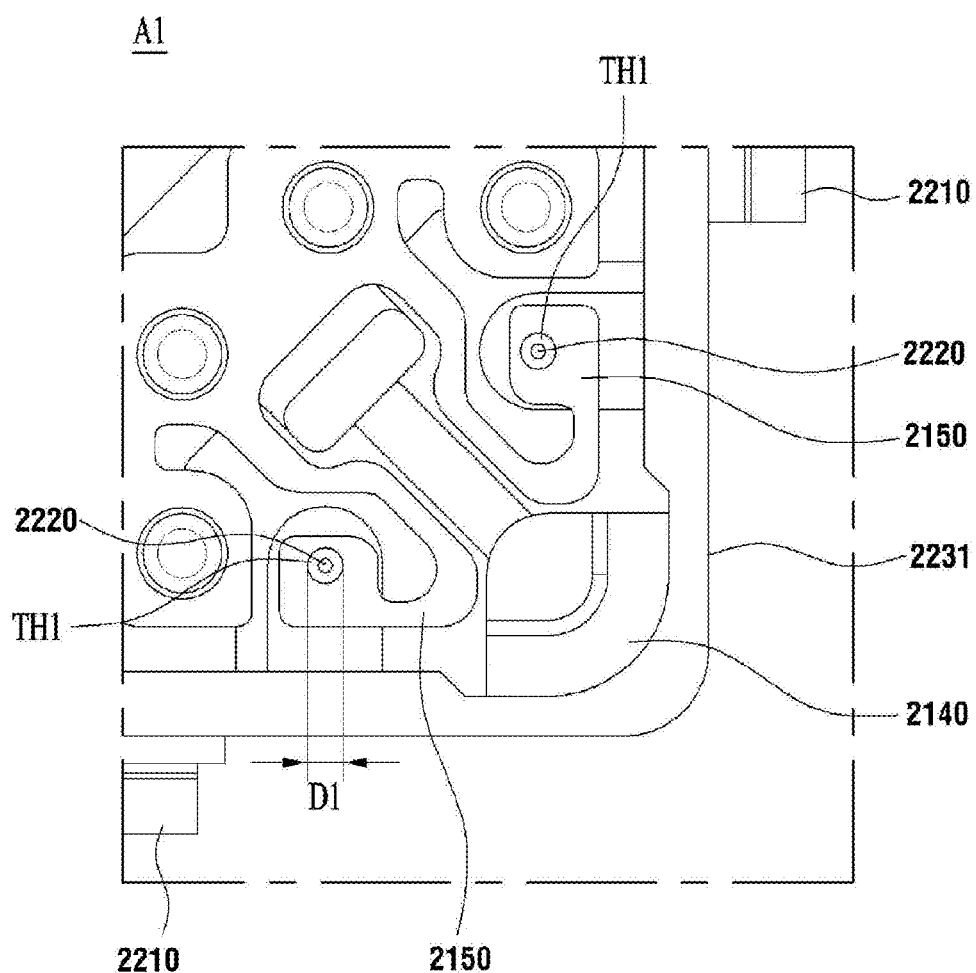

FIG. 31 is a perspective view illustrating a state where a cover member is removed from a lens driving device according to an exemplary embodiment of the present invention, FIG. 32 is a plane view of FIG. 31, and FIG. 33 is an enlarged view illustrating A1 portion of FIG. 32. Meantime, FIG. 33 illustrate a structure removed of a first soldering part (SD1) for further clear explanation.

In the exemplary embodiment, the support member (2220) may be coupled at an upper end with the upper elastic member (2150) and coupled at a bottom with the PCB (2250). The structure of the bottom end of the support member (2220) being coupled with the PCB (2250) is explained hereunder in detail with reference to FIG. 34.

First, a structure of the upper end of the support member (2220) being coupled with the upper elastic member (2150) will be explained.

The support member (2220) may be formed with a linear shape, and may be coupled at an upper end with the upper elastic member (2150). In order to couple the support member (2220) with the upper elastic member (2150), as illustrated in FIG. 33, the upper elastic member (2150) may be formed with a first through hole (TH1) inserted by the support member (2220). At this time, the upper end of support member (2220) and the upper elastic member (2150) may be mutually soldered and coupled.

The first through hole (TH1) may be formed in the same number as that of the support member (2220) disposed on the lens driving device. Although eight support members (2220) are formed in the present exemplary embodiment such that the first through hole (TH1) may be formed in the number of 36 pieces, it should be apparent that the number of through holes may be changed in response to the changing number of support members (2220).

The upper end of support member (2220) inserted into the first through hole (TH1) and the upper elastic member (2150) may be mutually soldered and coupled thereby. That is, the support member (2220) may be coupled by the soldering to an upper surface of upper elastic member (2150) by passing through the first through hole (TH1).

Toward this end, as illustrated in FIG. 32, the lens driving device may include a first soldering part (SD1) that couples the support member (2220) with the upper elastic member (2150) and that is coupled to an upper surface of support member (2220).

The first soldering part (SD1) may be an area where the upper elastic member (2150) and the support member (2220) are soldered. Although FIGS. 31 to 33 have illustrated that the first soldering part (SD1) are shaped of a cylindrical pillar, this illustration is a mere exemplary embodiment and it should be apparent that other various shapes may be obviously used.

Meantime, a diameter (D1) of first through hole (TH1) may be formed to be greater than that of the support member (2220). This is to enable the support member (2220) to be elastically deformed at an area inserted into the first through hole (TH1).

Meantime, a diameter (D1) of first through hole (TH1) may be adequately selected in consideration of the fact that the support member (2220) must be elastically deformed on the x-y plane without being interrupted while the OIS function is performed, and the solder should not be excessively introduced into the first through hole (TH1) when the first soldering part (SD1) is formed by soldering.

Through the abovementioned structures, the support member (2220) may be elastically deformed at an area inserted into the first through hole (TH1), i.e., a section from an upper surface of upper elastic member (2150) to a bottom surface of upper elastic member (2150). It should be apparent that a section from an upper surface of upper elastic member (2150) to a bottom surface of upper elastic member (2150) may mean a thickness measured toward the first direction of the upper elastic member (2150).

That is, an area at the support member (2220) soldered by the first soldering part (SD1) is not elastically deformed, but the elastic deformation is significantly restricted, such that, when the OIS function is implemented, the elastic deformation of the support member (2220) may be possible from a bottom end of the first soldering part (SD1) formed at an upper surface of the upper elastic member (2150).

In sum, because of the abovementioned structure, an elastic deformation section of support member (2220) may be increased as much as a thickness to the first direction of the upper elastic member (2150).

Figure 34:
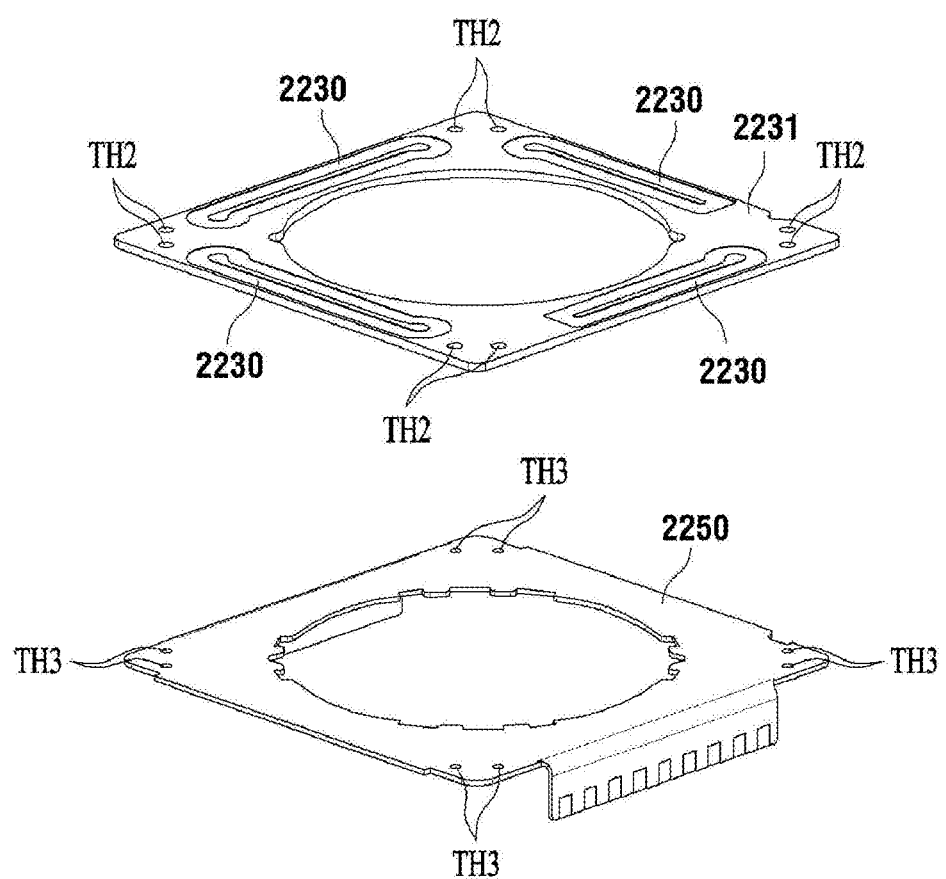
Figure 35:
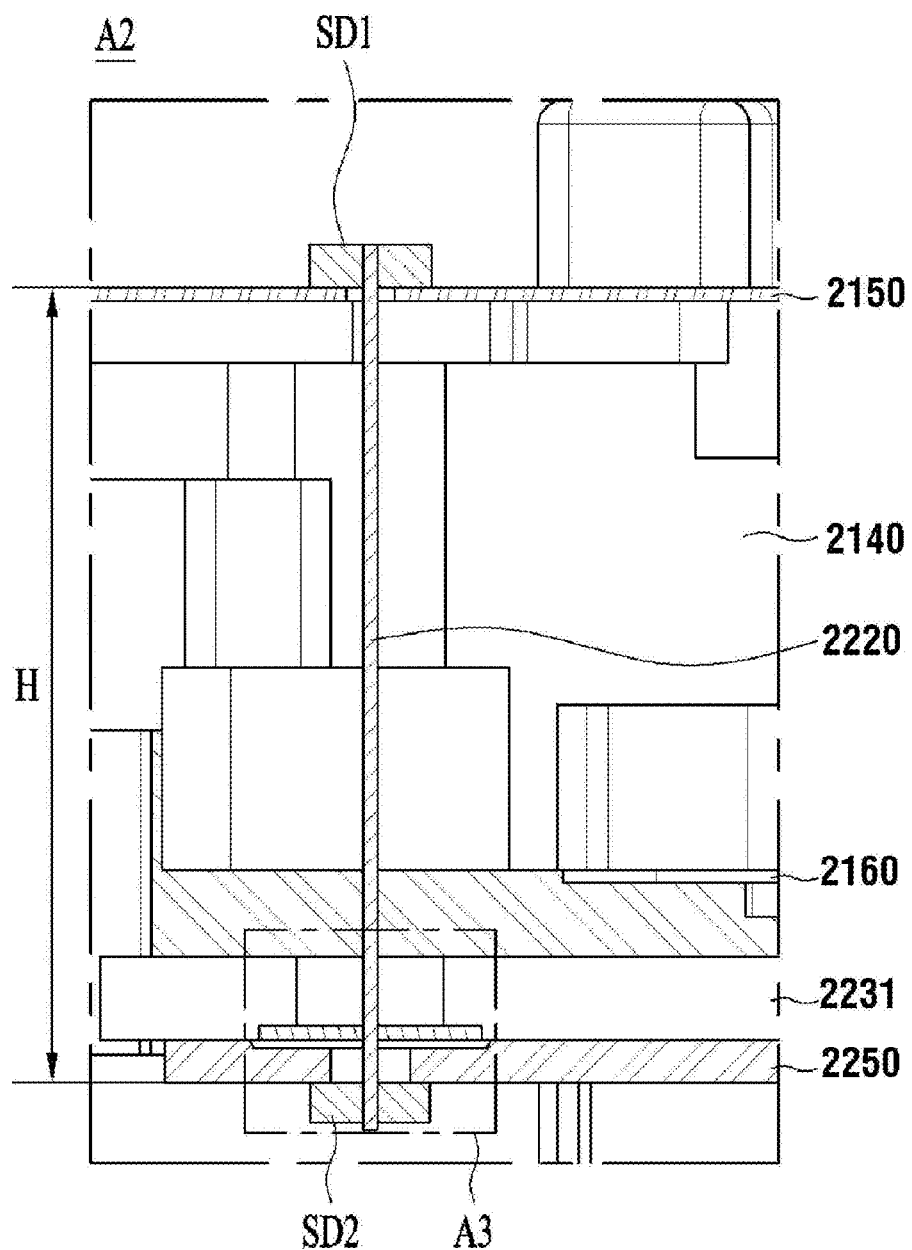
Figure 36A:
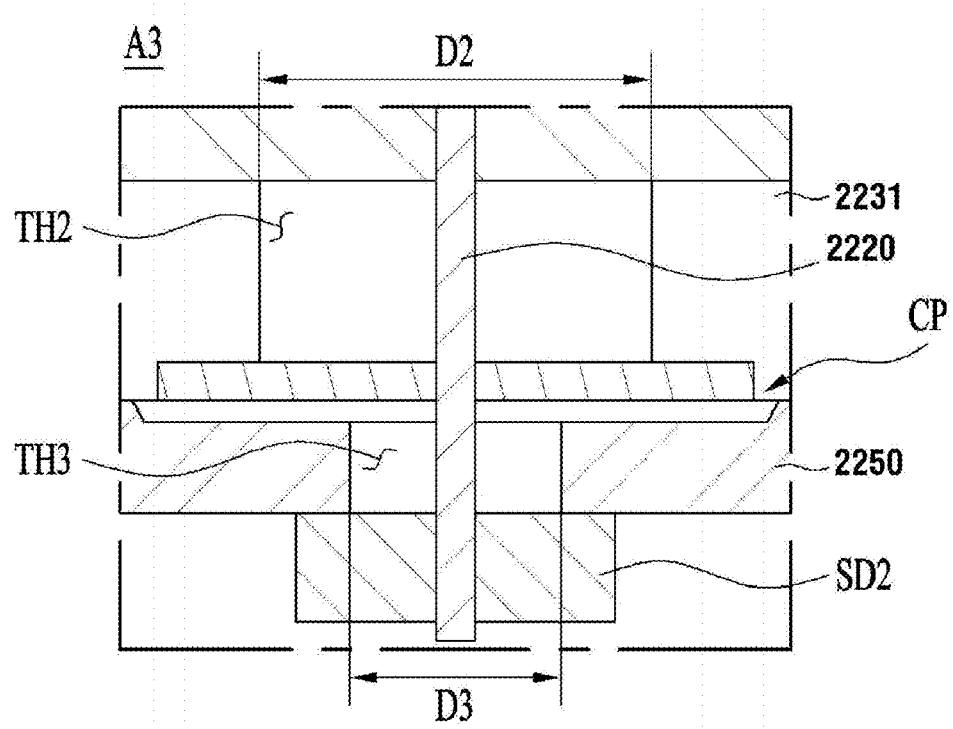
FIG. 36a is an enlarged view illustrating A3 portion of FIG. 35.

FIG. 34 is a perspective view illustrating structures of circuit member and PCB in a lens driving device according to an exemplary embodiment of the present invention, FIG. 35 is a cross-sectional view illustrating A2 portion of FIG. 31, and FIG. 36a is an enlarged view illustrating A3 portion of FIG. 35.

As illustrated in FIG. 35, the support member (2220) may be coupled at a bottom end with the PCB (2250). For example, the bottom end of support member (2220) may be coupled to the PCB (2250) by being soldered to the PCB (2250).

As illustrated in FIG. 34, the circuit member (2231) may be formed with a second through hole (TH2) inserted by the support member (2220), and the PCB (2250) may be formed with a third through hole (TH3) at a position corresponding to that of the second through hole (TH2).

Meantime, the support member (2220) is formed to a first direction, such that the first through hole (TH1), the second through hole (TH2) and the third through hole (TH3) may be formed at mutually corresponding positions in the same number to the first direction.

In view of the fact that eight support members (2220) are formed in the exemplary embodiment, the second through hole (TH2) and the third through hole (TH3) may be also formed in the number of 36, but it should be apparent that the number of the second through hole (TH2) and the third through hole (TH3) may be also changed along with the changing number of support members (2220).

A bottom end of support member (2220) may be coupled with the PCB (2250) by passing through the circuit member (2231). Hence, the bottom end of support member (2220) may be inserted into the second through hole (TH2) and the third through hole (TH3) to be coupled with the PCB by way of soldering. That is, the support member (2220) may pass through the second through hole (TH2) and the third through hole (TH3) to be coupled to a bottom surface of PCB by way of soldering.

To this end, as illustrated in FIG. 35, the lens driving device may be formed with a second soldering part (SD2) that couples the support member (2220) with the PCB (2250) and that is coupled to a bottom surface of PCB (2250).

Meantime, as illustrated in FIGS. 30a and 31, a recess groove may be formed at a corner part, which is an area corresponding to an arranged position of the support member (2220) at the base (2210) to allow the support member (2220) to be coupled to a bottom surface of PCB (2250).

The second soldering part (SD2) is an area where the PCB (2250) and the support member (2220) are soldered. Although FIGS. 35 and 36a have illustrated that the second soldering part (SD2) takes a cylindrical pillar shape, this is a mere illustration and it should be apparent that other various shapes may be used for the second soldering part (SD2).

Meantime, a diameter (D3) of the second through hole (TH2) and the third through hole (TH3) may be formed to be greater than that of the support member (2220). This is to enable the support member (2220) to be elastically deformed at an area inserted into the second through hole (TH2) and the third through hole (TH3).

Furthermore, a diameter (D2) of second through hole (TH2) may be formed to be greater than that (D3) of the third through hole (TH3). This is because a width of elastic deformation of the support member (2220) is greater at the second through hole (TH2) than that of the third through hole on the x-y plane.

Thus, a diameter (D3) of third through hole (TH3) may be adequately selected in consideration of the fact that the support member (2220) must be elastically deformed on the x-y plane without being interrupted while the OIS function is performed, and the solder should not be excessively introduced into the third through hole (TH3) when the second soldering part (SD2) is formed by soldering.

Hence, the diameter (D3) of the third through hole may be formed in the range of 0.15 mm to 0.25 mm, for example.

Furthermore, the diameter (D2) of second through hole (TH2) may be adequately selected in light of the fact that the diameter (D2) of second through hole (TH2) may be greater than that of the third through hole, and in light of the structure of circuit member (2231). Thus, the diameter (D2) of second through hole (TH2) may be formed in the range of 0.3 mm to 0.4 mm, for example.

Thus, the support member (2220) may be elastically deformed at an area inserted into the third through hole (TH3), i.e., at a section from an upper surface of PCB (2250) to a bottom surface of PCB (2250) when the support member (2220) is coupled with the PCB (2250).

At this time, the section from an upper surface of PCB (2250) to a bottom surface of PCB (2250) may mean a thickness measured to the first direction of the PCB (2250). The thickness measured at the PCB (2250) to the first direction may be formed in the range of 0.1 mm to 0.2 mm, for example.

That is, in light of the fact that an area at the support member (2220) soldered by the second soldering part (SD2) is not elastically deformed or significantly restricted, the elastic deformation of the support member (2220) may be possible from an upper end of the second soldering part (SD2) formed at a bottom surface of the PCB (2250) when the lens driving device performs an OIS function.

Because of the abovementioned structure, the elastic deformation section of support member (2220) may be increased as much as the thickness of PCB (2250) to the first direction. Thus, the elastic deformation section for the support member (2220) to implement the OIS function may be a section between the first soldering part (SD1) and the second soldering part (SD2). That is, as illustrated in FIG. 35, the support member (2220) may be elastically deformed at a first section (H) between an upper surface of upper elastic member (2150) to a bottom surface of the PCB (2250) for implementation of OIS function.

In the exemplary embodiment, an entire length of the lens driving device to the first direction can be reduced by elongating an elastically-deformable length of support member (2220), i.e., by increasing an elastically deformable section.

That is, as illustrated in FIG. 35, the elastically deformable section of support member (2220) can be increased as much as a value in which a thickness of the upper elastic member (2150) measured to the first direction and a thickness of PCB (2250) measured to the first direction are combined.

In other words, in the present exemplary embodiment, the length of lens driving device to the first direction may be reduced by as much as the value in which the thickness of the upper elastic member (2150) measured to the first direction and the thickness of PCB (2250) measured to the first direction, whereby an entire lens driving device can be manufactured in a slim structure.

Meantime, as the elastically deformable section is increased, an angle slanted by the support member (2220) to the first direction, a tilt angle, may be decreased during the performance of OIS function.

As the tilt angle is reduced, deterioration in image quality that may be generated due to excessive tilt by the bobbin to the first direction can be restricted during the implementation of OIS function.

Figure 36B:
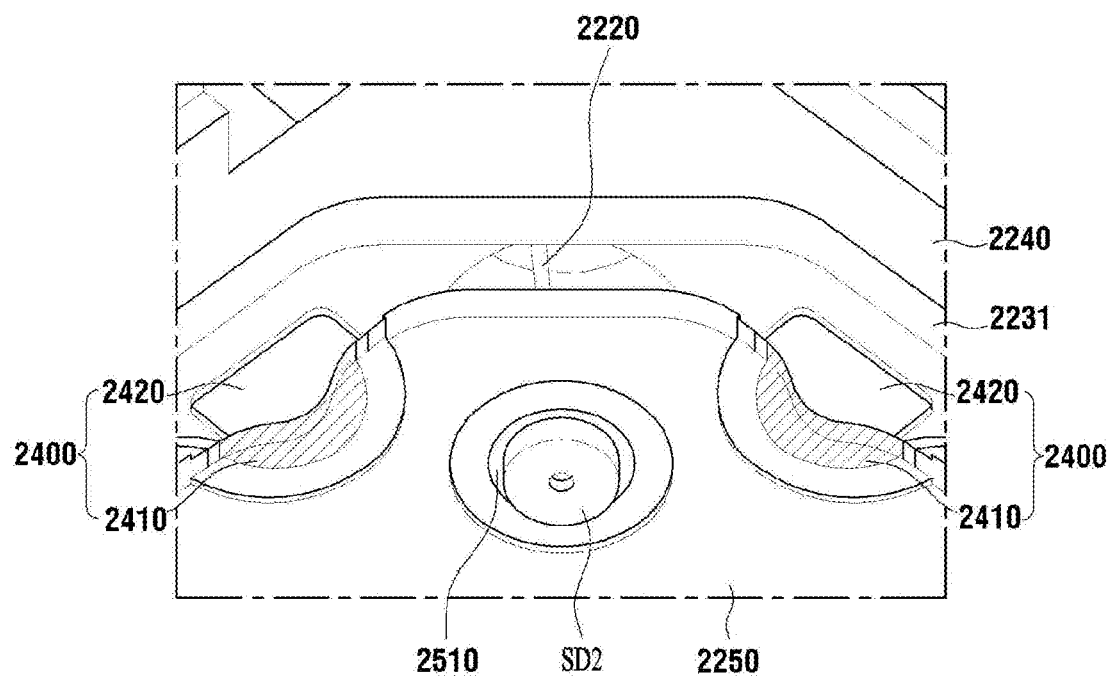
FIG. 36b is a schematic view illustrating an electrically connected structure between a circuit member and a PCB.

FIG. 36b is a schematic view illustrating an electrically connected structure between a circuit member (2231) and a PCB (2250). For clear explanation, FIG. 36b has illustrated a lens driving device in which four support members (2220) are disposed, and each corner part of PCB (2250) is a support member (2220).

The lens driving device may further comprise a first connection part (2400) and a second connection part (2510). The first connection part (2400) may function to mutually and electrically connect the PCB (2250) and the circuit member (2231). The second connection part (2510) may function to mutually and electrically connect the PCB (2250) and the support member (2220).

The first connection part (2400) and the second connection part (2510) may be disposed at corner parts of PCB (2250), the circuit member (2231) and the support member (2220).

At this time, the first connection part (2400), as illustrated in FIG. 36b, may be disposed at both sides of first connection part (2400). In the case of the present exemplary embodiment, the first connection part (2400) may be formed in 8 pieces, and the second connection part (2510) may be formed in 4 pieces.

In another exemplary embodiment, the first connection part (2400) may be disposed only at one side of the first connection part (2400). In case of the present exemplary embodiment, the first connection part (2400) may be 4 pieces, and the second connection part (2510) may be formed with 32 pieces.

In still another exemplary embodiment, the first connection part (2400) may be disposed at both sides of the first connection part (2400). At this time, the second connection part (2510) may be formed in a total number of 8 when each corner part of PCB (2250) is disposed with a pair of support members (2220) as illustrated in FIG. 31. In this exemplary embodiment, the first connection part (2400) and the second connection part (2510) may be respectively formed in the number of 8.

In still further another exemplary embodiment, the first connection part (2400) may be disposed only at one side of the first connection part (2400). At this time, the second connection part (2510) may be formed in a total number of 8 when each corner part of PCB (2250) is disposed with a pair of support members (2220). In this exemplary embodiment, the first connection part (2400) may be formed with 4 pieces and the second connection part (2510) may be formed with 8 pieces.

The first connection part (2400) may be formed with a first terminal (2410) and a second terminal (2420). The first terminal (2410) may be formed in a shape of "C" or in a shape of semi-circle on the PCB (2250), and the second terminal (2420) may be disposed at a position corresponding to that of the first terminal (2410) at a bottom surface of circuit member (2231).

The second connection part (2510) may be formed as a terminal at a bottom surface of PCB (2250), and may be mutually and electrically connected by the first support member (2220) and the second soldering part (SD2).

Meantime, as illustrated in FIG. 36b, the first terminal (2410) may be so disposed as to encompass at least a portion of an upper surface, a bottom surface and a lateral surface of PCB (2250), and the second terminal (2420) may be disposed by being spaced apart at a bottom surface of circuit member (2231) from a lateral surface of circuit member (2231) at a predetermined distance.

At this time, the first terminal (2410) and the second terminal (2420) may be mutually contacted by being mutually oppositely formed toward the first direction, or mutually coupled by using soldering, a conductive film or a conductive adhesive and mutually and electrically connected.

Hence, it is required that the first terminal (2410) and the second terminal (2420) be disposed at mutually opposite positions toward the first direction. For this arrangement, i.e., in order for the first terminal (2410) and the second terminal (2420) to be mutually contacted or coupled, a surface area of the PCB (2250) may be formed to be smaller than that of the circuit member (2231).

FIGS. 37 to 50 illustrate a fourth exemplary embodiment of the present invention.

Figure 37:
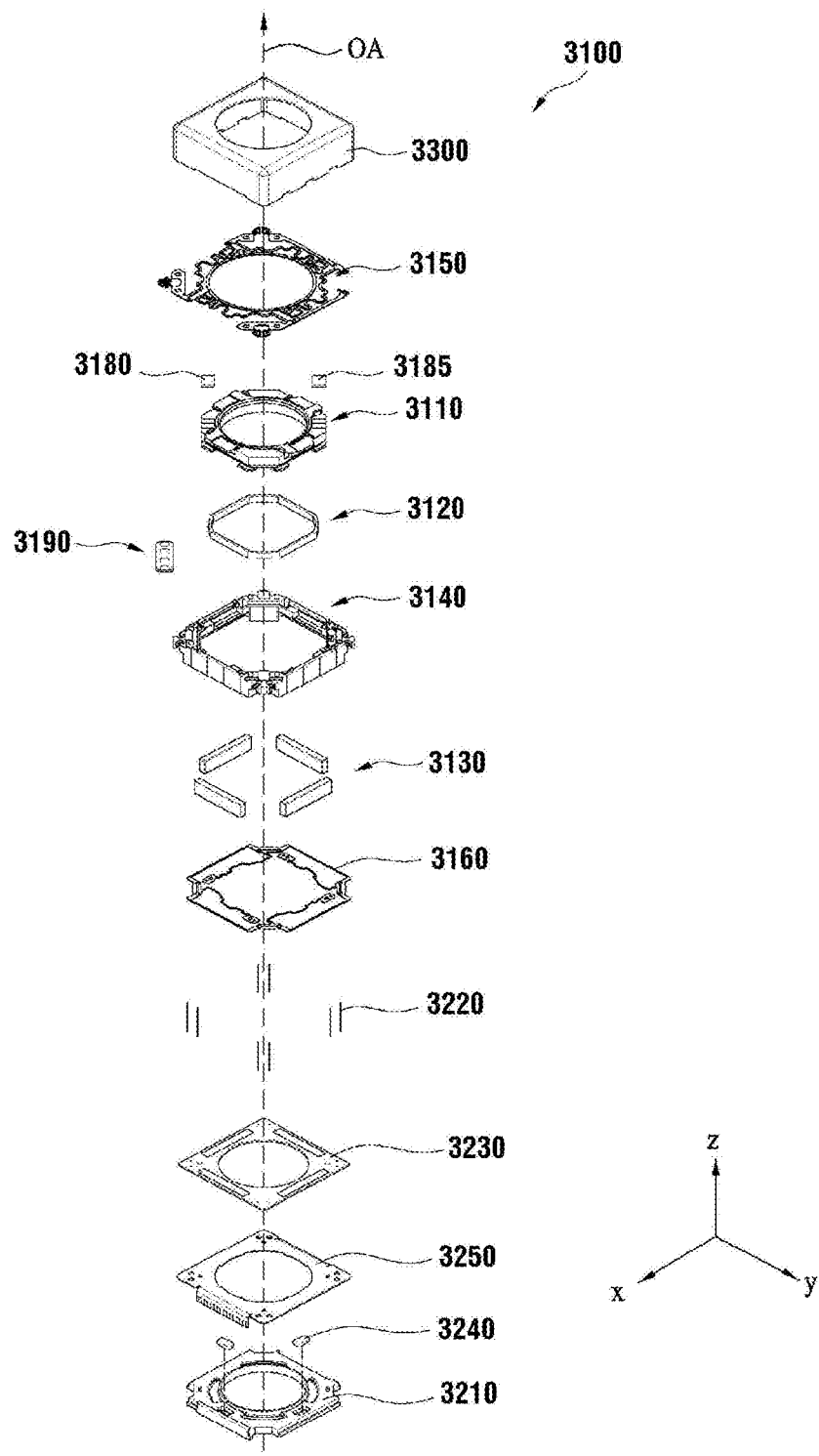
Figure 38:
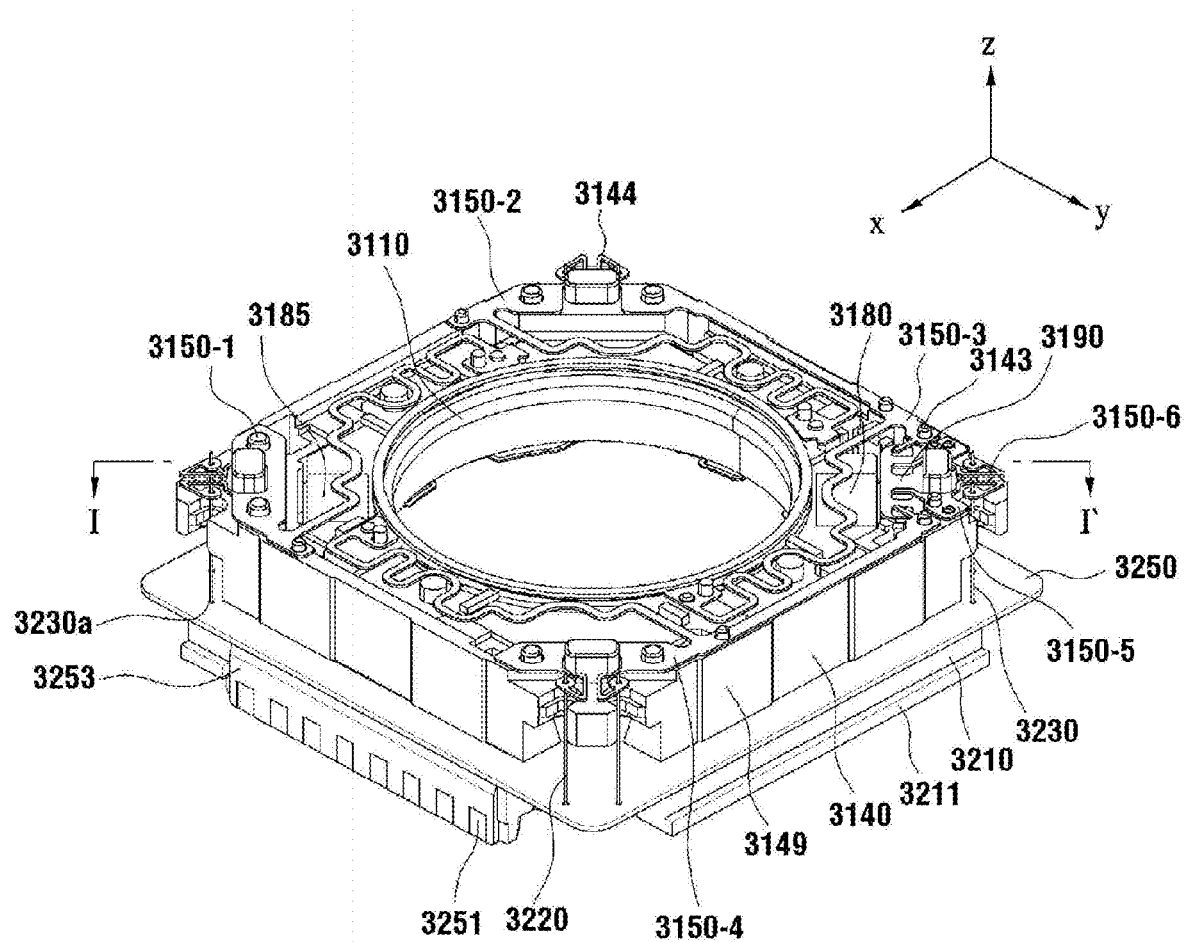

FIG. 37 is an exploded perspective view illustrating a lens driving device (3100) according to an exemplary embodiment of the present invention, and FIG. 38 is a coupled perspective view illustrating a lens driving device (3100) of FIG. 37 except for a cover member (3300).

Referring to FIGS. 37 and 38, the lens driving device (3100) may include a bobbin (3110), a first coil (3120), a first magnet (3130), a housing (3140), an upper elastic member (3150), a bottom elastic member (3160), a first position sensor (3170) and a second magnet (3180).

Furthermore, the lens driving device (3100) may further include a third magnet (3185), a board (3190), a support member (3220), a second coil (3230), a second position sensor (3240), a circuit substrate (3250), a base (3210) and a cover member (3300).

First, the cover member (3300) will be explained.

The cover member (3300) may accommodate, at a reception space formed along and by the base (3210), a bobbin (3110), a first coil (3120), a first magnet (3130), a housing (3140), an upper elastic member (3150), a bottom elastic member (3160), a first position sensor (3170), a second magnet (3180), a board (3190), a support member (3220), a second coil (3230), a second position sensor (3240) and a circuit member (3250).

The cover member (3300) may take a bottom surface-opened box shape including an upper end and lateral walls, and a bottom surface of cover member (3300) may be coupled with an upper surface of base (3210). An upper end of the cover member (3300) may take a polygonal shape, e.g., a square shape or octagonal shape.

The cover member (3300) may be formed at an upper end with a hollow hole exposing a lens (not shown) coupled with a bobbin (3110) to an outside light. Furthermore, the hollow hole of cover member (3300) may be additionally formed with a window made of a light transmission material in order to inhibit foreign objects such as dust and moisture from entering an interior of camera module.

The material of cover member (3300) may be a non-magnetic substance such as SUS in order to avoid being attached with the first magnet (3130), but may be formed with a magnetic material to allow functioning as a yoke.

Next, the bobbin (3110) will be described.

The bobbin (3110) may be disposed at an inside of housing (3140), and may move to an optical axis (OA) direction or a first direction, e.g., a z axis direction, parallel with the optical axis (OA) in response to an electromagnetic interaction between the first coil (3120) and the first magnet (3130).

Figure 39:
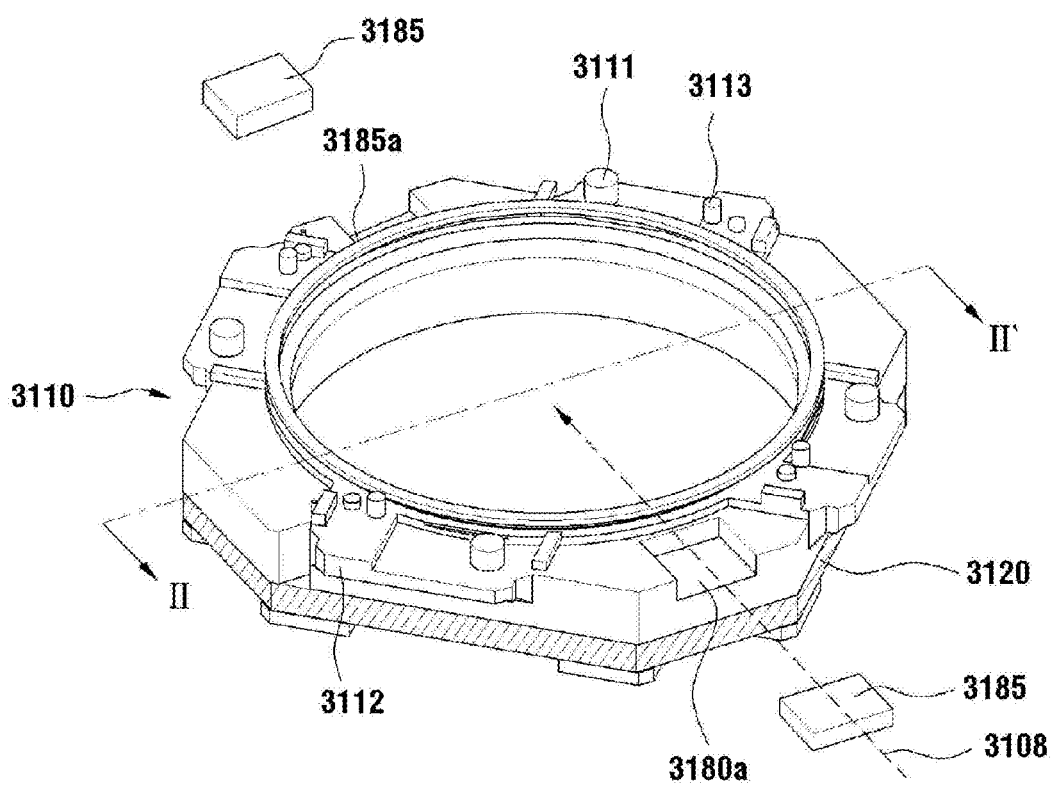

FIG. 39 is a perspective view illustrating a bobbin (3110), a first coil (3120) and a second magnet (3180) illustrated in FIG. 37.

Referring to FIG. 39, the bobbin (3110) may take a structure having a hollow hole in order to mount a lens. The hollow hole may take a round shape, an oval shape or a polygonal shape. However, the present invention is not limited thereto.

The bobbin (3110) may be formed at an upper surface with a guide part (3111) functioning as a guide guiding an installation position of the upper elastic member. For example, as illustrated in FIG. 39, the guide part (3111 of bobbin (3110) may be protruded from an upper surface to a first direction (e.g., z axis direction) in order to guide a path through which a frame connection part (3153) of an upper elastic member (3150) passes.

Furthermore, the bobbin (3110) may include a protrusion (3112) formed by being protruded to a second direction and/or third direction perpendicular to the first direction. An upper surface (3112) of protrusion (3112) at the bobbin (3110) may be accommodated with an inner frame (3151) of the upper elastic member (3150).

The protrusion (3111) of bobbin (3110) may function to inhibit the bobbin (3110) from directly colliding with the housing (3140) when the bobbin (3110) moves to a first direction parallel to an optical axis or to a direction parallel with the first direction in order to perform an autofocusing function, and even if the bobbin (3110) moves beyond a prescribed scope due to an outside shock.

The bobbin (3110) may include at least one upper support protrusion (3113) protruded from an upper surface in order to be coupled with an inner frame (3151) of the upper elastic member (3150). The bobbin (3110) may include at least one bottom support protrusion (not shown) protruded from a bottom surface in order to be coupled to an inner frame (3161) of a bottom elastic member (3150).

Furthermore, the bobbin (3110) may be also formed at an outside with a coil reception groove in which a first coil (3120) can be accommodated. The bobbin (3110) may be formed at an upper surface with a second magnet reception groove (3180a) in which a second magnet (3180) can be accommodated, inserted, fixed or arranged. The reception groove (3180a) of bobbin (3110) may take an upper-opened shape and may be formed with an opening to be exposed to an outside of bobbin (3110).

Furthermore, the bobbin (3110) may be formed at an upper surface with a third magnet reception groove (3185a) in which a third magnet (3185) can be accommodated, inserted, fixed or arranged. The third magnet reception groove (3185a) may be formed with an upper-opened opening to be exposed to an outside of bobbin (3110), and may be so disposed as to face the third magnet reception groove (3180a). This is to accurately implement an autofocusing driving by proportionately arranging the second magnet (3180) and the third magnet (3185) on the bobbin (3110).

Next, the first coil (3120) will be explained.

The first coil (3120) may be disposed at an outside of bobbin (3110). The first coil (3120) may be so disposed as not to be overlapped with the second magnet (3180) to the second direction perpendicular to the first direction or to the third direction.

The first coil (3130) may be so spaced apart at an outside of bobbin (3110) as not to be mutually interfered or overlapped with the second and third magnets (3180, 3185) to the second direction or to the third direction. For example, the first coil (3120) may be disposed at a bottom side or a bottom surface of outside of bobbin (3110), and the second and third magnets (3180, 3185) may be mutually spaced apart at an outside of bobbin (3110) formed at an upper side of first coil (3120). The first coil (3120) disposed at the bobbin (3110) and the second magnet (3180), and the first coil and the third magnet (3185) may be mutually spaced apart to an optical axis direction or to a direction parallel with the optical axis.

The first coil (3120) may take a ring shape so wound as to encompass an outside of bobbin (3110) to a direction rotating about an optical axis. For example, the first coil (3120) may be inserted, disposed or fixed inside of a coil reception groove formed at an outside of bobbin (3110).

The first coil (3120) may be directly wound on an outside of bobbin (3110), but the present invention is not limited thereto, and according to another exemplary embodiment, the first coil (3120) may be wound on the bobbin (3110) using a coil ring, or may be provided in a coil block of an angled ring shape.

The first coil (3120) may generate an electromagnetic force through an electromagnetic interaction with the first magnet (3130) when a driving signal (e.g., a driving current) is supplied, and the bobbin (3110) may be moved by the formed electromagnetic force to a first direction or to a direction parallel with the first direction.

The first coil (3120) may be so disposed or arranged as to correspond to the first magnet (3130) disposed on the housing (3140), where the first magnet (3130) may be formed in a single body to allow an entire surface facing the first coil (3120) to have a same polarity.

When the first magnet (3130) may be divided to two sections or four sections to a surface perpendicular to the optical axis to allow a surface facing the first coil (3120) to be divided to two or more than two sections, it may be also possible for the first coil (3120) to be divided in a same number corresponding to that of the divided first magnet (3130).

Next, the housing (3140) will be explained.

The housing (3140) may support a driving first magnet (3130) and a first position sensor (3170).

The housing (3140) may accommodate at an inside the bobbin (3110) to allow the bobbin (3110) to move to a first direction parallel with an optical axis by the electromagnetic force generated by an electromagnetic interaction between the first coil (3120) and the first magnet (3130).

The housing (3140) may substantially take a hollow holed pillar shape. For example, the housing (3140) may include a hollow hole with a polygonal (e.g., square or octagonal shape) shape or a round shape.

Figure 40:
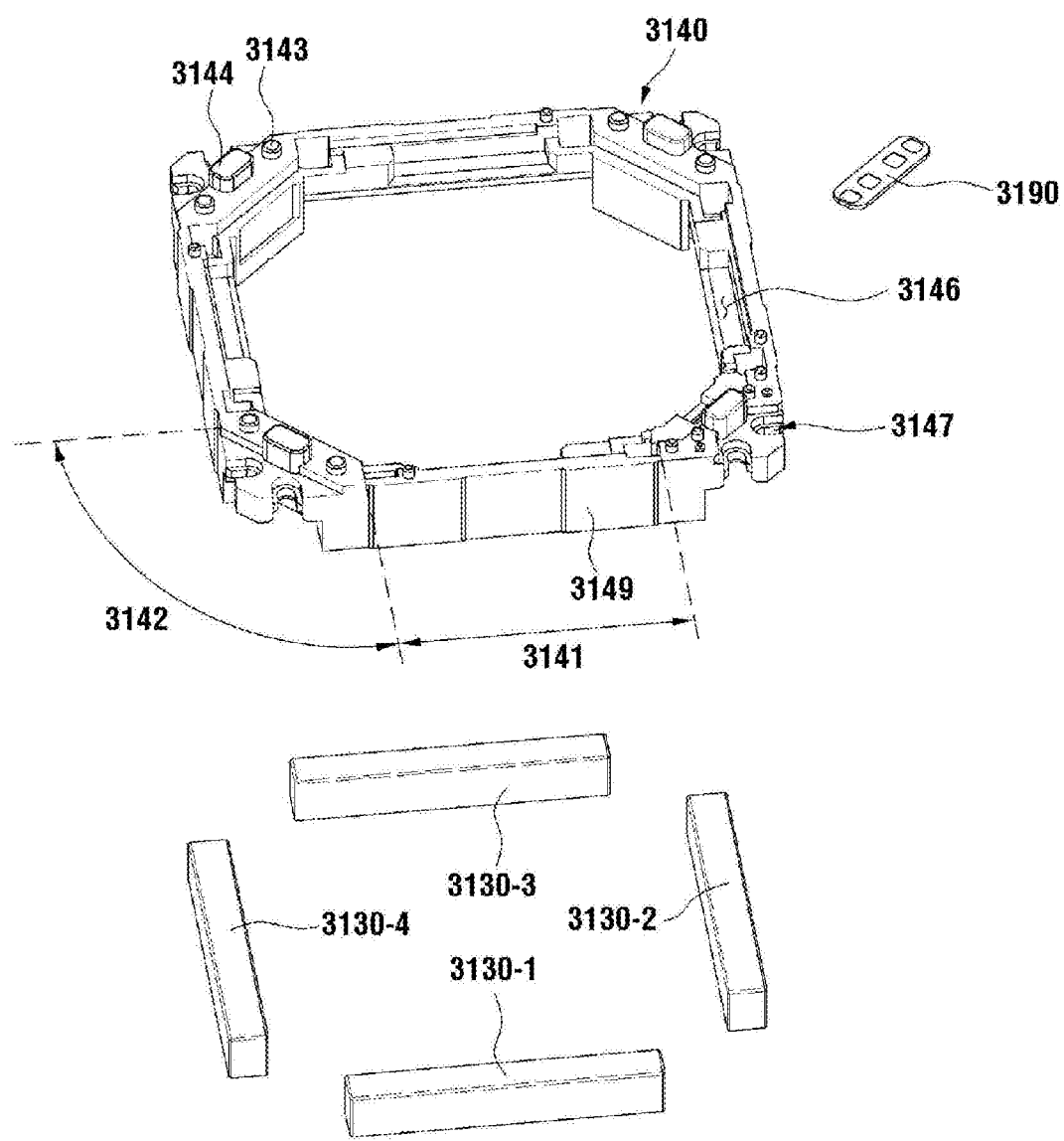
Figure 41:
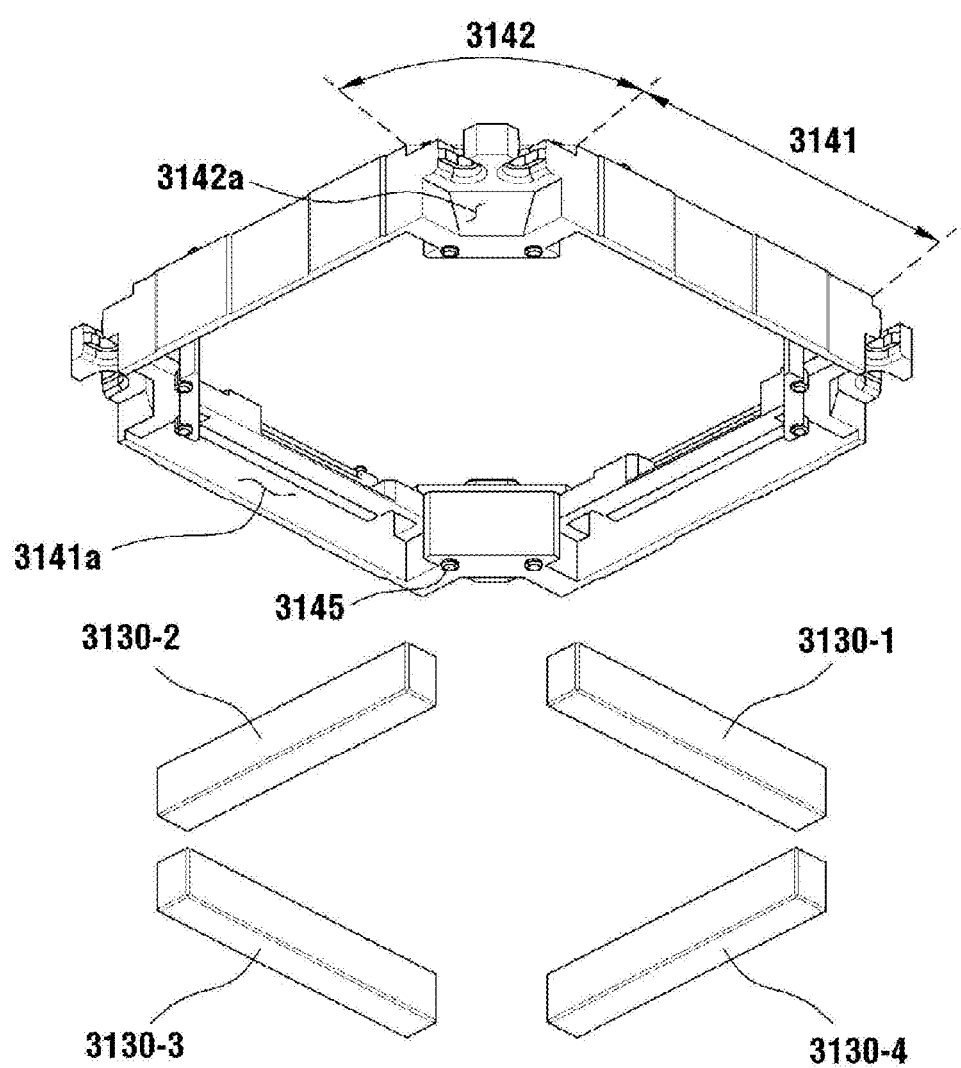
Figure 42:
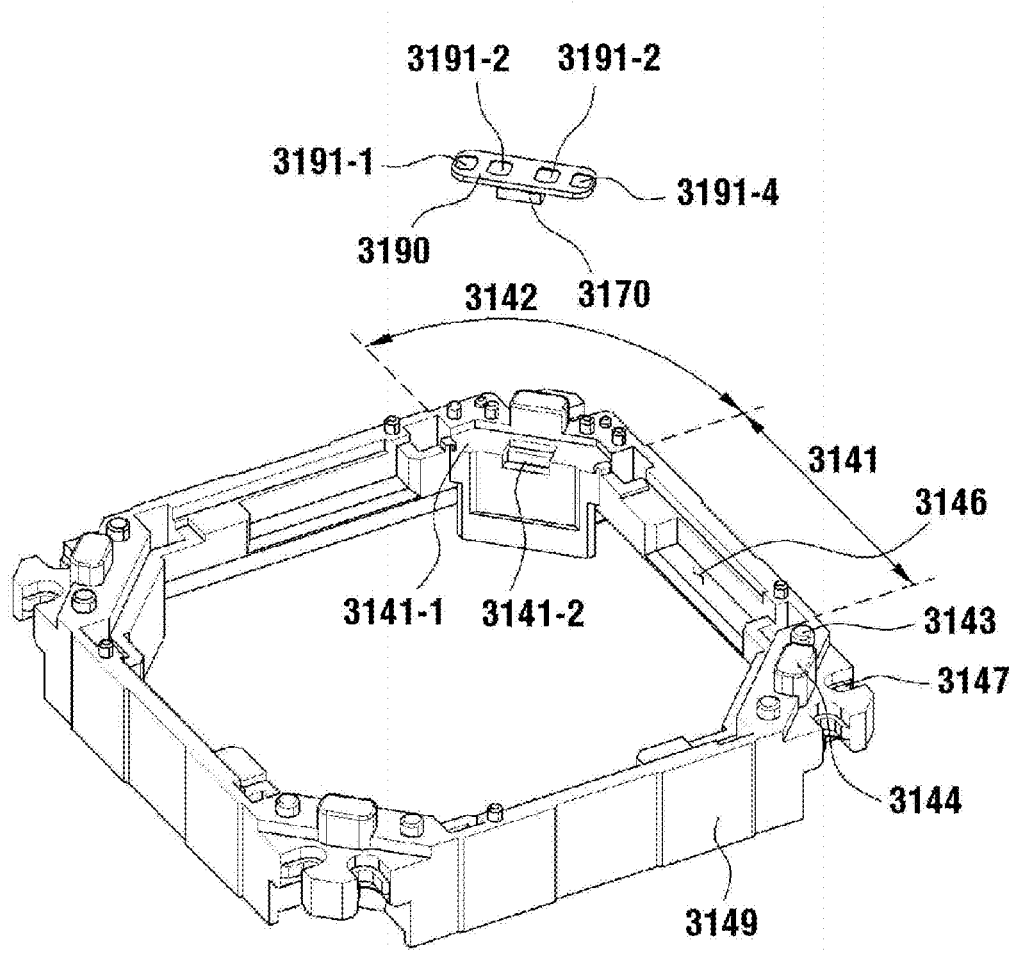
Figure 43:
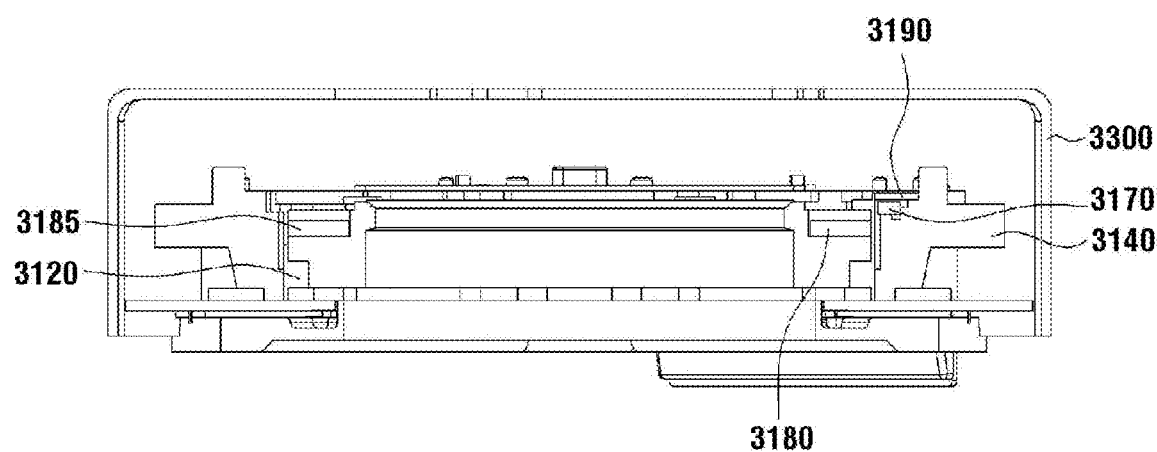

FIG. 40 is a first exploded perspective view of a housing (3140), a first position sensor (3170), a board (3190) and a first magnet (3130) illustrated in FIG. 37, FIG. 41 is a second exploded perspective view of a housing (3140), a first magnet (3130), a first position sensor (3170) and a board (3190) illustrated in FIG. 37, FIG. 42 is a schematic view illustrating mounting grooves (3141-1, 3141-2) provided on a housing (3140) in order to mount a first position sensor (3170) and a board (3190), and FIG. 43 is a cross-sectional view cut off along a line I-I' illustrated in FIG. 38.

Referring to FIGS. 40 to 43, when the bobbin (3110) moves to an optical axis or to a direction parallel with the optical axis, the housing (3140) may include a reception groove (3146) at a position corresponding to that of protrusion (3112) of bobbin (3110) in order to avoid interference with the protrusion (3112) of bobbin (3110).

The housing (3140) may include a plurality of lateral parts (3141, 3142). For example, the housing (3140) may include four first lateral parts (3141) and four second lateral parts (3142), where each width of first lateral parts (3141) may be greater than each width of second lateral parts (3142).

The first lateral parts (3141) of housing (3140) may correspond to an area where the first magnet (3130) is installed. The second lateral parts (3142) of housing (3140) may be interposed between adjacent two first lateral parts (3141), and may correspond to an area where the support member (3220) is disposed. The first lateral parts (3141) of housing (3140) may mutually connect the second lateral parts (3142) of housing (3140), and may include a plane surface of a predetermined depth. Each of the first lateral parts (3141) of housing (3140) may have a same surface area as, or greater surface area than each of the corresponding first magnet (3130).

The housing (3140) may include a first magnet reception part (3141a) for accommodating the first magnet (3130), a board mounting groove (3141-1) for accommodating a board (3190), and a first position sensing mounting groove (3141-2) for accommodating a first position sensor (3170).

The first magnet reception part (3141a) may be provided at an inner bottom end of at least one of the first lateral parts (3141) of housing (3140). For example, the first magnet reception part (3141a) may be provided at each inner bottom end of four first lateral parts, and each of the first magnets (3130) may be inserted into and fixed at any one corresponding first magnet reception part (3141a).

The first magnet reception part (3141a) of housing (3140) may be formed with a concave groove corresponding to a size of the first magnet (3130). A floor surface of the first magnet reception part (3141a) facing the second coil (3240) may be formed with an opening, and a floor surface of first magnet (3130) fixed to the first magnet reception part (3141a) may face the second coil (3230).

The board mounting groove (3141-1) may be provided at an upper surface or an upper end of any one of the second lateral parts (3142) of housing (3140). In order to facilitate the mounting of board (3190), the board mounting groove (3141-1) may be opened at an upper surface, and may take a groove shape formed with a lateral surface and a floor, and may be also formed with an opening opened to an inner side of housing (3140). A floor of the board mounting groove (3141-1) may have a corresponding shape to that of board (3110) or may have a matching shape of the board (3110).

The first position sensing mounting groove (3141-2) may be provided on a floor of the board mounting groove (3141-1). The first position sensing mounting groove (3141-2) may take a structure recessed from a floor of the board mounting groove (3141-1). For example, The first position sensing mounting groove (3141-2) may be provided to be tangential to a floor of the board mounting groove (3141-1) and to an inner surface of the second lateral part.

In order to facilitate the mounting of the first position sensor (3170), the first position sensor mounting groove (3141-2) may be opened at an upper surface, and may take a groove shape formed with a lateral surface and a floor, and may be also formed with an opening opened to an inner side of housing (3140). The first position sensor mounting groove (3141-2) may have a corresponding shape to that of the first position sensor (3170) or may have a matching shape thereof).

The first magnet may be fixed to the first magnet reception part (3141a) of housing (3140) using an adhesive, and the board (3190) may be fixed to the first position sensor mounting part (3141-2), but the present invention is not limited thereto, and may be fixed using an adhesive member such as a double-sided tape.

The lateral part (3141) of housing (3140) may be disposed in parallel with a lateral surface of cover member (3300). Furthermore, a surface area of first lateral part (3141) of housing (3140) may be greater than that of the second lateral part (3142). The second lateral part (3142) of housing (3140) may be formed with a through hole (3147) forming a path through which the support member (3220) passes. For example, the housing (3140) may include a through hole (3147) passing through an upper surface of second lateral part (3142). The number of through holes (3147) may be same as that of the support member. The support member (3220) may be connected to the upper elastic member (3150) through the through hole (3147).

Furthermore, in order to inhibit a direct collision with an inner surface of cover member (3300) illustrated in FIG. 37, the housing (3140) may be provided at an upper end with a stopper (3144).

The housing (3140) may be formed at an upper surface with at least one upper support protrusion (3143) coupled with an outer from (3152) of upper elastic member (3150). For example, the upper support protrusion (3143) of housing (3140) may be formed on at least one upper surface of the first lateral part (3141) or the second lateral part (3142). The housing (3140) may be formed at a bottom surface with a bottom support protrusion (3145) coupled and fixed to an outer frame (3162) of bottom elastic member (3160).

In order to form a path for the support member (3220) to pass through, and to simultaneously obtain a space to fill a gel-type silicon functioning as a damper, the housing (3140) may be formed with a concave groove (3142*a*) formed at the second lateral part (3142). That is, the concave groove (3142*a*) of housing (3140) may be filled with damping silicon. The housing (3140) may include at least one stopper (3149) protruded from the first lateral parts (3141). The stopper (3149) may be protruded from the first lateral parts (3141) to the second direction or the third direction in order to inhibit collision with the cover member (330) when the housing is moved to the second and/or third direction.

In order for a floor surface of housing (3140) to collide with the base (3210, described later) and/or the circuit substrate (3250), the housing (3140) may further include a stopper (not shown) protruded from a bottom surface, and the housing (3140) may be spaced apart from the base (3210) to a bottom side by the stopper formed at the upper surface and the bottom surface of housing (3140), and may be spaced apart from the cover member (3300) to the upper side to maintain a height to the optical axis direction without vertical interference. Thus, the housing (3140) may implement a shifting operation on a plane surface perpendicular to the optical axis to the second and third directions which are horizontal and vertical directions.

Next, the first magnet (3130) will be explained.

The first magnet (3130) may be disposed on the housing (3140) in order to be at least partially overlapped with the first coil (3120) to a direction perpendicular to the optical axis. For example, the first magnet (3130) may be inserted or disposed inside a reception part (3141*a*) of housing (3140).

In another exemplary embodiment, the first magnet (3130) may be disposed at an outside or an inside of the first lateral part (3141) of housing (3140), or may be also disposed at an inside or an outside of the second lateral part (3142) of housing (3140).

The first magnet (3130) may take a cubic shape corresponding to that of the first lateral part (3141) of housing (3140), but the present invention is not limited thereto, and a surface opposite to the first coil (3120) may be formed to correspond with or match to a curvature of a surface corresponding to the first coil.

The first magnet (3130) may be formed in one body, and a surface opposite to the first coil (3120) may be disposed to have an S pole and an opposite surface may be disposed to have an N pole. However, the present invention is not limited thereto, and the opposite formation thereof may be also possible.

The first magnet (3130) may be formed with more than two pieces, each piece facing the other. For example, mutually crisscrossing two pairs of first magnets (3130) each facing the other may be disposed on the housing (3140). At this time, the first magnet (3130) may substantially take a square shape in its plane surface, or alternatively may take a triangular shape or a trapezoidal shape.

Each of the two mutually opposite first lateral parts (3141) of the first lateral parts (3141) on the housing (3140) may be disposed with a first magnet (3130).

Next, the upper elastic member (3150), the bottom elastic member (3160) and the support member (3220) will be explained.

The upper elastic member (3150) and the bottom elastic member (3160) may support the bobbin (3110) using elasticity. The upper elastic member (3150) may support an upper surface of bobbin (3110) and an upper surface of housing (3140) by being connected to the upper surface of bobbin (3110) and the upper surface of housing (3140). The bottom elastic member (3160) may support a bottom surface of bobbin (3110) and a bottom surface of housing (3140) by being connected to the bottom surface of bobbin (3110) and the bottom surface of housing (3140).

The support member (3220) may movably support the housing (3140) relative to the base (3210) to a direction perpendicular to the optical axis, and may electrically connect at least one of the upper and bottom elastic members (3150, 3160) and the circuit substrate (3250). For example, the support member (3220) may electrically connect the upper elastic member (3150) and the circuit substrate (3250).

Figure 44:
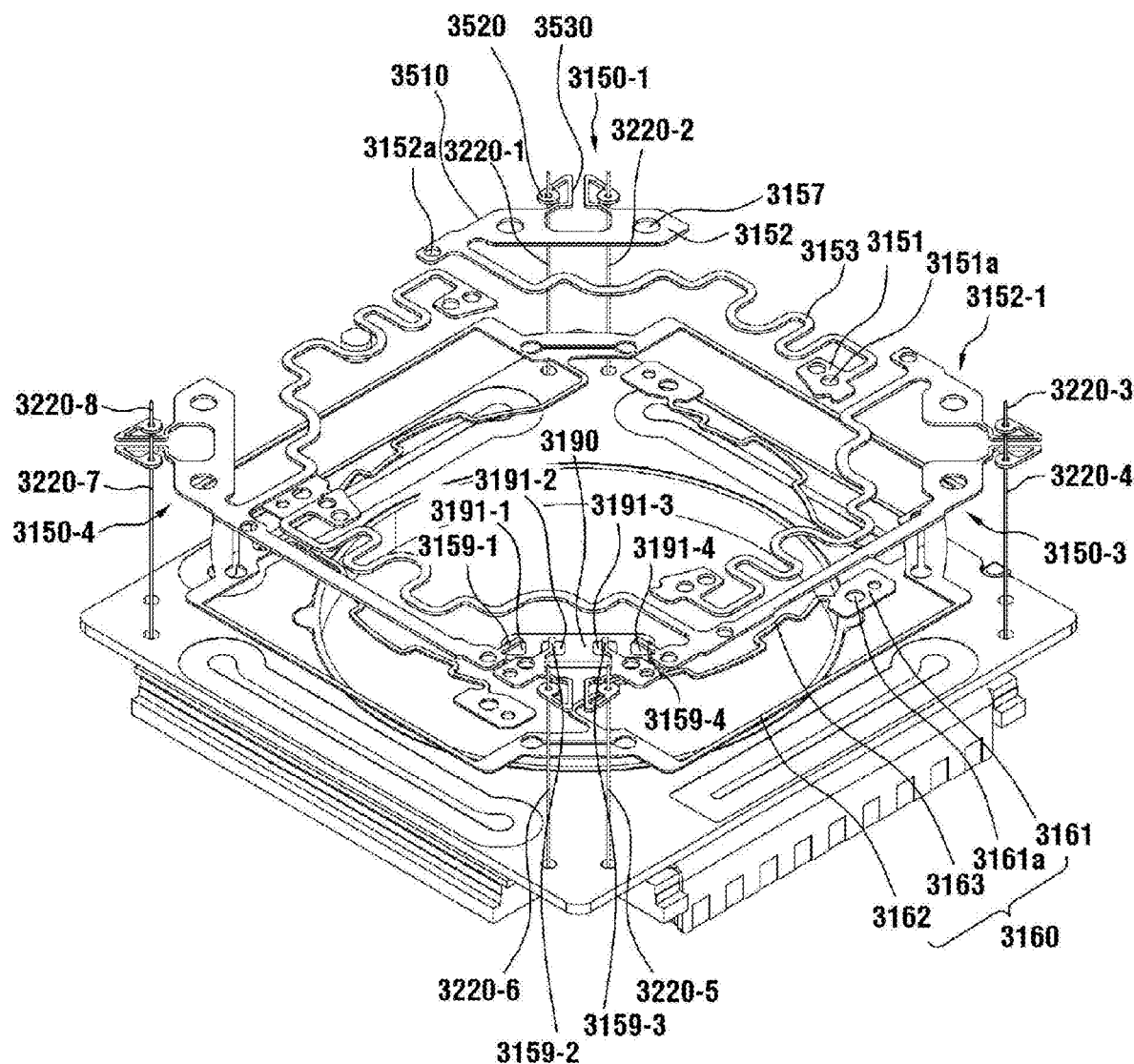

FIG. 44 is a coupled perspective view of an upper elastic member (3150), a bottom elastic member (3160), a first position sensor (3170), a board (3190), a base (3210), a support member (3220) and a circuit substrate (3250) illustrated in FIG. 37.

Referring to FIG. 44, the upper elastic member (3150) may be divided to more than two pieces. For example, the upper elastic member (3150) may be mutually and electrically divided and may include a plurality of upper elastic members (3150; 150-1 to 3150-6), each spaced apart from the other.

Pads (3191-1 to 3191-4) of board (3190) may be electrically connected to any corresponding one of the plurality of upper elastic members (3150; 150-1 to 3150-6).

For example, although the present exemplary embodiment has exemplified that the pads (3191-1 to 3191-4) of board (3190) are electrically connected to any corresponding one of the plurality of upper elastic members (3150; 150-1 to 3150-6), the present invention is not limited thereto.

In another exemplary embodiment, the pads (3191-1 to 3191-4) of board (3190) may be electrically connected to the bottom elastic member (3160), or may be electrically connected to both the upper elastic member (3150) and the bottom elastic member (3160).

Each of the pads (3191-1 to 3191-4) of board (3190) electrically connected to the first position sensor (3170) may be electrically connected to any corresponding one of the plurality of upper elastic members (3150; 150-1 to 3150-6).

At least one of the plurality of upper elastic members (3150-1 to 3150-6) may be electrically connected to any corresponding one of the support members (3220).

Each of the first to fourth upper elastic members (3150-1 to 3150-4) may include an inner frame (3151) connected to the bobbin (3110), an outer frame (3152) connected to the housing (3140) and a frame connection part (3153) connecting the inner frame (3151) and the outer frame (3152).

For example, the inner frame (3151) may be provided with a through hole (3151a) coupled to an upper support protrusion (3113) of bobbin (3110), and the outer frame (3152) may be provided with a through hole (3152a) coupled to an upper support protrusion (3143) of housing (3140).

The inner frames of two upper elastic members selected from the first to fourth upper elastic members (3150-1 to 3150-4) may be electrically connected to both ends of first coil (3120).

The outer frame (3152) of each of the first to fourth upper elastic members (3150-1 to 3150-4) may be connected to at least one of the support members.

For example, the outer frame (3152) of each of the first to fourth upper elastic members (3150-1, 3150-4) may be connected to two support members (3220-1 and 3220-2, 3220-7, 3220-8), and outer frame of each of the second and third upper elastic members (3150-2, 3150-3) may be connected to one support member (3220-3, 3220-4).

The frame connection part (3153) may form a pattern of a predetermined shape by being bent at least once or more times. Ascending and/or descending operations of bobbin (3110) to the first direction parallel with the optical axis may be elastically supported through position change and fine deformation of frame connection part (3153).

Each of the fifth and sixth elastic members (3150-5, 3150-6) may be coupled with the housing (3140), and may be connected to any corresponding one of the support members (3220-1 to 3220-8).

For example, each of the fifth and sixth upper elastic members (3150-5, 3150-6) may include an outer frame coupled with the housing (3140).

The fifth and sixth upper elastic members (3150-5, 3150-6) may not be coupled with the bobbin (3110) and instead may be coupled only to the housing (3140), and may elastically support the housing (3140). That is, the fifth and sixth upper elastic members (3150-5, 3150-6) may be spaced apart from the bobbin (3110) and may not contact the bobbin (3110).

The outer frame of each of the fifth and sixth upper elastic members (3150-5, 3150-6) may be connected or coupled to one end of the support members (3220-5, 3220-6), and the other end of the support members (3220-5, 3220-6) may be electrically connected to the circuit substrate (3250) through a through hole (3230a) provided at the circuit member (3231).

The outer frame of each of the first to sixth upper elastic members (3150-1 to 3150-6) may include a first coupling part (3510) coupled with the housing (3140), a second coupling part (3520) coupled to the support member (e.g., 3220-1) and a connection part (3530) connecting the first coupling part (3510) and the second coupling part (3520).

The support members (3220-1 to 3220-8) may be electrically connected to the second coupling part (3520) of outer frame (3152) by soldering or conductive adhesive member (e.g., conductive epoxy). The connection part (3530) may take an at-least-once-bent shape, and a width of connection part (3530) may be formed to be narrower than that of the frame connection part (3153) of upper elastic member (3150). Because the width of connection part (3530) is formed to be narrower than that of the frame connection part (3153) of upper elastic member (3150), the connection part (3530) may have an case in moving to the optical axis or to the first direction parallel with the optical axis, whereby a stress applied to the upper elastic member (3150) and a stress applied to the support member (3220) may be dispersed.

At least one outer frame (3152) among the first to sixth upper elastic members (3150-1 to 3150-6) may include contact parts (3159-1 to 3159-4) contacted or connected to at least one of the pads (3191-1 to 3191-4) of the bobbin (3190).

For example, each outer frame of third to sixth upper elastic members (3150-3 to 3150-6) adjacent to a second lateral wall (3142) of housing (3140) disposed with the board (3190) may be formed with contact parts (3159-1 to 3159-4) contacted or connected to any corresponding one of the pads (3191-1 to 3191-4) of the board (3190).

Each contact part (3159-1 to 3159-4) of third to sixth upper elastic members (3150-3 to 3150-6) may be extended or elongated from one end of outer frame to directly contact the pads (3159-1 to 3159-4) of bobbin (3190).

The bottom elastic member (3160) may include an inner frame (3161) coupled with a bottom support protrusion of bobbin (3110), an outer frame (3162) coupled with a bottom support protrusion of housing (3140) and a connection part connecting the inner frame (3161) and the outer frame (3162).

Although FIG. 44 has illustrated that the bottom elastic member (3160) is not divided, the bottom elastic member (3160) may be divided to two or more pieces in other exemplary embodiments.

Next, the support member (3220) will be explained.

The support member (3220) may be respectively disposed on the second lateral parts (3142) of housing (3140). For example, each of four second lateral parts (3142) may be disposed with two support members (3220).

Alternatively, an another exemplary embodiment, each of the two second lateral parts (3142) among the four second lateral parts (3142) on the housing (3140) may be disposed only with one support member, and each of the remaining other two second lateral parts (3142) may be disposed with two support members.

In still another exemplary embodiment, the support member (3220) may be also disposed on the first lateral part (3140) of housing (3140) in the shape of a leaf spring.

The support member (3220) may form a path to transmit an electric power to the first position sensor (3170) and the first coil (3120) as explained above, and may form a path to provide an output signal outputted from the first position sensor (3170) to the circuit substrate (3250).

The support member (3220) may be implemented by a member supported by elasticity such as a leaf spring, a coil spring or a suspension wire. Furthermore, in another exemplary embodiment, the support member (3220) may be formed integrally with the upper elastic member.

The support members (3220-1 to 3220-8) may be spaced apart from the housing (3140), or may not be fixed to the housing (3140) but may be directly connected to the connection part (3530) of outer frame (3153) of upper elastic member (3150).

The connection part (3530) of outer frame (3153) of upper elastic member (3150) is spaced apart from the housing (3140), such that the connection part (3530) is easy to be moved to the optical axis or to a first direction parallel with the optical axis. The support members (3220-1 to 3220-8)

according to the exemplary embodiment are directly connected to the connection part that is easily moved to the first direction, such that the support members (3220-1 to 3220-8) can move more easily to the optical axis or to the first direction parallel with the optical axis than the convention support member fixed to the housing (3140), whereby the degree of accuracy of OIS correction can be enhanced. Particularly, the stress relative to drop and shock can be dispersed, whereby deformation and short-circuit of support members (3220-1 내지 3220-8) can be restricted.

The first to sixth upper elastic members (3150-1 to 3150-6) may be electrically connected to the circuit substrate (3250) through the support members (3220-1 to 3220-8).

Albeit not being illustrated in FIG. 2, a damping member (not shown) may be interposed between the upper elastic member (3150) and the bobbin (3110), between the upper elastic member (3150) and the housing (3140), between the bottom elastic member (3160) and the bobbin (3110), between the bottom elastic member (3160) and the housing (3140), between the support member (3220) and the housing (3140) and between the bobbin (3110) and the housing (3140). For example, the damping member (not shown) may be disposed between the former and the latter in order to allow the former to contact the latter, and may mitigate or restrict the trembling or oscillation of mover, e.g., the bobbin (3110) by an outside shock.

Next, the first position sensor (3170) and the board (3190) will be explained.

The first position sensor (3170) may be mounted on the board (3190) disposed on the housing (3140) and may move along with the housing (3140) during the OIS operation.

In response to the movement of bobbin (3110), the first position sensor (3170) can detect intensity of magnetic field of second magnet (3180) mounted on the bobbin (3110), and output an output signal as a result of detection.

The first position sensor (3170) may be disposed at a bottom surface of board (3190). Here, the bottom surface of board (3190) may be a surface facing an upper surface of housing (3140) when the board (3190) is mounted on the housing (3140).

The first position sensor (3170) may be realized in a driver shape including a Hall sensor, or may be realized alone as a position detection sensor such as a Hall sensor.

The first position sensor (3170) may include two input terminals and two output terminals, and the input terminals and output terminals of first position sensor (3170) may be electrically connected to any one corresponding pad among the pads (3190-1 to 3190-4) of board (3190).

The board (3190) may include pads (3190-1 to 3190-4) disposed on an upper surface, a first position sensor (3170) mounted on a bottom surface and a circuit pattern or wire (not shown) connecting the first position sensor (3170) mounted on the bottom surface with the pads. For example, the board (3190) may be a PCB or an FPCB.

In another exemplary embodiment, the first position sensor (3170) may be disposed at an upper surface of board (3190), and the pads (3190-1 to 3190-4) may be also provided at a bottom surface of board (3190).

The pads (3190-1 to 3190-4) of board (3190) may be electrically connected to the circuit substrate (3250) by the third to sixth upper elastic members (3150-3 to 3150-6) and the support members (3220-4 to 3220-8), and the first position sensor (3170) may be electrically connected to the circuit substrate (3250).

Furthermore, both ends of first coil (3120) may be connected to the inner frame of first and second upper elastic members (3150-1, 3150-2) and may be electrically connected to the circuit substrate (3250) by the first and second elastic members (3150-1, 3150-2) and support members (3220-1 to 3220-3).

Next, the base (3210), the circuit substrate (3250) and the second coil (3230) will be described.

The base (3210) may be formed with a through hole corresponding to a through hole of bobbin (3110) or/and to a through hole of housing (3140), and may take a shape matching to or corresponding to that of the cover member (3300), e.g., may take a square shape.

Figure 45:
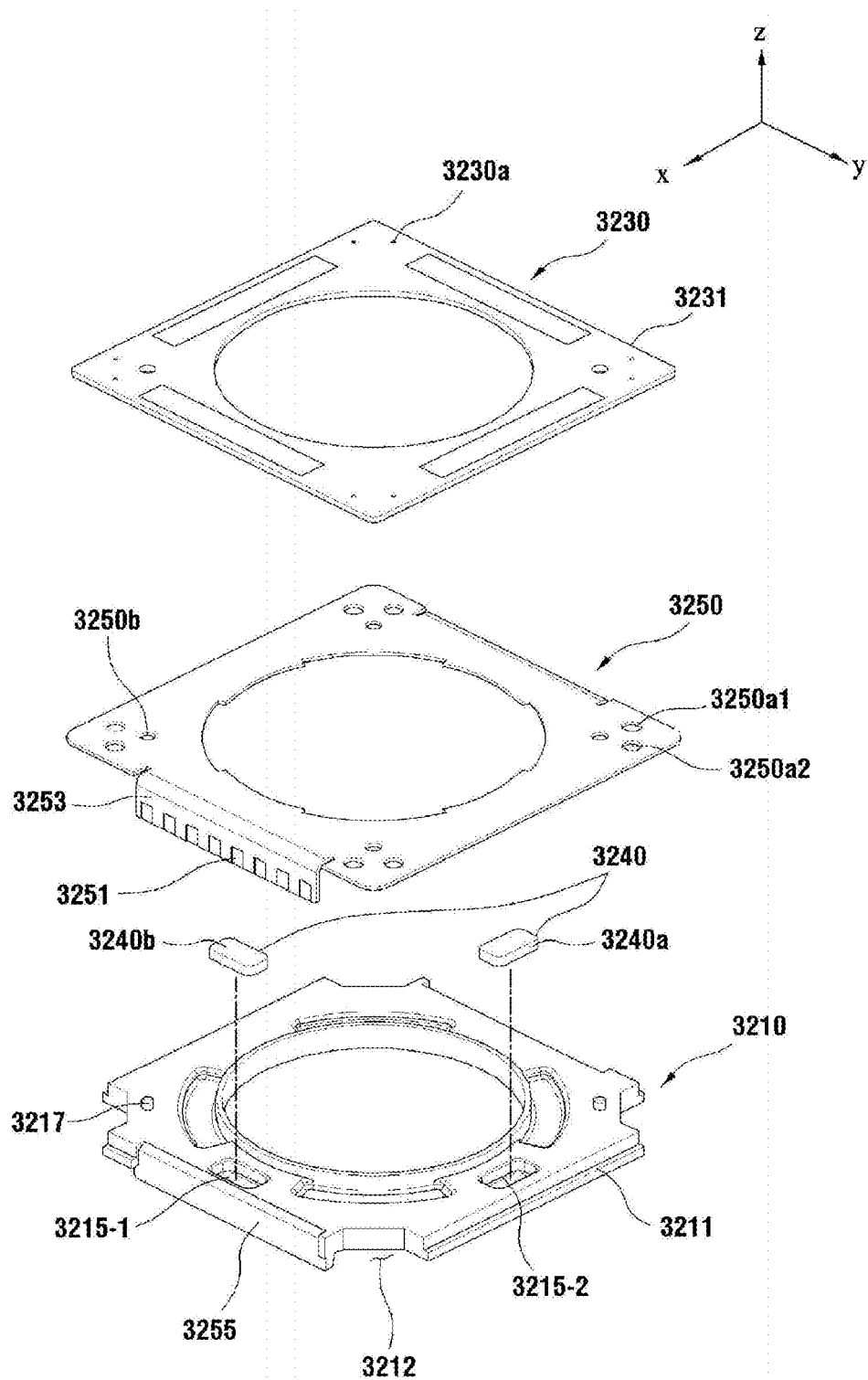

FIG. 45 is an exploded perspective view of a base (3210), a second coil (3230) and a circuit substrate (3250) illustrated in FIG. 37.

Referring to FIG. 45, the base (3210) may be formed with a stepping stair (3211) capable of being coated with an adhesive when the cover member (3300) is adhered for fixation. At this time, the stepping stair (3211) may guide the cover member (3300) coupled to an upper side, and may be coupled to allow a distal end of cover member (3300) to be surface-contacted.

A surface of base (3210) facing an area formed with a terminal (3251) of circuit substrate (3250) may be formed with a pad part (3255) of corresponding size. The pad part (3255) of base (3210) may be a predetermined cross-section from an outside of base and formed free from a stepping stair (3211) to support a terminal surface (3253) of circuit substrate (3250).

A corner of base (3210) may be formed with a concave groove (3212). When the corner of cover member (3300) takes a protruding shape, the protrusion of cover member (3300) may be fastened at the concave groove (3212) with the base (3210).

Furthermore, an upper surface of base (3210) may be provided with reception grooves (3215-1, 3215-2) to be disposed with the second position sensor (3240). According to an exemplary embodiment, the base (3210) may be provided with two reception grooves (3215-1, 3215-2), and as the second position sensor (3240) is disposed on the reception grooves (3215-1, 3215-2) of base (3210), the degree of movement of housing (3140) to the second direction and the third direction can be detected. Toward this end, imaginary lines connecting a center of reception grooves (3215-1, 3215-2) of base (3210) and a center of base (3210) may be mutually crossed. For example, an angle formed by the imaginary lines connecting a center of reception grooves (3215-1, 3215-2) of base (3210) and a center of base (3210) may be 90°, but the present invention is not limited thereto.

Based on the circuit substrate (3250), an upper may be disposed with the second coil (3230) and a bottom surface may be disposed with the second position sensor (3240). The second position sensor (3240) can detect a displacement of housing (3140) relative to the base (3210) to a direction (e.g., x axis or y axis) perpendicular to the optical axis (e.g., z axis).

The second position sensor (3240) may include two mutually perpendicularly disposed position sensors (3240a 240b) in order to detect the displacement of housing (3140) to a direction perpendicular to the optical axis.

The circuit substrate (3250) may be disposed at an upper surface of base (3210), and may include a hollow hole corresponding to that of bobbin (3110), a hollow hole of housing (3140) or/and that of base (3210). An outside of circuit substrate (3250) may take a shape matching to or corresponding with that of an upper surface of base (3210), e.g., a square shape.

The circuit substrate (3250) may include at least one terminal surface (3253) formed with a plurality of terminals (3251) or pins bent from an upper surface and receiving electric signals from outside. Although FIG. 45 has illustrated the second coil (3230) is realized in a shape as being provided to a separate circuit member (3231) from the circuit substrate (3250), the present invention is not limited thereto, and in another exemplary embodiment, the second coil (3230) may be realized in a coil block shape, in an FP coil shape or a circuit pattern shape formed on the circuit substrate. (3250).

The second coil (3230) may include a through hole (3230a) that passes through the circuit member (3231). The support member (3220) may pass through the through hole (3230a) to be electrically connected to the circuit substrate (3250).

The second coil (3230) may be disposed at an upper surface of circuit substrate (3250) in order to face the first magnet (3130) disposed on the housing (3140).

A total of four (4) second coils (3230) may installed, each one at each side of four sides of circuit substrate (3250), but the present invention is not limited thereto, and it may be such that one second coil may be installed for second direction and one second coil may be installed for third direction. Moreover, more than four second coils may be installed.

As noted above, the housing (3140) may be moved to the second and/or third direction by the interaction between mutually-faced first magnet (3130) and the second coil (3230) whereby the OIS operation can be implemented.

The second position sensor (3240) may be provided with a Hall sensor, and any sensor capable of detecting a magnetic field may be used for the second position sensor. For example, the second position sensor (3240) may be realized in a driver shape including a Hall sensor, or may be also implemented by a position detection sensor alone such as a Hall sensor.

The terminal surface (3253) of circuit substrate (3250) may be disposed with a plurality of terminals (3251). For example, an electric power may be supplied to the first and second coils (3120, 3230) and to the first and second position sensors (3170, 3240) by receiving the power through the plurality of terminals (3251) disposed on the terminal surface (3253) of circuit substrate (3250), and output signals outputted from the first and second position sensors (3170, 3240) may be also outputted to an outside.

According to an exemplary embodiment, the circuit substrate (3250) may be provided with an FPCB, but the present invention is not limited thereto and terminals of circuit substrate (3250) may be also directly formed on a surface of base by using surface electrode method.

The circuit substrate (3250) may include through holes (3250a1, 3250a2) penetrable by the support member (3220). The support member (3220) may be electrically connected through relevant circuit pattern and soldering disposable at a bottom surface of circuit substrate (3250) through the through holes (3250a1, 3250a2) of circuit substrate (3250).

Furthermore, in another exemplary embodiment, the circuit substrate (3250) may not be disposed with through holes (3250a1, 3250a2), and the support member (3220) may be also electrically connected to the circuit pattern formed on an upper surface of circuit substrate (3250) using soldering.

The circuit substrate (3250) may further include a through hole (3250b) coupled with an upper support protrusion (3217) of base (3210). The upper support protrusion (3217) of base (3210) and the through hole (3250b) may be fixed by thermal fusion by being coupled as shown in FIG. 44, and may be also fixed by using an adhesive member such as epoxy.

Figure 46:
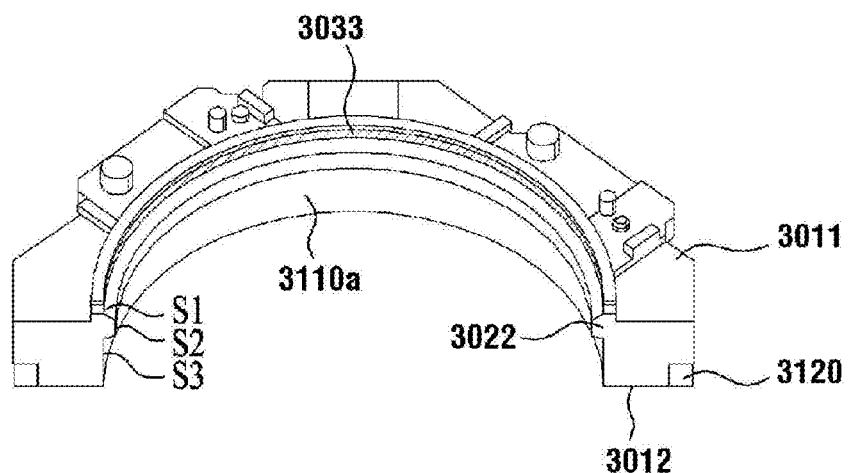

FIG. 46 is a perspective view illustrating a bobbin (3110) of FIG. 39 cut off to a ∥-∥ direction.

Referring to FIG. 46, an inner circumferential surface (3110a) of bobbin (3110) may be divided to three areas. For example, the inner circumferential surface (3110a) of bobbin (3110) may be a surface of bobbin (3110) disposed at an inner side of a through hole of bobbin (3110).

For example, the inner circumferential surface (3110a) of bobbin (3110) may include first to third areas (S1 to S3). The first to third areas (S1 to S3) may be sequentially disposed or arranged from an upper surface (311) of bobbin (3110) to a direction of bottom surface (312).

For example, the first area (S1) of bobbin (3110) may be one area of the inner circumferential surface (3110a) of bobbin disposed within a pre-set scope from the upper surface (311) of bobbin (3110). For example, the first area (S1) of bobbin (3110) may be one area of the inner circumferential surface (3110a) of bobbin (3110) contacted by an adhesive member for mutually adhering a lens inserted into a hollow hole of bobbin (3110) and the inner circumferential surface (3110a) of bobbin (3110).

Furthermore, the second area (S2) of bobbin (3110) may be another area of inner circumferential surface (3110a) of bobbin (3110) positioned within a pre-set scope from a bottom surface (312) of bobbin (3110). For example, the second area (S2) may be another area of the inner circumferential surface (3110a) of bobbin (3110) not contacted by an adhesive member.

Furthermore, the third area (S3) of bobbin (3110) may be interposed between the first area (S1) and the second area (S2) and the inner circumferential surface (3110a) of bobbin (3110) contacted by the first area (S1) and the second area (S2) may be other area.

The third area (S3) of bobbin (3110) may be provided with a protrusion (3022) protruding from the inner circumferential surface (3110a) of bobbin (3110) to a horizontal direction. For example, the horizontal direction may be a direction perpendicular to the optical axis (OA).

A hollow hole of bobbin (3110) may be mounted with a lens by being inserted thereinto, and the protrusion (3022) of bobbin (3110) may support the mounted lens. For example, an outer circumferential surface of lens may be formed with a stepping stair hitched at the protrusion (3022) of bobbin (3110).

The lens inserted into the hollow hole of bobbin (3110) may be fixed to the inner circumferential surface (3110a) of bobbin (3110) by an adhesive, where the adhesive may be interposed between the first area (S1) and the outer circumferential surface of lens.

At least one surface roughness of the first area (S1) and/or third area (S3) at the inner circumferential surface of bobbin may be greater than that of the second area (S2).

Figure 47A:
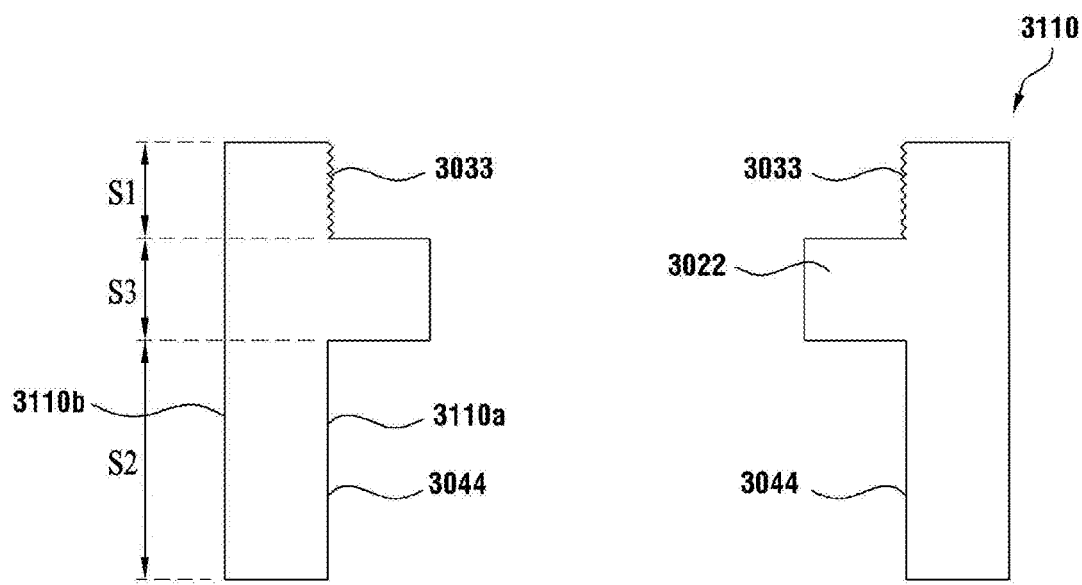
FIG. 47a is a cross-sectional view illustrating a bobbin of FIG. 46 according to an exemplary embodiment of the present invention.

FIG. 47a is a cross-sectional view illustrating a bobbin (3110) of FIG. 46 according to an exemplary embodiment of the present invention.

Referring to FIG. 47a, the first area (S1) of bobbin (3110) may have a first surface (3033), and the second area (S2) of bobbin (3110) may have a second surface (3044).

The first area (S1) of bobbin (3110) may be formed with a first surface (3033) having an irregular or regular prominence and depression (凹凸) structure.

A surface roughness of the first surface (3033) at the first area (S1) of bobbin (3110) may be greater than that of the second surface (3044) at the second area (S2) of bobbin (3110). Here, the surface roughness may be an arithmetic mean of each parameter {e.g., arithmetic mean roughness (Ra), maximum height (Rt), peak-to-valley roughness (Rz)} indicating surface roughness of each part arbitrarily collected from a surface of a subject (hereinafter referred to as "subject surface").

For example, a surface roughness hereinafter may follow the definition and indication of KS (Korea Standard)'s surface roughness or DIN ISO's surface roughness, but the present invention is not limited thereto.

For example, the arithmetic mean roughness (center line average height, arithmetic mean deviation of the profile, Ra) of first surface (3033) at the first area (S1) of bobbin (3110) may be greater than that (Ra) of second surface (3044) at second area (S2) of bobbin (3110).

For example, the arithmetic mean roughness (Ra) may be an arithmetic mean between a mean line of roughness curve (profile) and a height of roughness curve (profile).

Here, the roughness profile may be a curve removed of a surface curvature longer than a pre-set wavelength in a section curve (primary profile), where the section curve may be a plane perpendicular to a subject surface that is shown as a profile on the cross-section thereof when the subject surface is cut off, and a mean line of roughness curve may be a line in which a waviness profile is changed to a straight line from a sample portion of section curve.

For example, a cut-off value for calculating each arithmetic mean roughness (Ra) of first and second surfaces (3033, 3044) and reference (sampling) length (or evaluation length) may be mutually same.

For example, a peak-to-valley roughness (Rz) of first surface (3033) at the first area (S1) of bobbin (3110) may be greater than a mean roughness (Rz) of second surface (3044) at the second area (S2) of bobbin (3110).

For example, the peak-to-valley roughness (Rz) may be an added value of two elements, where one element being that number of peak values preset in the order of high peaks (e.g., 5 or 10) from a data picked up from the roughness curve as much as reference length are averaged, and another element being that number of valley values preset in the order of low valleys (e.g., 5 or 10) from a data picked up from the roughness curve as much as reference length are averaged. For example, reference lengths (or evaluation lengths) for calculating each mean roughness (Rz) between peaks and valleys for each of the first and second surfaces (3033, 3044) may be mutually same.

For example, a maximum height (Rt) of first surface (3033) at the first area (S1) of bobbin (3110) may be greater than that (Rt) of second surface (3044) at the second area (S2) of bobbin (3110).

For example, the maximum height (Rt) may be a maximum value of height between a lowest point (valley line) of section curve within an evaluation length and a highest point (peak line).

For example, reference lengths (or evaluation lengths) for calculating each maximum height (Rt) of the first and second surfaces (3033, 3044) may be mutually same.

For example, based on DIN ISO 1302 standard, an arithmetic mean roughness (Ra) of first surface (3033) at the first area (S1) of bobbin (3110) may be in the range of 0.32 µm~3.15 µm. Furthermore, for example, based on IN ISO 1302 standard, an arithmetic mean roughness (Ra) of first surface (3033) at the first area (S1) of bobbin (3110) may be in the range of 0.7 µm~1.12 µm.

For example, based on DIN ISO 1302 standard, a mean roughness (Rz) between peaks and valleys for the first surface (3033) at the first area (S1) of bobbin (3110) may be in the range of 1.5 µm~12.5 µm. Furthermore, for example, a mean roughness (Rz) between peaks and valleys for the first surface (3033) at the first area (S1) of bobbin (3110) may be in the range of 2.4 µm~3.3 µm.

For example, based on DIN ISO 1302 standard, a maximum height (Rt) of first surface (3033) at the first area (S1) of bobbin (3110) may be in the range of 1.6 µm~20.0. Furthermore, for example, a maximum height (Rt) of first surface (3033) at the first area (S1) of bobbin (3110) may be in the range of 3.2 µm~5.0 µm.

The surface roughness of first surface (3033) at the first area (S1) of bobbin (3110) may be greater than that of circumferential surface (3110b) of bobbin (3110). For example, each of the arithmetic mean roughness (Ra), the peak-to-valley roughness (Rz) and maximum height (Rt) of first surface (3033) at the first area (S1) of bobbin (3110) may be greater than any one corresponding to the arithmetic mean roughness (Ra), the peak-to-valley roughness (Rz) and maximum height (Rt) of circumferential surface (3110b) of bobbin (3110).

The first area (S1) of bobbin (3110) may be made to have a first surface (3033) by corrosively treating only the first area (S1) of bobbin (3110) illustrated in FIG. 47a using a corrosion fluid, or patterning the surface to allow having regular or irregular prominence and depression (凹凸).

For example, the bobbin (3110) may be injection molded, and an injected surface of bobbin (3110) may be to have a surface roughness in response to injection process. The surface roughness of first surface (3033) at the first area (S1) of bobbin (3110) formed by corrosion treatment may be greater than the surface roughness of second area (S2) of bobbin (3110) having a surface roughness of original injection surface or surface roughness of circumferential surface.

Figure 47B:
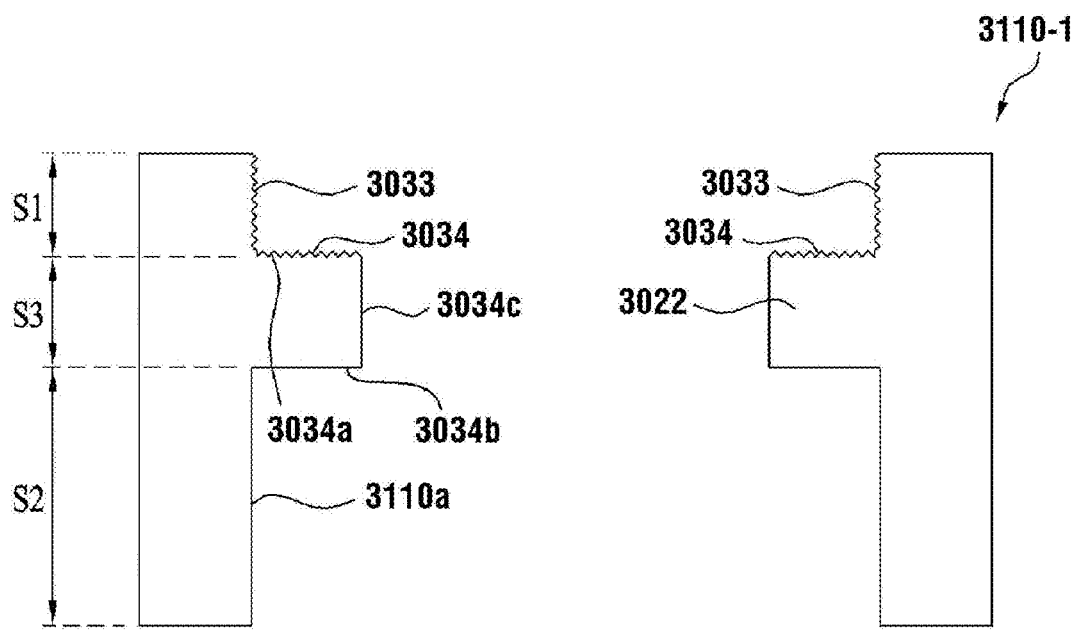
FIG. 47b is a cross-sectional view illustrating a bobbin of FIG. 46 according to another exemplary embodiment of the present invention.

FIG. 47b is a cross-sectional view illustrating a bobbin (3110) of FIG. 46 according to another exemplary embodiment of the present invention. Reference numerals in FIG. 47b are same as those in FIG. 47a and have the same configurations, such that redundant explanation having the same configurations as in FIG. 47a will be briefly explained or omitted.

Referring to FIG. 47b, a third area (S3) of bobbin (3110) may have a third surface (3034) having an irregular or regular prominence and depression (凹凸) structure.

A surface roughness of the third surface (3034) at the third area (S3) of bobbin (3110) may be greater than that of the second surface (3044) at the second area (S2) of bobbin (3110).

The surface roughness (e.g., Ra, Rz, Rt) of third surface (3034) at the third area (S3) of bobbin (3110) may have the same range as that of the surface roughness (e.g., Ra, Rz, Rt) of first surface (3033) at the first area (S1) of bobbin (3110) explained in FIG. 47a.

The surface roughness (e.g., Ra, Rz, Rt) of third surface (3034) at the third area (S3) of bobbin (3110) may be greater than the surface roughness (e.g., Ra, Rz, Rt) of circumferential surface (3110b) of bobbin (3110).

For example, a protrusion (3022) of third area (S3) of bobbin (3110) may include a first surface (3034a) adjacent to the first area (S1), a second surface (3034b) adjacent to the second area (S2) and a third surface (3034c) interposed between the first surface (3034a) and the second surface (3034b), and the third surface (3034) may be a first surface (3034a) of protrusion (3022).

The first area (S1) of bobbin (3110) may be made to have a first surface (3033) and the third area (S3) may be made to have a third surface (3034) by corrosively treating only the first area (S1) and the third area (S3) of bobbin (3110)

illustrated in FIG. 47b using a corrosion fluid, or patterning the surface to allow having regular or irregular prominence and depression (凹凸).

Figure 47C:
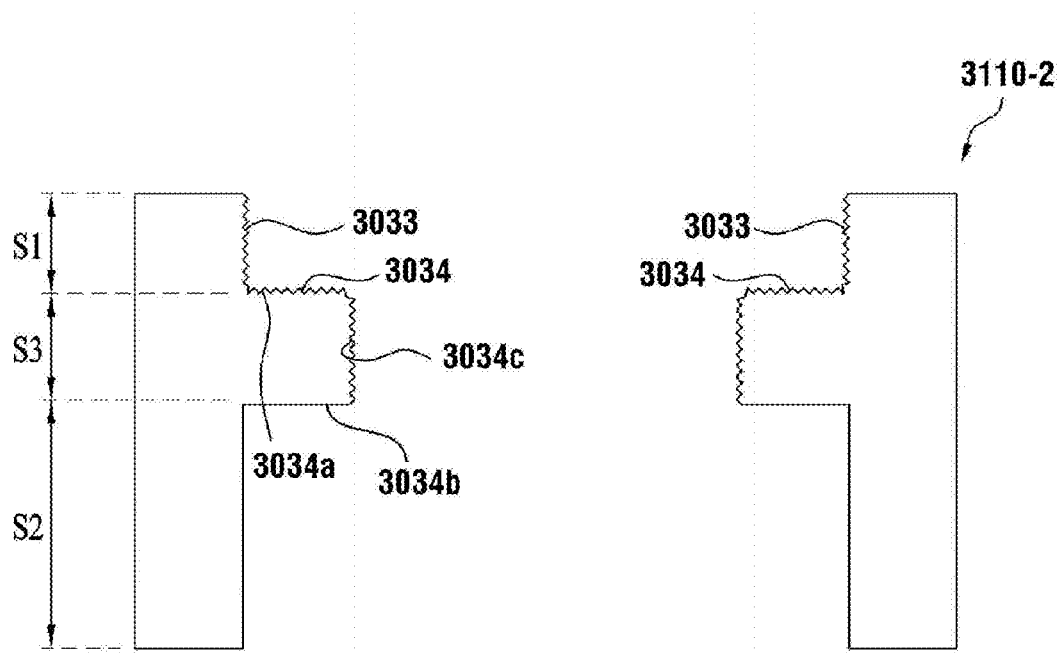
FIG. 47c is a cross-sectional view illustrating a bobbin of FIG. 46 according to still another exemplary embodiment of the present invention.

FIG. 47c is a cross-sectional view illustrating a bobbin (3110) of FIG. 46 according to still another exemplary embodiment (3110-2) of the present invention. Reference numerals in FIG. 47c are same as those in FIG. 47a and FIG. 47b and have the same configurations, such that redundant explanation having the same configurations will be briefly explained or omitted.

Referring to FIG. 47c, a third area (S3) of bobbin (3110) may have a third surface (3034a, 3034c). A surface roughness of the third surface (3034) at the third area (S3) of bobbin (3110) may be greater than that of the second surface (3044) at the second area (S2) of bobbin (3110).

The surface having a greater surface roughness than that of the second surface (3044) at the second area (S2) of bobbin (3110) in FIG. 47c may be the first surface (3034a) and the third surface (3034c) at the protrusion (3022) of bobbin (3110).

A lens mounted on the lens driving device may be deviated by shocks applied from outside or caused by drop from the lens driving device.

Contact area and frictional force between contact member (3050) and an inner circumferential surface (3110a) of bobbin (3110) can be increased by allowing the surface roughness (Ra, Rz, Rt) of first area (S1) or the first area (S1) and third areas (S1, S3) at the inner circumferential surface (3110a) of bobbin (3110) at the lens driving device (3100) contacted by contact member (350, see FIG. 49) for fixing a lens to be greater than the surface roughness (Ra, Rz, Rt) of other areas of bobbin (3110) not disposed with the contact member (3050), e.g., the second area (S2) or the outer circumferential surface (3110b).

As a result, the lens may be inhibited from being deviated from the bobbin (3110) caused by an outside shock according to the exemplary embodiment.

Figure 47D:
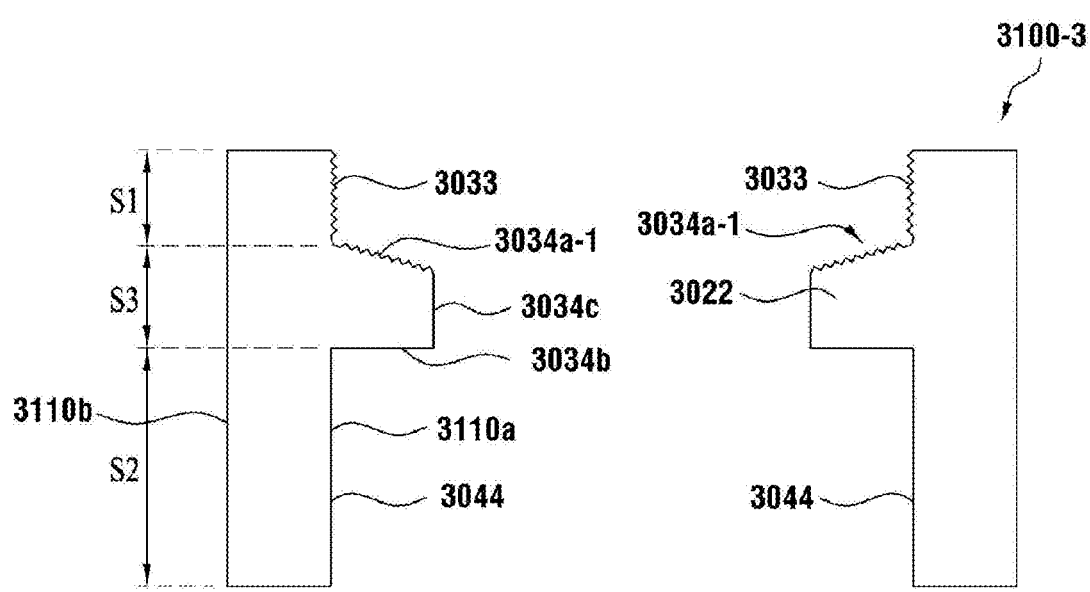
FIG. 47d is a perspective view illustrating a bobbin of FIG. 46 according to still another exemplary embodiment of the present invention.

FIG. 47d is a perspective view illustrating a bobbin (3110) of FIG. 46 according to still another exemplary embodiment (3110-3) of the present invention.

A protrusion (3022) illustrated in FIG. 47d may include a first surface (334a-1), a second surface (3034b) and a third surface (3034c).

The difference from FIG. 47b is that although an internal angle formed by the first surface (334a-1) of protrusion (3022) in FIG. 47b and a first surface (3033) of first area (S1) is perpendicular, the first surface (3034a) of protrusion (3022) may be slanted to allow an internal angle formed by a first surface (3034a) of protrusion (3022) at the third area (S3) of bobbin (3110) and the first area (S1) of first area (S1) to be an obtuse angle in FIG. 47d. Furthermore, an edge met by the first surface (3033) of first area (S1) and the first surface (334a-1) of protrusion (3022) at the third area (S3) may be round or curved.

The example of the internal angle formed by the first surface (334a-1) of protrusion (3022) in FIG. 47b and the first surface (3033) and the example of a rounded edge met by the first surface (3033) and the first surface (334a-1) of third area (S3) may be identically applied to exemplary embodiments of FIGS. 47a and 47c.

Figure 48:
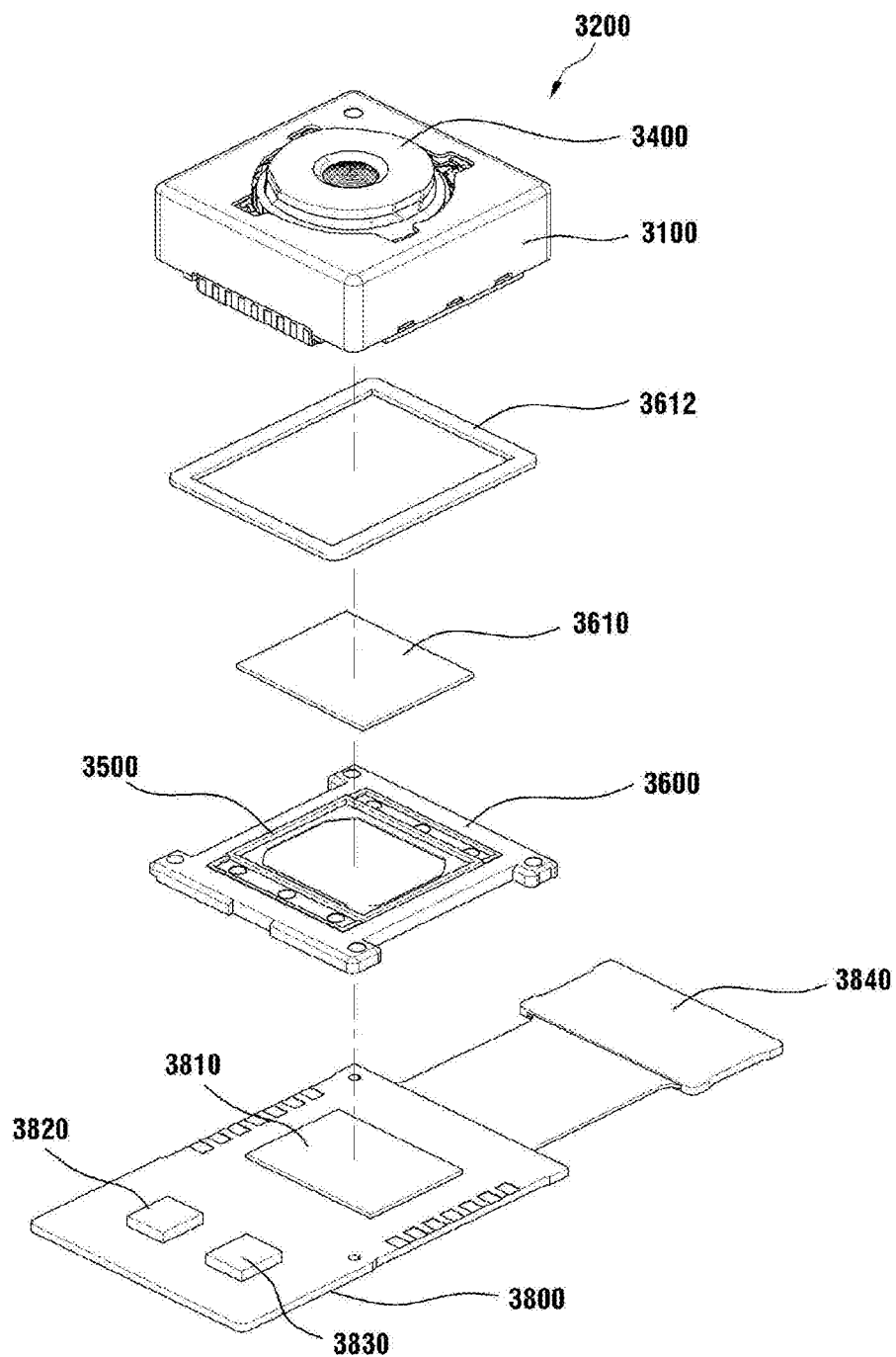

FIG. 48 is an exploded perspective view illustrating a camera module (3200) according to an exemplary embodiment of the present invention.

Referring to FIG. 48, the camera module may include a lens or a lens barrel (3400), a lens driving device (3100), an adhesive member (3612), a filter (3610), a first holder (3600), a second holder (3800), an image sensor (3810), a motion sensor (2820), a controller (3830) and a connector (2840).

The lens or lens barrel (3400) may be mounted on a bobbin (3110) of lens driving device (3100).

The first holder (3600) may be disposed at a position lower than that of a base (3210) of lens driving device (3100). The filter (3610) may be mounted on the first holder (3600), and the first holder (3600) may be formed with a protrusion (3500) mounted with a filter (3610).

The adhesive member (3612) may couple or attach the base (3210) of lens driving device (3100) to the first holder (3600). The adhesive member (3612) may also function to inhibit a foreign object from being introduced into the lens driving device (3100), in addition to the abovementioned mentioned adhesion function. For example, the adhesive member may be an epoxy, a heat hardening adhesive, and a UV hardening adhesive.

The filter (3610) may function to inhibit a light of particular frequency band in the light passing through the lens (3400) from being incident on the image sensor (3810). The filter (3610) may be an infrared cut-off filter, but the present invention is not limited thereto. At this time, the filter (3610) may be disposed in parallel with an x-y plane.

An area of the first holder (3600) mounted with the filter (3610) may be formed with a hollow hole to allow a light having passed the filter (3610) to be incident on the image sensor (3810).

The second holder (3800) may be disposed at a bottom surface of first holder (3600), and the second holder (3600) may be mounted with the image sensor (3810). The image sensor (3810) may be an area where an image of incident light having passed the filter (3610) is captured.

The second holder (3800) may be formed with various circuits, elements and controller for transmitting an image captured on the image sensor (3810) to outside devices by converting the captured image to an electric signal.

The second holder (3800) may be mounted with an image sensor, formed with a circuit pattern and may be realized by a circuit substrate coupled with various elements.

The image sensor (3810) may receive an image included in a light incident through the lens driving device and may convert the received image to an electric signal.

The filter (3610) and the image sensor (3810) may be so discretely disposed as to face each other to the first direction.

The motion sensor (3820) may be mounted on the second holder (3800), and may be electrically connected with the controller (3830) through a circuit pattern provided onto the second holder (3800).

The motion sensor (3820) may output rotational angular velocity information in response to movement of camera module (3200). The motion sensor (3820) may be realized by 2-axis or 3-axis gyro sensor, or an angular velocity sensor.

The controller (3820) may be mounted on the second holder (3800), and may be electrically connected to a second position sensor (3240) of lens driving device (3100) and a second coil (3230). For example, the second holder (3800) may be electrically connected to a circuit substrate (3250) of lens driving device (3100), and the controller (3280) mounted on the second holder (3800) may be electrically connected to the second position sensor (3240) and the second coil (3230) through the circuit substrate (3820).

The controller (3830) may output a driving signal capable of implementing the OIS operation on an OIS mover of lens driving device (3100) based on feedback signals provided from the second position sensor (3240) of lens driving device (3100).

The connector (3840) may be electrically connected to the second holder (3800), and may be formed with a port for electrically connecting with an outside device.

Figure 49:
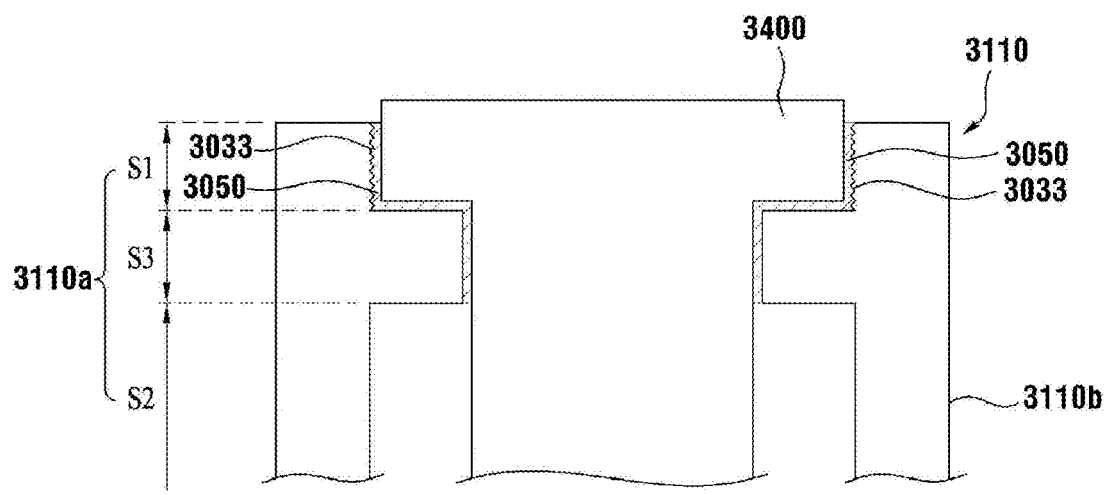

FIG. 49 is a coupled cross-sectional view of a lens (3400) illustrated in FIG. 48 and a bobbin (3110) illustrated in FIG. 47a.

Referring to FIG. 49, an adhesive member (3050) may be interposed between an outer circumferential surface of lens (3440) inserted into a hollow hole of bobbin (3110) and the first and second areas (S1, S2) of bobbin (3110). The lens (3400) may be fixed to the bobbin (3110) by the adhesive member (3050).

For example, the adhesive member (3050) may be disposed on at least one area between an outer circumferential surface of lens (3440) and the first surface (3033) at the first area (S1) of bobbin (3110), between an outer circumferential surface of lens (3330) and the first surface (3034a) of protrusion (3022) at the third area (S3) of bobbin (3110), and between an outer circumferential surface of lens (3330) and the third surface (3034c) of protrusion (3022) at the third area (S3) of bobbin (3110).

At this time, the protrusion (3022) may function to inhibit the adhesive member (3050) from flowing to the second area (S2) from the first area (S1) of an inner circumferential surface of bobbin.

The surface roughness of first surface (S1) of bobbin (3110) contacted by the adhesive member (3050) is greater than that of the other area of bobbin (3110) not contacted by the adhesive member, e.g., the second area (S2) or the outer circumferential surface (3110b) of bobbin (3110) to thereby increase a contact area and frictional force between the adhesive member (3050) and the bobbin (3110), whereby the lens (3400) may be inhibited from being deviated to an outside of hollow hole of bobbin (3110) caused by outside shock.

Figure 50:
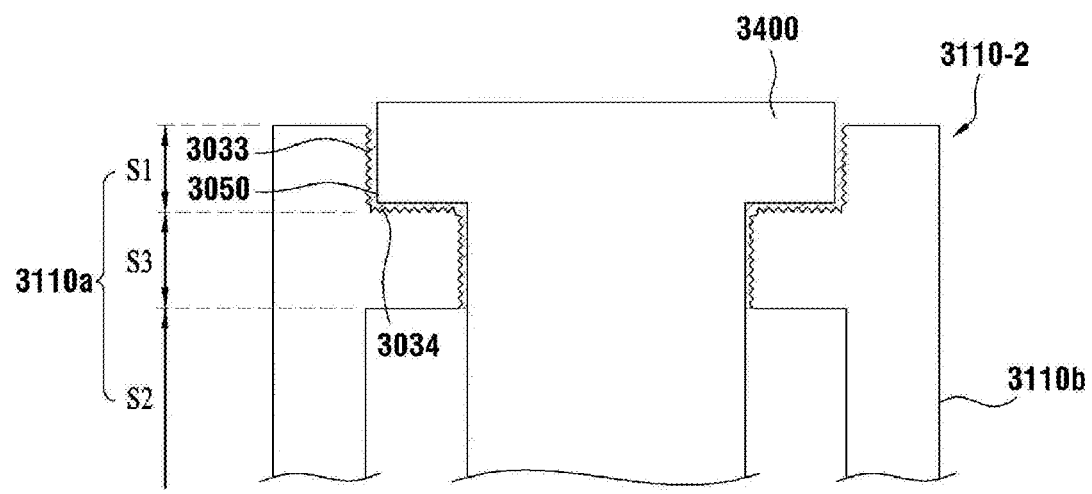

FIG. 50 is a coupled perspective view of a lens (3400) illustrated in FIG. 48 and a bobbin (3110-2) illustrated in FIG. 47c.

Referring to FIG. 50, each surface roughness of first surface (3033) at first area (S1) of bobbin (3110-2) contacted by the adhesive member (3050) and the second surface (3034) at second area (S2) is greater than that of other areas of bobbin (3110) not contacted by the adhesive member (3050), e.g., the second area (S2) or the outer circumferential surface (3110b) of bobbin (3110-2) to thereby increase a contact area and frictional force between the adhesive member (3050) and the bobbin (3110), whereby the lens (3400) may be inhibited from being deviated to an outside of hollow hole of bobbin (3110) caused by outside shock.

The frictional force between the bobbin (3110) and the lens (3400) in case of FIG. 50 may be higher than that of the case of FIG. 49, whereby the lens (3400) deviation prevention effect by shocks may be further improved. Even in the case of bobbin (3110-1) of FIG. 49, the frictional force can be more improved than that of the case of FIG. 49, whereby the lens (3400) deviation prevention effect by shocks may be further improved.

A fifth exemplary embodiment of present invention may include a configuration of any one or more of the first, second, third and fourth exemplary embodiments of the present invention.

The first exemplary embodiment may include a mover length obtainment structure {terminal unit (1800) and the like} of OIS support member (1600) according to the second exemplary embodiment. The first exemplary embodiment may include a mover length obtainment structure {the structure of a bottom end of support member (2220) being soldered to a bottom surface of PCB (2250) and the like} of support member (2220) according to the third exemplary embodiment. The first exemplary embodiment may include a disengagement prevention structure of lens barrel (3400) {the structure of protrusion (3022) of bobbin (3110) and the like} according to the first exemplary embodiment.

The second exemplary embodiment may include a mover length obtainment structure {terminal unit (211) and the like} of support member (220) according to the first exemplary embodiment.

The second exemplary embodiment may include a mover length obtainment structure {the structure of a bottom end of support member (2220) being soldered to a bottom surface of PCB (2250) and the like} of support member (2220) according to the third exemplary embodiment.

The second exemplary embodiment may include a disengagement prevention structure of lens barrel (3400) {the structure of protrusion (3022) of bobbin (3110) and the like} according to the fourth exemplary embodiment.

The third exemplary embodiment may include a mover length obtainment structure {terminal unit (211) and the like} of support member (220) according to the first exemplary embodiment.

The third exemplary embodiment may include a mover length obtainment structure {terminal unit (1800) and the like} of OIS support member (1600) according to the second exemplary embodiment.

The third exemplary embodiment may include a disengagement prevention structure of lens barrel (3400) {the structure of protrusion (3022) of bobbin (3110) and the like} according to the fourth exemplary embodiment.

The fourth exemplary embodiment may include a mover length obtainment structure {terminal unit (211) and the like} of support member (220) according to the first exemplary embodiment.

The fourth exemplary embodiment may include a mover length obtainment structure {terminal unit (1800) and the like} of OIS support member (1600) according to the second exemplary embodiment.

The fourth exemplary embodiment may include a mover length obtainment structure {the structure of a bottom end of support member (2220) being soldered to a bottom surface of PCB (2250) and the like} of support member (2220) according to the third exemplary embodiment.

The invention claimed is:
1. A lens driving device, comprising:
a base;
a housing disposed on the base;
a bobbin disposed in the housing;
a first coil disposed on the bobbin;
a magnet disposed on the housing;
a substrate disposed on the base and comprising a second coil;
an upper elastic member coupled with the bobbin and the housing;
a terminal member disposed on the base; and
a wire coupled with the upper elastic member and the terminal member,
wherein an upper surface of the base comprises a first area contacted with the substrate,
wherein the terminal member comprises a second coupling part coupled with the wire, and wherein an upper surface of the second coupling part is disposed lower than the first area of the upper surface of the base.

2. The lens driving device of claim 1, wherein the terminal member comprises a first coupling part coupled with the substrate,
wherein an upper surface of the first coupling part is disposed at a same height as the first area of the upper surface of the base, and
wherein the second coupling part is disposed lower than the first coupling part.

3. The lens driving device of claim 2, wherein the terminal member comprises a third coupling part, and
wherein at least a portion of the third coupling part is exposed to an outer lateral surface of the base.

4. The lens driving device of claim 3, wherein the terminal member comprises a bent part bent from the first coupling part and connected with the third coupling part.

5. The lens driving device of claim 1, wherein the terminal member comprises a connection part bent from the second coupling part.

6. The lens driving device of claim 1, wherein the second coil is formed as a pattern coil on the substrate.

7. The lens driving device of claim 1, wherein the wire is electrically connected to the substrate through the terminal member.

8. The lens driving device of claim 1, wherein the base comprises a hole or a groove formed on a corner area of the base, and
wherein a portion of the wire is disposed in the hole or the groove of the base.

9. The lens driving device of claim 1, wherein the base comprises a terminal receptor comprising a shape corresponding to a shape of at least a portion of the terminal member, and
wherein the terminal member is disposed on the terminal receptor of the base.

10. The lens driving device of claim 1, wherein the second coupling part has a flat plate shape disposed in a direction perpendicular to an optical axis.

11. The lens driving device of claim 1, wherein at least a portion of the second coupling part of the terminal member is visible when viewed from below.

12. The lens driving device of claim 1, wherein the upper elastic member comprises a hole passed through by the wire, and
wherein an upper end part of the wire is coupled with an upper surface of the upper elastic member by soldering.

13. The lens driving device of claim 12, wherein the terminal member comprises a hole passed through by the wire, and
wherein a lower end part of the wire is coupled with a lower surface of the terminal member by soldering.

14. A camera module, comprising:
a printed circuit board (PCB);
an image sensor disposed on the PCB;
the lens driving device of claim 1 disposed on the PCB; and
a lens coupled to the bobbin of the lens driving device and disposed on the image sensor.

15. A portable device, comprising:
a body;
a camera module of claim 14 disposed on the body; and
a display part disposed on one surface of the body and configured to output an image photographed by the camera module.

* * * * *